United States Patent
Kocienda et al.

(10) Patent No.: US 11,747,956 B2
(45) Date of Patent: Sep. 5, 2023

(54) MULTI-DIMENSIONAL OBJECT REARRANGEMENT

(71) Applicant: Apple Inc., Cupertino, CA (US)

(72) Inventors: Kenneth Kocienda, San Jose, CA (US); Chanaka G. Karunamuni, San Jose, CA (US); Gary Ian Butcher, Los Gatos, CA (US); Imran Chaudhri, San Francisco, CA (US); Dylan Ross Edwards, Cupertino, CA (US); Aurelio Guzman, San Jose, CA (US); Jonathan P. Ive, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/508,894

(22) Filed: Oct. 22, 2021

(65) Prior Publication Data

US 2022/0043560 A1    Feb. 10, 2022

Related U.S. Application Data

(63) Continuation of application No. 16/130,838, filed on Sep. 13, 2018, now Pat. No. 11,157,135, which is a
(Continued)

(51) Int. Cl.
*G06F 3/04817* (2022.01)
*G06F 3/0482* (2013.01)
(Continued)

(52) U.S. Cl.
CPC ........ *G06F 3/04817* (2013.01); *G06F 3/0482* (2013.01); *G06F 3/0488* (2013.01); *G06F 3/04842* (2013.01)

(58) Field of Classification Search
CPC .............. G06F 3/04817; G06F 3/0482; G06F 3/04842; G06F 3/0488
See application file for complete search history.

(56) References Cited

U.S. PATENT DOCUMENTS

| 4,974,174 A | 11/1990 | Kleinman |
| 5,305,435 A | 4/1994 | Bronson |

(Continued)

FOREIGN PATENT DOCUMENTS

| AU | 2015101022 A4 | 9/2015 |
| CH | 700242 A2 | 7/2010 |

(Continued)

OTHER PUBLICATIONS

Advisory Action received for U.S. Appl. No. 09/477,419, dated Dec. 4, 2002, 3 pages.
(Continued)

*Primary Examiner* — Tuyetlien T Tran
(74) *Attorney, Agent, or Firm* — DLA Piper LLP (US)

(57) ABSTRACT

A method includes displaying a user interface including a plurality of application icons for launching application programs. The plurality of application icons include a first application icon displayed at a first size and a second application icon displayed at a second size, the first and second application icons arranged in a first arrangement. While displaying the user interface, detecting a set of one or more user inputs. In response to the set of one or more user inputs, rearranging the first and second application icons into a second arrangement, different than the first arrangement, where rearranging the first and second application icons includes displaying the first application icon at a third size, greater than the first size, and displaying the second application icon at a fourth size, greater than the second size.

24 Claims, 33 Drawing Sheets

Related U.S. Application Data continuation of application No. 14/641,287, filed on Mar. 6, 2015, now Pat. No. 10,114,521.

(60) Provisional application No. 62/044,987, filed on Sep. 2, 2014.

(51) Int. Cl.
*G06F 3/04842* (2022.01)
*G06F 3/0488* (2022.01)

(56) References Cited

U.S. PATENT DOCUMENTS

| | | | |
|---|---|---|---|
| 5,333,256 A | 7/1994 | Green et al. |
| 5,463,725 A | 10/1995 | Henckel et al. |
| 5,544,295 A | 8/1996 | Capps |
| 5,572,649 A | 11/1996 | Elliott et al. |
| 5,736,974 A | 4/1998 | Selker |
| 5,745,096 A | 4/1998 | Ludolph et al. |
| 5,943,039 A | 8/1999 | Anderson et al. |
| 5,960,366 A | 9/1999 | Duwaer |
| 5,973,694 A | 10/1999 | Steele et al. |
| 6,002,398 A | 12/1999 | Wilson |
| 6,005,579 A | 12/1999 | Sugiyama et al. |
| 6,043,816 A | 3/2000 | Williams et al. |
| 6,166,736 A | 12/2000 | Hugh |
| 6,215,490 B1 | 4/2001 | Kaply |
| 6,230,170 B1 | 5/2001 | Zellweger et al. |
| 6,310,633 B1 | 10/2001 | Graham et al. |
| 6,333,752 B1 | 12/2001 | Hasegawa et al. |
| 6,336,126 B1 | 1/2002 | Bjorklund et al. |
| 6,369,794 B1 | 4/2002 | Sakurai et al. |
| 6,462,757 B1 | 10/2002 | Kao et al. |
| 6,486,895 B1 | 11/2002 | Robertson et al. |
| 6,556,222 B1 | 4/2003 | Narayanaswami |
| 6,570,583 B1 | 5/2003 | Kung et al. |
| 6,609,146 B1 | 8/2003 | Slotznick et al. |
| 6,636,246 B1 | 10/2003 | Gallo et al. |
| 6,661,438 B1 | 12/2003 | Shiraishi et al. |
| 6,768,497 B2 | 7/2004 | Baar et al. |
| 6,809,724 B1 | 10/2004 | Shiraishi et al. |
| 6,900,793 B2 | 5/2005 | Goh et al. |
| 6,937,228 B2 | 8/2005 | Yu |
| 6,957,395 B1 | 10/2005 | Jobs et al. |
| 6,977,868 B2 | 12/2005 | Brewer et al. |
| 7,081,905 B1 | 7/2006 | Raghunath |
| 7,458,014 B1 | 11/2008 | Rubin et al. |
| 7,545,367 B2 | 6/2009 | Sunda et al. |
| 7,596,761 B2 | 9/2009 | Lemay et al. |
| 7,600,192 B1 | 10/2009 | Hashimoto et al. |
| 7,710,393 B2 | 5/2010 | Tsuk et al. |
| 7,716,603 B2 * | 5/2010 | Boyden ............ H04N 21/42204 |
| | | | 715/810 |
| 7,739,622 B2 | 6/2010 | Deline et al. |
| 7,814,112 B2 | 10/2010 | Gupta et al. |
| 7,954,056 B2 | 5/2011 | Graham |
| 7,956,847 B2 | 6/2011 | Christie |
| 7,965,276 B1 | 6/2011 | Martin et al. |
| 8,040,331 B2 | 10/2011 | Hill et al. |
| 8,046,705 B2 | 10/2011 | Hunleth et al. |
| 8,191,011 B2 | 5/2012 | Abanami et al. |
| 8,194,036 B1 | 6/2012 | Geiss et al. |
| 8,196,061 B1 | 6/2012 | Bhojan |
| 8,250,071 B1 | 8/2012 | Killalea et al. |
| 8,266,550 B1 | 9/2012 | Cleron et al. |
| 8,290,777 B1 | 10/2012 | Nguyen et al. |
| 8,427,432 B2 | 4/2013 | Kim et al. |
| 8,443,280 B2 | 5/2013 | Noyes |
| 8,487,882 B2 | 7/2013 | Inaba et al. |
| 8,499,236 B1 | 7/2013 | Keljo |
| 8,504,937 B2 | 8/2013 | Jobs et al. |
| 8,533,623 B2 | 9/2013 | St. Jacques |
| 8,549,429 B2 | 10/2013 | Tsuruta et al. |
| 8,566,700 B2 | 10/2013 | Ueda |
| 8,656,040 B1 | 2/2014 | Bajaj et al. |
| 8,669,945 B2 | 3/2014 | Coddington |
| 8,762,844 B2 | 6/2014 | Kim et al. |
| 8,782,513 B2 | 7/2014 | Migos et al. |
| 8,952,886 B2 | 2/2015 | Tsuk et al. |
| 9,176,652 B1 | 11/2015 | Patel et al. |
| 9,182,876 B2 | 11/2015 | Kim et al. |
| 9,189,089 B2 | 11/2015 | Sutton et al. |
| 9,229,624 B2 | 1/2016 | Wei et al. |
| 9,268,400 B2 | 2/2016 | Gomez Sainz-Garcia |
| 9,442,516 B2 | 9/2016 | Migos et al. |
| 9,448,691 B2 | 9/2016 | Suda |
| 9,552,015 B2 | 1/2017 | Capela et al. |
| D778,912 S | 2/2017 | Akana et al. |
| 9,582,187 B2 | 2/2017 | Gil et al. |
| 9,620,312 B2 | 4/2017 | Ely et al. |
| 9,870,114 B1 | 1/2018 | Jones et al. |
| D813,239 S | 3/2018 | Akana et al. |
| 9,921,711 B2 | 3/2018 | Oh et al. |
| 9,965,144 B2 | 5/2018 | Nakamura et al. |
| 10,019,097 B2 | 7/2018 | Ely et al. |
| 10,025,458 B2 | 7/2018 | Chaudhri et al. |
| 10,048,802 B2 | 8/2018 | Shedletsky et al. |
| 10,057,470 B2 | 8/2018 | Kim et al. |
| 10,133,439 B1 | 11/2018 | Brichter et al. |
| 10,175,652 B2 | 1/2019 | Ely et al. |
| 10,216,147 B2 | 2/2019 | Ely et al. |
| 10,222,909 B2 | 3/2019 | Shedletsky et al. |
| 10,275,117 B2 | 4/2019 | Zambetti et al. |
| D849,749 S | 5/2019 | Akana et al. |
| 10,296,125 B2 | 5/2019 | Ely et al. |
| 10,324,620 B2 | 6/2019 | Balaram |
| 10,331,081 B2 | 6/2019 | Ely et al. |
| 10,331,082 B2 | 6/2019 | Ely et al. |
| 10,664,074 B2 | 5/2020 | Moussette |
| 10,664,120 B1 | 5/2020 | Jones et al. |
| 10,852,700 B2 | 12/2020 | Abramov |
| 11,068,128 B2 | 7/2021 | Zambetti et al. |
| 2002/0010707 A1 | 1/2002 | Chang et al. |
| 2002/0075334 A1 | 6/2002 | Yfantis |
| 2002/0083101 A1 | 6/2002 | Card et al. |
| 2002/0101457 A1 | 8/2002 | Lang |
| 2002/0113802 A1 | 8/2002 | Card et al. |
| 2002/0118230 A1 | 8/2002 | Card et al. |
| 2002/0120651 A1 | 8/2002 | Pustejovsky et al. |
| 2002/0122072 A1 * | 9/2002 | Selker ................... G06F 3/0482 |
| | | | 715/834 |
| 2003/0020671 A1 | 1/2003 | Santoro et al. |
| 2003/0030673 A1 | 2/2003 | Ho |
| 2003/0076301 A1 | 4/2003 | Tsuk et al. |
| 2003/0076352 A1 | 4/2003 | Uhlig et al. |
| 2003/0098891 A1 | 5/2003 | Molander et al. |
| 2003/0103044 A1 | 6/2003 | Sunda et al. |
| 2003/0142288 A1 | 7/2003 | Kinrot et al. |
| 2003/0158927 A1 | 8/2003 | Sagey et al. |
| 2003/0184598 A1 | 10/2003 | Graham |
| 2004/0017404 A1 | 1/2004 | Schileru-Key |
| 2004/0061678 A1 | 4/2004 | Goh et al. |
| 2004/0073935 A1 | 4/2004 | Kang |
| 2004/0080531 A1 | 4/2004 | Berstis |
| 2004/0125081 A1 | 7/2004 | Hayakawa |
| 2004/0130581 A1 | 7/2004 | Howard et al. |
| 2004/0141016 A1 | 7/2004 | Fukatsu et al. |
| 2004/0205514 A1 | 10/2004 | Sommerer et al. |
| 2004/0230599 A1 | 11/2004 | Moore et al. |
| 2004/0239692 A1 | 12/2004 | Balle et al. |
| 2004/0252119 A1 | 12/2004 | Hunleth et al. |
| 2004/0264301 A1 | 12/2004 | Howard et al. |
| 2005/0116941 A1 | 6/2005 | Wallington et al. |
| 2005/0119031 A1 | 6/2005 | Spalink et al. |
| 2005/0132281 A1 | 6/2005 | Pan et al. |
| 2005/0209051 A1 | 9/2005 | Santomassimo et al. |
| 2005/0223068 A1 | 10/2005 | Shohfi et al. |
| 2005/0278757 A1 | 12/2005 | Grossman et al. |
| 2006/0028446 A1 | 2/2006 | Liberty et al. |
| 2006/0036962 A1 | 2/2006 | Jobs et al. |
| 2006/0064716 A1 | 3/2006 | Sull et al. |
| 2006/0101122 A1 | 5/2006 | Ishii |
| 2006/0143574 A1 | 6/2006 | Ito et al. |
| 2006/0150215 A1 | 7/2006 | Wroblewski et al. |

(56) References Cited

U.S. PATENT DOCUMENTS

| | | |
|---|---|---|
| 2006/0230346 A1 | 10/2006 | Bhogal et al. |
| 2006/0277486 A1 | 12/2006 | Skinner |
| 2007/0031119 A1 | 2/2007 | Iwanaga |
| 2007/0035513 A1 | 2/2007 | Sherrard et al. |
| 2007/0036346 A1 | 2/2007 | Kwon |
| 2007/0083828 A1 | 4/2007 | Toriyama et al. |
| 2007/0106949 A1 | 5/2007 | Narita et al. |
| 2007/0132733 A1 | 6/2007 | Ram |
| 2007/0157089 A1 | 7/2007 | Van Os et al. |
| 2007/0174761 A1 | 7/2007 | Lin et al. |
| 2007/0177804 A1 | 8/2007 | Elias et al. |
| 2007/0180379 A1 | 8/2007 | Osato et al. |
| 2007/0182999 A1 | 8/2007 | Anthony et al. |
| 2007/0211042 A1 | 9/2007 | Kim et al. |
| 2007/0229458 A1 | 10/2007 | Moon |
| 2007/0233736 A1 | 10/2007 | Xiong et al. |
| 2007/0236475 A1 | 10/2007 | Wherry |
| 2007/0236479 A1 | 10/2007 | Wang et al. |
| 2007/0237493 A1 | 10/2007 | Hall et al. |
| 2007/0239831 A1 | 10/2007 | Basu |
| 2007/0265929 A1* | 11/2007 | Danninger ............ G06F 16/954 705/26.1 |
| 2007/0277121 A1 | 11/2007 | Beckman |
| 2008/0052945 A1 | 3/2008 | Matas et al. |
| 2008/0062127 A1 | 3/2008 | Brodersen et al. |
| 2008/0066135 A1 | 3/2008 | Brodersen et al. |
| 2008/0094368 A1 | 4/2008 | Ording et al. |
| 2008/0134033 A1 | 6/2008 | Burns et al. |
| 2008/0141182 A1 | 6/2008 | Barsness et al. |
| 2008/0163119 A1 | 7/2008 | Kim et al. |
| 2008/0168073 A1 | 7/2008 | Siegel et al. |
| 2008/0168404 A1 | 7/2008 | Ording |
| 2008/0172634 A1 | 7/2008 | Choi et al. |
| 2008/0186808 A1 | 8/2008 | Lee |
| 2008/0201649 A1 | 8/2008 | Mattila et al. |
| 2008/0207281 A1 | 8/2008 | Tsuchiya et al. |
| 2008/0266407 A1 | 10/2008 | Battles et al. |
| 2008/0279475 A1 | 11/2008 | Lee et al. |
| 2008/0319944 A1 | 12/2008 | Venolia et al. |
| 2009/0007019 A1 | 1/2009 | Kobayashi et al. |
| 2009/0058821 A1* | 3/2009 | Chaudhri ............ G06F 3/04842 345/173 |
| 2009/0089712 A1 | 4/2009 | Sato |
| 2009/0098912 A1 | 4/2009 | Kim et al. |
| 2009/0103780 A1 | 4/2009 | Nishihara et al. |
| 2009/0113347 A1 | 4/2009 | Hess et al. |
| 2009/0138827 A1 | 5/2009 | Van Os et al. |
| 2009/0178008 A1* | 7/2009 | Herz ...................... G06F 3/0488 715/840 |
| 2009/0183100 A1 | 7/2009 | Eom et al. |
| 2009/0187825 A1 | 7/2009 | Sandquist et al. |
| 2009/0193359 A1 | 7/2009 | Anthony et al. |
| 2009/0199130 A1 | 8/2009 | Tsern et al. |
| 2009/0204920 A1 | 8/2009 | Beverley et al. |
| 2009/0228126 A1 | 9/2009 | Spielberg et al. |
| 2009/0235155 A1 | 9/2009 | Ueda |
| 2009/0235162 A1 | 9/2009 | Nuccio et al. |
| 2009/0241054 A1 | 9/2009 | Hendricks |
| 2009/0241150 A1 | 9/2009 | White et al. |
| 2009/0254867 A1 | 10/2009 | Farouki et al. |
| 2009/0259939 A1 | 10/2009 | Lockett et al. |
| 2009/0271381 A1 | 10/2009 | Beezer et al. |
| 2009/0293014 A1 | 11/2009 | Meuninck et al. |
| 2009/0315841 A1 | 12/2009 | Cheng et al. |
| 2009/0315867 A1 | 12/2009 | Sakamoto et al. |
| 2009/0319888 A1 | 12/2009 | Oygard |
| 2009/0319928 A1 | 12/2009 | Alphin et al. |
| 2009/0327955 A1 | 12/2009 | Mouilleseaux et al. |
| 2010/0023878 A1 | 1/2010 | Douris et al. |
| 2010/0023883 A1 | 1/2010 | Khazaka et al. |
| 2010/0026640 A1 | 2/2010 | Kim et al. |
| 2010/0029327 A1 | 2/2010 | Jee |
| 2010/0044121 A1 | 2/2010 | Simon et al. |
| 2010/0045616 A1 | 2/2010 | Li et al. |
| 2010/0066763 A1 | 3/2010 | Macdougall et al. |
| 2010/0070926 A1 | 3/2010 | Abanami et al. |
| 2010/0070931 A1* | 3/2010 | Nichols ................ G06F 3/0488 715/863 |
| 2010/0088634 A1 | 4/2010 | Tsuruta et al. |
| 2010/0107078 A1 | 4/2010 | Hayashi |
| 2010/0110044 A1 | 5/2010 | Englund |
| 2010/0125807 A1 | 5/2010 | Easterday et al. |
| 2010/0146387 A1 | 6/2010 | Hoover |
| 2010/0164908 A1 | 7/2010 | Hill et al. |
| 2010/0174606 A1 | 7/2010 | Hoyle |
| 2010/0175018 A1 | 7/2010 | Petschnigg et al. |
| 2010/0199232 A1 | 8/2010 | Mistry et al. |
| 2010/0211908 A1 | 8/2010 | Luk et al. |
| 2010/0211919 A1 | 8/2010 | Brown et al. |
| 2010/0214243 A1 | 8/2010 | Birnbaum et al. |
| 2010/0235742 A1 | 9/2010 | Hsu et al. |
| 2010/0241699 A1 | 9/2010 | Muthukumarasamy et al. |
| 2010/0241967 A1 | 9/2010 | Lee et al. |
| 2010/0242066 A1 | 9/2010 | Tseng et al. |
| 2010/0267424 A1 | 10/2010 | Kim et al. |
| 2010/0283743 A1 | 11/2010 | Coddington |
| 2010/0289217 A1 | 11/2010 | Lavie et al. |
| 2010/0333045 A1 | 12/2010 | Gueziec et al. |
| 2011/0007029 A1 | 1/2011 | Ben-David |
| 2011/0014956 A1 | 1/2011 | Lee et al. |
| 2011/0025624 A1 | 2/2011 | Goto |
| 2011/0041056 A1 | 2/2011 | Griffin et al. |
| 2011/0047491 A1 | 2/2011 | Hwang et al. |
| 2011/0055760 A1* | 3/2011 | Drayton ................ G06F 3/0482 715/834 |
| 2011/0074719 A1 | 3/2011 | Yeh et al. |
| 2011/0074824 A1 | 3/2011 | Srinivasan et al. |
| 2011/0087955 A1 | 4/2011 | Ho et al. |
| 2011/0091182 A1 | 4/2011 | Look et al. |
| 2011/0107241 A1 | 5/2011 | Moore |
| 2011/0126155 A1 | 5/2011 | Krishnaraj et al. |
| 2011/0141031 A1 | 6/2011 | Mccullough et al. |
| 2011/0145691 A1 | 6/2011 | Noyes |
| 2011/0145692 A1 | 6/2011 | Noyes et al. |
| 2011/0164042 A1 | 7/2011 | Chaudhri |
| 2011/0183613 A1 | 7/2011 | Nocera |
| 2011/0191710 A1 | 8/2011 | Jang et al. |
| 2011/0202834 A1 | 8/2011 | Mandryk et al. |
| 2011/0202859 A1 | 8/2011 | Fong |
| 2011/0202866 A1 | 8/2011 | Huang et al. |
| 2011/0209099 A1 | 8/2011 | Hinckley et al. |
| 2011/0209104 A1 | 8/2011 | Hinckley et al. |
| 2011/0227810 A1 | 9/2011 | Mckinney et al. |
| 2011/0248916 A1* | 10/2011 | Griffin .................. G06F 3/0416 345/157 |
| 2011/0252062 A1 | 10/2011 | Hanatani et al. |
| 2011/0252372 A1 | 10/2011 | Chaudhri |
| 2011/0252373 A1 | 10/2011 | Chaudhri |
| 2011/0252375 A1* | 10/2011 | Chaudhri .............. G06F 3/0486 715/835 |
| 2011/0261030 A1 | 10/2011 | Bullock |
| 2011/0295879 A1 | 12/2011 | Logis et al. |
| 2011/0296344 A1 | 12/2011 | Habib et al. |
| 2011/0302513 A1 | 12/2011 | Ademar et al. |
| 2011/0307842 A1 | 12/2011 | Chiang et al. |
| 2011/0316888 A1 | 12/2011 | Sachs et al. |
| 2012/0005622 A1 | 1/2012 | Park et al. |
| 2012/0023438 A1 | 1/2012 | Xia et al. |
| 2012/0023462 A1 | 1/2012 | Rosing et al. |
| 2012/0030627 A1 | 2/2012 | Nurmi et al. |
| 2012/0032988 A1 | 2/2012 | Katayama et al. |
| 2012/0062398 A1 | 3/2012 | Durand |
| 2012/0084644 A1 | 4/2012 | Robert et al. |
| 2012/0092383 A1 | 4/2012 | Hysek et al. |
| 2012/0096344 A1 | 4/2012 | Ho et al. |
| 2012/0102387 A1 | 4/2012 | Badoiu et al. |
| 2012/0121185 A1 | 5/2012 | Zavesky |
| 2012/0131470 A1 | 5/2012 | Wessling et al. |
| 2012/0133677 A1 | 5/2012 | Suzuki et al. |
| 2012/0147052 A1 | 6/2012 | Homma et al. |
| 2012/0155223 A1 | 6/2012 | Hoover |
| 2012/0159373 A1 | 6/2012 | Archer et al. |
| 2012/0159380 A1 | 6/2012 | Kocienda et al. |
| 2012/0162261 A1 | 6/2012 | Kim et al. |

(56) References Cited

U.S. PATENT DOCUMENTS

| | | |
|---|---|---|
| 2012/0166950 A1 | 6/2012 | Frumar et al. |
| 2012/0179970 A1 | 7/2012 | Hayes |
| 2012/0179998 A1 | 7/2012 | Nesladek et al. |
| 2012/0192068 A1 | 7/2012 | Migos et al. |
| 2012/0192102 A1 | 7/2012 | Migos et al. |
| 2012/0192110 A1 | 7/2012 | Wu et al. |
| 2012/0192118 A1 | 7/2012 | Migos et al. |
| 2012/0240085 A1 | 9/2012 | Sim et al. |
| 2012/0266093 A1 | 10/2012 | Park et al. |
| 2012/0274508 A1* | 11/2012 | Brown ............... A63B 24/0062 342/357.57 |
| 2012/0274550 A1 | 11/2012 | Campbell et al. |
| 2012/0278745 A1 | 11/2012 | Kim et al. |
| 2012/0280908 A1 | 11/2012 | Rhoads et al. |
| 2012/0284012 A1 | 11/2012 | Rodriguez et al. |
| 2012/0284674 A1 | 11/2012 | Geng et al. |
| 2012/0297342 A1 | 11/2012 | Jang et al. |
| 2012/0304084 A1* | 11/2012 | Kim ...................... G06F 3/0488 715/762 |
| 2012/0324384 A1* | 12/2012 | Cohen .................... G06F 9/451 715/765 |
| 2012/0324390 A1 | 12/2012 | Tao et al. |
| 2012/0327006 A1 | 12/2012 | Israr et al. |
| 2013/0019182 A1 | 1/2013 | Gil et al. |
| 2013/0024811 A1 | 1/2013 | Gleadall et al. |
| 2013/0038636 A1 | 2/2013 | Fujiwaka |
| 2013/0050109 A1 | 2/2013 | Ban |
| 2013/0055160 A1 | 2/2013 | Yamada et al. |
| 2013/0061175 A1 | 3/2013 | Matas et al. |
| 2013/0073932 A1 | 3/2013 | Migos et al. |
| 2013/0076774 A1 | 3/2013 | Yu et al. |
| 2013/0097566 A1 | 4/2013 | Berglund |
| 2013/0111342 A1 | 5/2013 | Alameh et al. |
| 2013/0111384 A1 | 5/2013 | Kim et al. |
| 2013/0117689 A1 | 5/2013 | Lessing et al. |
| 2013/0117698 A1 | 5/2013 | Park et al. |
| 2013/0127850 A1 | 5/2013 | Bindon |
| 2013/0135228 A1 | 5/2013 | Won et al. |
| 2013/0135234 A1 | 5/2013 | Hisano et al. |
| 2013/0135236 A1 | 5/2013 | Yano |
| 2013/0139102 A1 | 5/2013 | Miura et al. |
| 2013/0142016 A1 | 6/2013 | Pozzo Di Borgo et al. |
| 2013/0145316 A1 | 6/2013 | Heo |
| 2013/0147747 A1 | 6/2013 | Takagi |
| 2013/0152017 A1 | 6/2013 | Song et al. |
| 2013/0154933 A1 | 6/2013 | Sheik-Nainar |
| 2013/0185648 A1* | 7/2013 | Kim ........................ G06F 3/048 715/744 |
| 2013/0205244 A1 | 8/2013 | Decker et al. |
| 2013/0208013 A1 | 8/2013 | Yuu et al. |
| 2013/0226444 A1 | 8/2013 | Johansson et al. |
| 2013/0262564 A1 | 10/2013 | Wall et al. |
| 2013/0275918 A1 | 10/2013 | Antonini et al. |
| 2013/0305187 A1 | 11/2013 | Phillips et al. |
| 2013/0311954 A1 | 11/2013 | Minkkinen et al. |
| 2013/0332886 A1 | 12/2013 | Cranfill et al. |
| 2013/0342457 A1 | 12/2013 | Cox et al. |
| 2014/0028554 A1 | 1/2014 | De Los Reyes et al. |
| 2014/0075368 A1 | 3/2014 | Kim et al. |
| 2014/0098102 A1 | 4/2014 | Raffle et al. |
| 2014/0143737 A1 | 5/2014 | Mistry et al. |
| 2014/0160078 A1 | 6/2014 | Seo et al. |
| 2014/0165006 A1* | 6/2014 | Chaudhri ............... H04N 7/147 715/835 |
| 2014/0215457 A1 | 7/2014 | Gava et al. |
| 2014/0237402 A1* | 8/2014 | Pang ...................... G06F 3/0482 715/765 |
| 2014/0248590 A1* | 9/2014 | McCormick ............ G09B 5/06 434/157 |
| 2014/0282214 A1* | 9/2014 | Shirzadi ................. G06F 3/0481 715/781 |
| 2014/0289659 A1 | 9/2014 | Harrison et al. |
| 2014/0328147 A1 | 11/2014 | Yang et al. |
| 2014/0344700 A1 | 11/2014 | Jenkins et al. |
| 2014/0359602 A1* | 12/2014 | Sawaya .................. G06F 8/62 717/176 |
| 2015/0026615 A1 | 1/2015 | Choi et al. |
| 2015/0046871 A1 | 2/2015 | Lewis |
| 2015/0065821 A1 | 3/2015 | Conrad |
| 2015/0067555 A1 | 3/2015 | Joo et al. |
| 2015/0085621 A1 | 3/2015 | Hong et al. |
| 2015/0121224 A1 | 4/2015 | Krasnahill, Jr. |
| 2015/0199110 A1 | 7/2015 | Nakazato |
| 2015/0234518 A1 | 8/2015 | Teller et al. |
| 2015/0242989 A1 | 8/2015 | Lee et al. |
| 2015/0261412 A1* | 9/2015 | Guillama ............... G06F 3/0482 715/835 |
| 2015/0281945 A1 | 10/2015 | Seo et al. |
| 2015/0378555 A1 | 12/2015 | Ramanathan et al. |
| 2015/0378569 A1* | 12/2015 | Sato ...................... G06F 3/0486 715/765 |
| 2016/0011758 A1 | 1/2016 | Meggs et al. |
| 2016/0034153 A1 | 2/2016 | Lejeune et al. |
| 2016/0034167 A1 | 2/2016 | Wilson et al. |
| 2016/0048296 A1 | 2/2016 | Gan et al. |
| 2016/0054710 A1 | 2/2016 | Jo et al. |
| 2016/0062571 A1 | 3/2016 | Dascola et al. |
| 2016/0062572 A1 | 3/2016 | Yang et al. |
| 2016/0062573 A1 | 3/2016 | Dascola et al. |
| 2016/0062598 A1 | 3/2016 | Kocienda et al. |
| 2016/0077495 A1 | 3/2016 | Brown et al. |
| 2016/0092063 A1 | 3/2016 | Lee |
| 2016/0117141 A1 | 4/2016 | Ro et al. |
| 2016/0124626 A1 | 5/2016 | Lee et al. |
| 2016/0162164 A1 | 6/2016 | Phillips et al. |
| 2016/0170436 A1 | 6/2016 | Farrar et al. |
| 2016/0170598 A1 | 6/2016 | Zambetti et al. |
| 2016/0170608 A1 | 6/2016 | Zambetti et al. |
| 2016/0202866 A1 | 7/2016 | Zambetti |
| 2016/0209939 A1 | 7/2016 | Zambetti et al. |
| 2016/0231883 A1 | 8/2016 | Zambetti |
| 2016/0327911 A1 | 11/2016 | Eim et al. |
| 2017/0010678 A1 | 1/2017 | Tuli |
| 2017/0010751 A1 | 1/2017 | Shedletsky et al. |
| 2017/0089735 A1 | 3/2017 | Ruh |
| 2017/0104902 A1 | 4/2017 | Kim et al. |
| 2017/0149795 A1 | 5/2017 | Day, II |
| 2017/0208466 A1 | 7/2017 | Seo et al. |
| 2017/0230236 A1 | 8/2017 | Kim et al. |
| 2017/0255169 A1 | 9/2017 | Lee et al. |
| 2017/0269692 A1 | 9/2017 | Eck et al. |
| 2017/0322711 A1 | 11/2017 | Robinson et al. |
| 2017/0331901 A1 | 11/2017 | Sarlandie De La Robertie et al. |
| 2017/0357426 A1 | 12/2017 | Wilson et al. |
| 2018/0024683 A1 | 1/2018 | Ely et al. |
| 2018/0081453 A1 | 3/2018 | Ely |
| 2018/0218636 A1 | 8/2018 | Alaouf et al. |
| 2018/0307363 A1 | 10/2018 | Ely et al. |
| 2018/0335891 A1 | 11/2018 | Shedletsky et al. |
| 2018/0349583 A1 | 12/2018 | Turgeman et al. |
| 2018/0364815 A1 | 12/2018 | Moussette et al. |
| 2019/0012063 A1 | 1/2019 | Kocienda et al. |
| 2019/0028865 A1 | 1/2019 | Raleigh et al. |
| 2019/0056700 A1 | 2/2019 | Matsuno et al. |
| 2019/0072912 A1 | 3/2019 | Pandya et al. |
| 2019/0080072 A1 | 3/2019 | Van Os et al. |
| 2019/0101870 A1 | 4/2019 | Pandya et al. |
| 2019/0163324 A1 | 5/2019 | Shedletsky et al. |
| 2019/0212885 A1 | 7/2019 | Zambetti et al. |
| 2019/0347181 A1 | 11/2019 | Cranfill et al. |
| 2020/0067245 A1 | 2/2020 | Maley |
| 2020/0167047 A1 | 5/2020 | Dascola et al. |
| 2020/0272293 A1 | 8/2020 | Zambetti et al. |
| 2020/0333945 A1 | 10/2020 | Wilson et al. |
| 2020/0393957 A1 | 12/2020 | Wilson et al. |
| 2021/0055697 A1 | 2/2021 | Abramov |
| 2021/0110014 A1 | 4/2021 | Turgeman et al. |
| 2021/0311438 A1 | 10/2021 | Wilson et al. |
| 2022/0083183 A1 | 3/2022 | Patton |
| 2022/0101719 A1 | 3/2022 | Bojic et al. |
| 2022/0391056 A1 | 12/2022 | Dalonzo et al. |

(56) References Cited

U.S. PATENT DOCUMENTS

| | | | |
|---|---|---|---|
| 2023/0024225 | A1 | 1/2023 | Zambetti et al. |
| 2023/0049771 | A1 | 2/2023 | Dascola et al. |

FOREIGN PATENT DOCUMENTS

| | | | |
|---|---|---|---|
| CN | 1811899 | A | 8/2006 |
| CN | 101202866 | A | 6/2008 |
| CN | 101356493 | A | 1/2009 |
| CN | 101390038 | A | 3/2009 |
| CN | 101535938 | A | 9/2009 |
| CN | 101611374 | A | 12/2009 |
| CN | 101627349 | A | 1/2010 |
| CN | 101770331 | A | 7/2010 |
| CN | 101776968 | A | 7/2010 |
| CN | 101796478 | A | 8/2010 |
| CN | 101876877 | A | 11/2010 |
| CN | 101893992 | A | 11/2010 |
| CN | 102033710 | A | 4/2011 |
| CN | 102037436 | A | 4/2011 |
| CN | 102112946 | A | 6/2011 |
| CN | 102138120 | A | 7/2011 |
| CN | 102479027 | A | 5/2012 |
| CN | 102479053 | A | 5/2012 |
| CN | 102812426 | A | 12/2012 |
| CN | 103076942 | A | 5/2013 |
| CN | 103547987 | A | 1/2014 |
| CN | 103713848 | A | 4/2014 |
| CN | 103777842 | A | 5/2014 |
| CN | 103782252 | A | 5/2014 |
| CN | 103870282 | A | 6/2014 |
| CN | 103995647 | A | 8/2014 |
| CN | 103995724 | A | 8/2014 |
| CN | 104471532 | A | 3/2015 |
| EP | 1406158 | A2 | 4/2004 |
| EP | 1517228 | A2 | 3/2005 |
| EP | 1571538 | A1 | 9/2005 |
| EP | 1944677 | A2 | 7/2008 |
| EP | 1959337 | A2 | 8/2008 |
| EP | 2151745 | A2 | 2/2010 |
| EP | 2194452 | A1 | 6/2010 |
| EP | 2302493 | A2 | 3/2011 |
| EP | 2525282 | A2 | 11/2012 |
| EP | 2551784 | A1 | 1/2013 |
| EP | 2565767 | A1 | 3/2013 |
| EP | 2565769 | A2 | 3/2013 |
| EP | 2610738 | A2 | 7/2013 |
| EP | 2741176 | A2 | 6/2014 |
| EP | 2911377 | A1 | 8/2015 |
| GB | 2489580 | A | 10/2012 |
| JP | 6-110881 | A | 4/1994 |
| JP | 7-325700 | A | 12/1995 |
| JP | 8-76926 | A | 3/1996 |
| JP | 10-240488 | A | 9/1998 |
| JP | 2000-40158 | A | 2/2000 |
| JP | 2000-242390 | A | 9/2000 |
| JP | 2001-101202 | A | 4/2001 |
| JP | 2001-202170 | A | 7/2001 |
| JP | 2001-202178 | A | 7/2001 |
| JP | 2003-195998 | A | 7/2003 |
| JP | 2003-526820 | A | 9/2003 |
| JP | 2004-21522 | A | 1/2004 |
| JP | 2005-45744 | A | 2/2005 |
| JP | 2006-140990 | A | 6/2006 |
| JP | 2006-185273 | A | 7/2006 |
| JP | 2007-512635 | A | 5/2007 |
| JP | 2007-170995 | A | 7/2007 |
| JP | 2007-179544 | A | 7/2007 |
| JP | 2008-276801 | A | 11/2008 |
| JP | 2009-80710 | A | 4/2009 |
| JP | 2009-246553 | A | 10/2009 |
| JP | 2009-265793 | A | 11/2009 |
| JP | 2010-97353 | A | 4/2010 |
| JP | 2010-511939 | A | 4/2010 |
| JP | 2010-522935 | A | 7/2010 |
| JP | 2012-58979 | A | 3/2012 |
| JP | 2012-155698 | A | 8/2012 |
| JP | 2012-252384 | A | 12/2012 |
| JP | 2013-137750 | A | 7/2013 |
| JP | 2013-164700 | A | 8/2013 |
| KR | 10-2010-0003589 | A | 1/2010 |
| KR | 10-2010-0019887 | A | 2/2010 |
| KR | 10-2010-0109277 | A | 10/2010 |
| KR | 10-2011-0093090 | A | 8/2011 |
| KR | 10-2012-0071468 | A | 7/2012 |
| KR | 10-2012-0079707 | A | 7/2012 |
| KR | 10-2013-0052751 | A | 5/2013 |
| KR | 10-2015-0022599 | A | 3/2015 |
| TW | 201027419 | A | 7/2010 |
| TW | 201119339 | A | 6/2011 |
| TW | I405106 | B | 8/2013 |
| TW | 201403406 | A | 1/2014 |
| TW | 201426492 | A | 7/2014 |
| TW | 201432552 | A | 8/2014 |
| WO | 2005/055034 | A1 | 6/2005 |
| WO | 2006/037545 | A2 | 4/2006 |
| WO | 2007/002621 | A2 | 1/2007 |
| WO | 2008/030779 | A2 | 3/2008 |
| WO | 2008/030879 | A2 | 3/2008 |
| WO | 2008/067498 | A2 | 6/2008 |
| WO | 2008/090902 | A1 | 7/2008 |
| WO | 2008/099251 | A1 | 8/2008 |
| WO | 2008/106777 | A1 | 9/2008 |
| WO | 2009/084368 | A1 | 7/2009 |
| WO | 2009/089222 | A2 | 7/2009 |
| WO | 2010/134729 | A2 | 11/2010 |
| WO | 2012/103117 | A1 | 8/2012 |
| WO | 2012/129359 | A1 | 9/2012 |
| WO | 2013/149055 | A1 | 10/2013 |
| WO | 2014/058816 | A1 | 4/2014 |
| WO | 2014/105276 | A1 | 7/2014 |

OTHER PUBLICATIONS

Advisory Action received for U.S. Appl. No. 11/069,977, dated Aug. 6, 2012, 3 pages.
Advisory Action received for U.S. Appl. No. 11/069,977, dated May 13, 2009, 2 pages.
Advisory Action received for U.S. Appl. No. 11/069,977, dated May 26, 2011, 3 pages.
Advisory Action received for U.S. Appl. No. 13/077,850, dated Apr. 24, 2014, 3 pages.
Advisory Action received for U.S. Appl. No. 13/077,855, dated Jun. 15, 2016, 4 pages.
Advisory Action received for U.S. Appl. No. 13/077,862, dated Apr. 7, 2016, 3 pages.
Advisory Action received for U.S. Appl. No. 13/077,874, dated Aug. 19, 2016, 3 pages.
Advisory Action received for U.S. Appl. No. 14/839,912, dated Nov. 14, 2019, 6 pages.
Advisory Action received for U.S. Appl. No. 14/913,349, dated Oct. 29, 2019, 4 pages.
Advisory Action received for U.S. Appl. No. 15/049,052, dated Sep. 11, 2017, 2 pages.
Agarwal Deepesh, "DexClock—Live Clock and Date Blended Into Beautiful Artwork as Your Desktop Wallpaper", Available at: https://www.megaleecher.net/DexCiock_Wallpaper_Designs, Jul. 6, 2013, 4 pages.
Appeal Decision received for U.S. Appl. No. 13/077,862, mailed on Mar. 22, 2019, 10 pages.
Apple, "iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.
Appleltouchreviews, ""The Best Cydia Tweak for Your iPhone, iPod Touch & iPad-Iconoclasm"", Available online at: https://www.youtube.com/watch?v=EhriZRINufQ, Apr. 23, 2011, 2 pages.
Applicant Initiated Interview Summary received for U.S. Appl. No. 14/839,912, dated Nov. 5, 2019, 5 pages.
Applicant Initiated Interview Summary received for U.S. Appl. No. 14/913,349, dated Oct. 7, 2019, 4 pages.

(56) References Cited

OTHER PUBLICATIONS

Applicant-Initiated Interview Summary received for U.S. Appl. No. 15/418,537, dated Dec. 23, 2019, 6 pages.
Applicant-Initiated Interview Summary received for U.S. Appl. No. 15/930,300, dated Oct. 27, 2020, 3 pages.
Applicant-Initiated Interview Summary received for U.S. Appl. No. 16/130,838, dated Apr. 19, 2021, 5 pages.
Applicant-Initiated Interview Summary received for U.S. Appl. No. 16/130,838, dated Jul. 20, 2020, 6 pages.
Applicant-Initiated Interview Summary received for U.S. Appl. No. 16/130,838, dated Mar. 26, 2020, 8 pages.
Applicant-Initiated Interview Summary received for U.S. Appl. No. 16/775,528, dated Feb. 23, 2021, 4 pages.
Askabouttech, "How to Change Android Smartwatch Wallpaper", also online available at: https://www.youtube.com/watch?v=SBYrsyuHqBA (Year: 2014), Jul. 12, 2014, 5 pages.
Baidu Experience, "iPhone how to move icon", Online available at: https://jingyan.baidu.com/article/eb9f7b6da4eacb869264e84f.html, Apr. 28, 2014, 4 pages.
Certificate of Examination received for Australian Patent Application No. 2017101561, dated Jun. 25, 2018, 2 pages.
Certificate of Examination received for Australian Patent Application No. 2018101076, dated Apr. 11, 2019, 2 pages.
Corrected Notice of Allowance received for U.S. Appl. No. 13/077,874, dated Dec. 9, 2016, 2 pages.
Corrected Notice of Allowance received for U.S. Appl. No. 14/641,287, dated Aug. 9, 2018, 2 pages.
Corrected Notice of Allowance received for U.S. Appl. No. 14/641,287, dated Sep. 12, 2018, 2 pages.
Corrected Notice of Allowance received for U.S. Appl. No. 15/930,300, dated Dec. 24, 2020, 3 pages.
Cuyamaca LRC Computer Labs, "Topics in CommonSpace Application", Available at: http://www.cuyamaca.net/librarylab/Technical%20Help/cmspace.asp, Retrieved on May 19, 2014, 16 pages.
Decision on Appeal received for Korean Patent Application No. 10-2016-7008449, mailed on Jul. 30, 2019, 29 pages.
Decision on Appeal received for Korean Patent Application No. 10-2018-7010872, mailed on Jan. 20, 2020, 20 pages.
Decision to Grant received for Danish Patent Application No. PA201570781, dated Jul. 17, 2017, 2 pages.
Decision to Grant received for Danish Patent Application No. PA201670117, dated Nov. 20, 2017, 2 pages.
Decision to Grant received for Danish Patent Application No. PA201770794, dated Nov. 11, 2019, 2 pages.
Decision to Grant received for European Patent Application No. 12704175.4, dated Jul. 19, 2018, 2 pages.
Decision to Grant received for European Patent Application No. 14772001.5, dated Dec. 5, 2019, 2 pages.
Decision to Grant received for European Patent Application No. 19199004.3, dated Jan. 21, 2021, 2 pages.
Esther, "Instructions for Kobo Books: How to change to scrolling mode and do table of contents navigation—Google Groups", XP055513050, Retrieved from the Internet: URL:https://groups.google.com/forum/print/msg/viphone/-dkqODh_31N8acJK2dGPe8J?ctz=4607561_ 48_52_123900_ 48_ 436380 [retrieved on Oct. 5, 2018], Aug. 28, 2010, 3 pages.
European Search Report received for European Patent Application No. 19199004.3, dated Nov. 12, 2019, 6 pages.
European Search Report received for European Patent Application No. 20217518.8, dated Apr. 16, 2021, 4 pages.
Examiner-Initiated Interview Summary received for U.S. Appl. No. 14/913,349, dated Oct. 20, 2020, 3 pages.
Extended European Search Report received for European Patent Application No. 17810739.7, dated Mar. 22, 2019, 9 pages.
Extended European Search Report received for European Patent Application No. 18185408.4, dated Oct. 17, 2018, 10 pages.
Final Office Action received for U.S. Appl. No. 09/477,419, dated Aug. 15, 2002, 13 pages.
Final Office Action received for U.S. Appl. No. 11/069,977, dated Feb. 3, 2009, 12 pages.
Final Office Action received for U.S. Appl. No. 11/069,977, dated Mar. 10, 2011, 18 pages.
Final Office Action received for U.S. Appl. No. 11/069,977, dated Mar. 11, 2010, 17 pages.
Final Office Action received for U.S. Appl. No. 11/069,977, dated Mar. 29, 2012, 19 pages.
Final Office Action received for U.S. Appl. No. 13/077,850, dated Nov. 7, 2013, 14 pages.
Final Office Action received for U.S. Appl. No. 13/077,855, dated Mar. 17, 2014, 11 pages.
Final Office Action received for U.S. Appl. No. 13/077,855, dated Mar. 24, 2016, 19 pages.
Final Office Action received for U.S. Appl. No. 13/077,855, dated Nov. 7, 2013, 14 pages.
Final Office Action received for U.S. Appl. No. 13/077,862, dated Nov. 8, 2013, 15 pages.
Final Office Action received for U.S. Appl. No. 13/077,862, dated Oct. 22, 2015, 16 pages.
Final Office Action received for U.S. Appl. No. 13/077,867, dated May 23, 2013, 10 pages.
Final Office Action received for U.S. Appl. No. 13/077,874, dated Dec. 3, 2014, 23 pages.
Final Office Action received for U.S. Appl. No. 13/077,874, dated May 5, 2016, 26 pages.
Final Office Action received for U.S. Appl. No. 14/641,287, dated Jul. 20, 2017, 18 pages.
Final Office Action received for U.S. Appl. No. 14/839,912, dated Jul. 30, 2019, 42 pages.
Final Office Action received for U.S. Appl. No. 14/839,912, dated Sep. 13, 2018, 31 pages.
Final Office Action received for U.S. Appl. No. 14/913,349, dated Jul. 22, 2019, 20 pages.
Final Office Action received for U.S. Appl. No. 14/913,349, dated Jul. 30, 2018, 18 pages.
Final Office Action received for U.S. Appl. No. 14/913,349, dated Oct. 30, 2020, 33 pages.
Final Office Action received for U.S. Appl. No. 15/049,052, dated Mar. 1, 2018, 15 pages.
Final Office Action received for U.S. Appl. No. 15/049,052, dated May 17, 2017, 13 pages.
Final Office Action received for U.S. Appl. No. 15/049,052, dated Oct. 2, 2018, 16 pages.
Final Office Action received for U.S. Appl. No. 15/418,537, dated Sep. 23, 2019, 53 pages.
Final Office Action received for U.S. Appl. No. 16/130,838, dated May 29, 2020, 25 pages.
Final Office Action received for U.S. Appl. No. 16/775,528, dated May 25, 2021, 15 pages.
"How to move and arrange icons on iPhone", Available online on: "https://www.youtube.com/watch?v=5XKAk4wSons", Retrieved on Sep. 10, 2015, Dec. 11, 2011, 1 page.
Intention to Grant received for Danish Patent Application No. PA201570781, dated Dec. 8, 2016, 2 pages.
Intention to Grant received for Danish Patent Application No. PA201670117, dated Apr. 21, 2017, 2 pages.
Intention to Grant received for Danish Patent Application No. PA201770794, dated Aug. 15, 2019, 2 pages.
Intention to Grant received for European Patent Application No. 12704175.4, dated Mar. 22, 2018, 8 pages.
Intention to Grant received for European Patent Application No. 14772001.5, dated Jul. 18, 2019, 16 pages.
Intention to Grant received for European Patent Application No. 14772001.5, dated Mar. 22, 2019, 17 pages.
Intention to Grant received for European Patent Application No. 19199004.3, dated Sep. 14, 2020, 9 pages.
International Preliminary Report on Patentability received for PCT Patent Application No. PCT/US2012/022401, dated Aug. 8, 2013, 12 pages.
International Preliminary Report on Patentability received for PCT Patent Application No. PCT/US2014/053957, dated Mar. 17, 2016, 8 pages.

(56) References Cited

OTHER PUBLICATIONS

International Preliminary Report on Patentability received for PCT Patent Application No. PCT/US2015/019303, dated Mar. 16, 2017, 22 pages.
International Preliminary Report on Patentability received for PCT Patent Application No. PCT/US2015/047704, dated Mar. 16, 2017, 19 pages.
International Preliminary Report on Patentability received for PCT Patent Application No. PCT/US2017/035331, dated Dec. 20, 2018, 13 pages.
International Search Report and Written Opinion received for PCT Patent Application No. PCT/US2012/022401, dated Jul. 6, 2012, 16 pages.
International Search Report and Written Opinion received for PCT Patent Application No. PCT/US2014/053957, dated Feb. 19, 2015, 11 pages.
International Search Report and Written Opinion received for PCT Patent Application No. PCT/US2015/019303, dated Sep. 28, 2015, 27 pages.
International Search Report and Written Opinion received for PCT Patent Application No. PCT/US2015/047704, dated Feb. 22, 2016, 25 pages.
International Search Report and Written Opinion received for PCT Patent Application No. PCT/US2017/035331, dated Oct. 6, 2017, 18 pages.
Invitation to Pay Additional Fee received for PCT Patent Application No. PCT/US2017/035331, dated Aug. 7, 2017, 4 pages.
Invitation to Pay Additional Fees received for PCT Patent Application No. PCT/US2012/022401, dated May 4, 2012, 8 pages.
Invitation to Pay Additional Fees received for PCT Patent Application No. PCT/US2015/047704, dated Dec. 16, 2015, 10 pages.
Ldinos, "Bejeweled Blitz—PC Game", Online available at: https://www.youtube.com/watch?v=8-p3FAxjKTs, Apr. 7, 2010, 1 page.
Non-Final Office Action received for U.S. Appl. No. 09/477,419, dated Apr. 17, 2002, 10 pages.
Non-Final Office Action received for U.S. Appl. No. 09/477,419, dated Apr. 22, 2003, 13 pages.
Non-Final Office Action received for U.S. Appl. No. 11/069,977, dated Aug. 9, 2011, 18 pages.
Non-Final Office Action received for U.S. Appl. No. 11/069,977, dated Jul. 31, 2009, 13 pages.
Non-Final Office Action received for U.S. Appl. No. 11/069,977, dated Oct. 4, 2010, 15 pages.
Non-Final Office Action received for U.S. Appl. No. 11/069,977, dated Sep. 19, 2008, 12 pages.
Non-Final Office Action received for U.S. Appl. No. 13/077,850, dated Mar. 28, 2013, 15 pages.
Non-Final Office Action received for U.S. Appl. No. 13/077,850, dated Sep. 10, 2015, 14 pages.
Non-Final Office Action received for U.S. Appl. No. 13/077,855, dated Aug. 13, 2015, 13 pages.
Non-Final Office Action received for U.S. Appl. No. 13/077,855, dated Mar. 28, 2013, 15 pages.
Non-Final Office Action received for U.S. Appl. No. 13/077,862, dated Dec. 29, 2014, 11 pages.
Non-Final Office Action received for U.S. Appl. No. 13/077,862, dated Jul. 17, 2020, 20 pages.
Non-Final Office Action received for U.S. Appl. No. 13/077,862, dated Mar. 15, 2013, 10 pages.
Non-Final Office Action received for U.S. Appl. No. 13/077,862, dated Nov. 21, 2019, 18 pages.
Non-Final Office Action received for U.S. Appl. No. 13/077,867, dated Dec. 21, 2012, 9 pages.
Non-Final Office Action received for U.S. Appl. No. 13/077,867, dated Jul. 20, 2012, 10 pages.
Non-Final Office Action received for U.S. Appl. No. 13/077,874, dated Dec. 3, 2015, 23 pages.
Non-Final Office Action received for U.S. Appl. No. 13/077,874, dated Jun. 19, 2014, 15 pages.
Non-Final Office Action received for U.S. Appl. No. 14/641,287, dated Feb. 27, 2017, 18 pages.
Non-Final Office Action received for U.S. Appl. No. 14/839,912, dated Feb. 12, 2018, 30 pages.
Non-Final Office Action received for U.S. Appl. No. 14/839,912, dated Feb. 26, 2019, 36 pages.
Non-Final Office Action received for U.S. Appl. No. 14/839,914, dated Oct. 19, 2017, 46 pages.
Non-Final Office Action received for U.S. Appl. No. 14/913,349, dated Apr. 2, 2019, 15 pages.
Non-Final Office Action received for U.S. Appl. No. 14/913,349, dated Apr. 22, 2020, 20 pages.
Non-Final Office Action received for U.S. Appl. No. 14/913,349, dated Jan. 2, 2020, 25 pages.
Non-Final Office Action received for U.S. Appl. No. 14/913,349, dated Jan. 11, 2018, 6 pages.
Non-Final Office Action received for U.S. Appl. No. 15/049,052, dated May 31, 2018, 15 pages.
Non-Final Office Action received for U.S. Appl. No. 15/049,052, dated Nov. 29, 2016, 13 pages.
Non-Final Office Action received for U.S. Appl. No. 15/049,052, dated Sep. 21, 2017, 14 pages.
Non-Final Office Action received for U.S. Appl. No. 15/418,537, dated Dec. 13, 2018, 53 pages.
Non-Final Office Action received for U.S. Appl. No. 16/130,838, dated Dec. 31, 2020, 29 pages.
Non-Final Office Action received for U.S. Appl. No. 16/130,838, dated Jan. 7, 2020, 16 pages.
Non-Final Office Action received for U.S. Appl. No. 16/775,528, dated Nov. 20, 2020, 15 pages.
Non-Final Office Action received for U.S. Appl. No. 14/839,912, dated Jun. 8, 2017, 26 pages.
Notice of Acceptance received for Australian Patent Application No. 2012209199, dated Jan. 27, 2016, 3 pages.
Notice of Acceptance received for Australian Patent Application No. 2014315324, dated Sep. 28, 2017, 3 pages.
Notice of Acceptance received for Australian Patent Application No. 2017276285, dated Apr. 3, 2019, 3 pages.
Notice of Acceptance received for Australian Patent Application No. 2017277851, dated Dec. 9, 2019, 3 pages.
Notice of Acceptance received for Australian Patent Application No. 2019206101, dated Dec. 11, 2020, 3 pages.
Notice of Acceptance received for Australian Patent Application No. 2020201723, dated May 6, 2021, 3 pages.
Notice of Allowance received for Australian Patent Application No. 2016202837, dated Apr. 21, 2017, 3 pages.
Notice of Allowance received for Chinese Patent Application No. 201280006317.5, dated Feb. 17, 2017, 2 pages.
Notice of Allowance received for Chinese Patent Application No. 201480060044.1, dated Mar. 29, 2019, 3 pages.
Notice of Allowance received for Chinese Patent Application No. 201580046331.1, dated Jun. 24, 2020, 4 pages.
Notice of Allowance received for Chinese Patent Application No. 201710240907.9, dated Nov. 25, 2019, 2 pages.
Notice of Allowance received for Danish Patent Application No. PA201570776, dated Feb. 8, 2017, 2 pages.
Notice of Allowance received for Japanese Patent Application No. 2016-130565, dated Aug. 28, 2017, 3 pages.
Notice of Allowance received for Japanese Patent Application No. 2016-537946, dated Mar. 26, 2018, 4 pages.
Notice of Allowance received for Japanese Patent Application No. 2018-083313, dated Jul. 1, 2019, 4 pages.
Notice of Allowance received for Korean Patent Application No. 10-2013-7022057, dated Apr. 27, 2015, 2 pages.
Notice of Allowance received for Korean Patent Application No. 10-2014-7033660, dated Sep. 25, 2015, 3 pages.
Notice of Allowance received for Korean Patent Application No. 10-2015-7013849, dated Mar. 28, 2016, 3 pages.
Notice of Allowance received for Korean Patent Application No. 10-2016-7008449, dated Aug. 9, 2019, 6 pages.
Notice of Allowance received for Korean Patent Application No. 10-2016-7017508, dated Apr. 27, 2017, 3 pages.

(56) References Cited

OTHER PUBLICATIONS

Notice of Allowance received for Korean Patent Application No. 10-2018-7010872, dated Feb. 10, 2020, 6 pages.
Notice of Allowance received for Korean Patent Application No. 10-2019-7007748, dated May 6, 2020, 5 pages.
Notice of Allowance received for Korean Patent Application No. 10-2020-7022802, dated Mar. 4, 2021, 6 pages.
Notice of Allowance received for Taiwanese Patent Application No. 103130517, dated May 14, 2018, 5 pages.
Notice of Allowance received for Taiwanese Patent Application No. 104107317, dated Oct. 18, 2017, 7 pages.
Notice of Allowance received for U.S. Appl. No. 09/477,419, dated May 19, 2005, 5 pages.
Notice of Allowance received for U.S. Appl. No. 11/069,977, dated Apr. 8, 2013, 16 pages.
Notice of Allowance received for U.S. Appl. No. 11/069,977, dated May 15, 2013, 13 pages.
Notice of Allowance received for U.S. Appl. No. 13/077,850, dated May 5, 2016, 15 pages.
Notice of Allowance received for U.S. Appl. No. 13/077,855, dated Jan. 30, 2017, 7 pages.
Notice of Allowance received for U.S. Appl. No. 13/077,862, dated Jun. 20, 2019, 9 pages.
Notice of Allowance received for U.S. Appl. No. 13/077,862, dated Sep. 20, 2019, 2 pages.
Notice of Allowance received for U.S. Appl. No. 13/077,867, dated Mar. 12, 2014, 7 pages.
Notice of Allowance received for U.S. Appl. No. 13/077,867, dated Sep. 18, 2013, 8 pages.
Notice of Allowance received for U.S. Appl. No. 13/077,874, dated Nov. 22, 2016, 13 pages.
Notice of Allowance received for U.S. Appl. No. 14/641,287, dated Jun. 28, 2018, 8 pages.
Notice of Allowance received for U.S. Appl. No. 14/839,914, dated Jun. 22, 2018, 12 pages.
Notice of Allowance received for U.S. Appl. No. 15/049,052, dated Sep. 16, 2019, 5 pages.
Notice of Allowance received for U.S. Appl. No. 15/418,537, dated Apr. 6, 2020, 9 pages.
Notice of Allowance received for U.S. Appl. No. 15/930,300, dated Aug. 5, 2020, 14 pages.
Notice of Allowance received for U.S. Appl. No. 16/130,838, dated Jun. 16, 2021, 12 pages.
Notice of Allowance received for U.S. Appl. No. 16/918,855, dated Apr. 6, 2021, 7 pages.
Office Action received for Danish Patent Application No. PA201670595, dated Nov. 25, 2016, 9 pages.
Office Action received for Danish Patent Application No. PA201770794, dated Dec. 19, 2017, 8 pages.
Office Action received for Korean Patent Application No. 10-2018-7010872, dated Dec. 21, 2018, 7 pages.
Office Action received for Australian Patent Application No. 2012209199, dated Jan. 15, 2015, 3 pages.
Office Action received for Australian Patent Application No. 2014315324, dated Aug. 8, 2017, 3 pages.
Office Action received for Australian Patent Application No. 2014315324, dated Oct. 21, 2016, 3 pages.
Office Action received for Australian Patent Application No. 2016202837, dated Jan. 10, 2017, 2 pages.
Office Action received for Australian Patent Application No. 2017100207, dated Apr. 6, 2017, 4 pages.
Office Action received for Australian Patent Application No. 2017100207, dated Jul. 10, 2017, 3 pages.
Office Action received for Australian Patent Application No. 2017101561, dated Dec. 22, 2017, 4 pages.
Office Action received for Australian Patent Application No. 2017276285, dated Nov. 26, 2018, 2 pages.
Office Action received for Australian Patent Application No. 2017277851, dated Jul. 5, 2019, 3 pages.
Office Action received for Australian Patent Application No. 2018101076, dated Oct. 16, 2018, 5 pages.
Office Action received for Australian Patent Application No. 2019206101, dated Jul. 14, 2020, 4 pages.
Office Action received for Australian Patent Application No. 2020201723, dated Feb. 4, 2021, 6 pages.
Office Action Received for Chinese Patent Application No. 201280006317.5, dated Jan. 11, 2016, 10 pages.
Office Action received for Chinese Patent Application No. 201280006317.5, dated Jul. 11, 2016, 6 pages.
Office Action received for Chinese Patent Application No. 201480060044.1, dated Jan. 26, 2018, 15 pages.
Office Action received for Chinese Patent Application No. 201480060044.1, dated Sep. 25, 2018, 6 pages.
Office Action received for Chinese Patent Application No. 201580046331.1, dated Apr. 23, 2020, 15 pages.
Office Action received for Chinese Patent Application No. 201580046331.1, dated Aug. 2, 2019, 18 pages.
Office Action received for Chinese Patent Application No. 201710240907.9, dated Jun. 5, 2019, 10 pages.
Office Action received for Danish Patent Application No. PA201570776, dated Aug. 19, 2016, 3 pages.
Office Action received for Danish Patent Application No. PA201570776, dated Jan. 26, 2016, 12 pages.
Office Action received for Danish Patent Application No. PA201570781, dated Aug. 19, 2016, 3 pages.
Office Action received for Danish Patent Application No. PA201670117, dated Jan. 12, 2017, 3 pages.
Office Action received for Danish Patent Application No. PA201670117, dated Jun. 13, 2016, 10 pages.
Office Action received for Danish Patent Application No. PA201670595, dated Aug. 23, 2018, 5 pages.
Office Action received for Danish Patent Application No. PA201670595, dated May 31, 2017, 3 pages.
Office Action received for Danish Patent Application No. PA201670595, dated Nov. 30, 2017, 4 pages.
Office Action received for Danish Patent Application No. PA201770103, dated Dec. 11, 2018, 2 pages.
Office Action received for Danish Patent Application No. PA201770103, dated Jan. 16, 2018, 2 pages.
Office Action received for Danish Patent Application No. PA201770794, dated Apr. 5, 2018, 4 pages.
Office Action received for Danish Patent Application No. PA201770794, dated Jun. 13, 2019, 2 pages.
Office Action received for Danish Patent Application No. PA201770794, dated Oct. 30, 2018, 3 pages.
Office Action received for European Patent Application No. 14772001.5, dated Feb. 14, 2018, 5 pages.
Office Action received for European Patent Application No. 14772001.5, dated May 30, 2017, 10 pages.
Office Action received for European Patent Application No. 17810739.7, dated Nov. 25, 2020, 4 pages.
Office Action received for European Patent Application No. 19199004.3, dated Nov. 22, 2019, 10 pages.
Office Action received for European Patent Application No. 20217518.8, dated Apr. 30, 2021, 8 pages.
Office Action received for Indian Patent Application No. 201617008296, dated Jan. 14, 2020, 7 pages.
Office Action received for Japanese Patent Application No. 2013-550664, dated Jun. 10, 2016, 3 pages.
Office Action received for Japanese Patent Application No. 2013-550664, dated Aug. 24, 2015, 9 pages.
Office Action received for Japanese Patent Application No. 2013-550664, dated Sep. 12, 2014, 10 pages.
Office Action received for Japanese Patent Application No. 2016-537946, dated Aug. 7, 2017, 8 pages.
Office Action received for Japanese Patent Application No. 2016-537946, dated Jan. 30, 2017, 12 pages.
Office Action received for Japanese Patent Application No. 2018-083313, dated Feb. 12, 2019, 4 pages.
Office Action received for Japanese Patent Application No. 2019-138053, dated Oct. 2, 2020, 6 pages.

(56) References Cited

OTHER PUBLICATIONS

Office Action received for Korean Patent Application No. 10-2013-7022057, dated May 28, 2014, 7 pages.
Office Action received for Korean Patent Application No. 10-2014-7033660, dated Feb. 23, 2015, 3 pages.
Office Action received for Korean Patent Application No. 10-2015-7013849, dated Aug. 20, 2015, 5 pages.
Office Action received for Korean Patent Application No. 10-2016-7008449, dated Jan. 12, 2017, 15 pages.
Office Action received for Korean Patent Application No. 10-2016-7008449, dated Jan. 16, 2018, 10 pages.
Office Action received for Korean Patent Application No. 10-2016-7008449, dated Nov. 27, 2017, 6 pages.
Office Action received for Korean Patent Application No. 10-2016-7017508, dated Oct. 20, 2016, 5 pages.
Office Action received for Korean Patent Application No. 10-2018-7010872, dated Feb. 13, 2019, 7 pages.
Office Action received for Korean Patent Application No. 10-2018-7010872, dated May 21, 2018, 10 pages.
Office Action received for Korean Patent Application No. 10-2019-7007748, dated Nov. 15, 2019, 9 pages.
Office Action received for Korean Patent Application No. 10-2020-7022802, dated Aug. 28, 2020, 7 pages.
Office Action received for Taiwanese Patent Application No. 103130517, dated Feb. 6, 2018, 5 pages.
Office Action received for Taiwanese Patent Application No. 103130517, dated Feb. 22, 2016, 7 pages.
Office Action received for Taiwanese Patent Application No. 103130517, dated Jul. 29, 2016, 7 pages.
Office Action received for Taiwanese Patent Application No. 104107317, dated Mar. 28, 2017, 39 pages.
Office Action received for Taiwanese Patent Application No. 104107329, dated Jul. 24, 2020, 7 pages.
Office Action received for Taiwanese Patent Application No. 104107329, dated Mar. 5, 2020, 22 pages.
Office Action received for Taiwanese Patent Application No. 104128701, dated Jul. 22, 2016, 25 pages.
Office Action received for Taiwanese Patent Application No. 104128701, dated Mar. 16, 2017, 8 pages.
Office Action Report received for Australian Patent Application No. 2012209199, dated Dec. 17, 2015, 3 pages.
Patel Amit, "Hexagonal Grids", Available online at: http://www.redblobgames.com/grids/hexagons/, Mar. 2013, 36 pages.
Patel Amit, "Amit's Thoughts on Grids", Available online at: http://www-cs-students.stanford.edu/~amitp/game-programming/grids/, Jan. 9, 2006, 22 pages.
Qualcomm Toq-smartwatch—User Manual, Available Online at: https://toq.qualcomm.com/sites/default/files/qualcomm_toq_user_manual.pdf [retrieved on Jun. 25, 2015], Nov. 27, 2013, pp. 1-38.
Search Report received for Danish Patent Application No. PA201570781, dated Mar. 8, 2016, 10 pages.
Search Report received for Danish Patent Application No. PA201770103, dated Jun. 9, 2017, 9 pages.
Shestopalyuk Ruslan, "Hexagonal grid math", Feb. 15, 2011, 7 pages.
Summons to Attend Oral Proceedings received for European Patent Application No. 14772001.5, mailed on Nov. 14, 2018, 5 pages.
Summons to Attend Oral Proceedings received for European Patent Application No. 14772001.5, mailed on Oct. 4, 2018, 15 pages.
Supplemental Notice of Allowance received for U.S. Appl. No. 16/130,838, dated Jun. 28, 2021, 2 pages.
The Window Club, "How to Set GIF as Background Windows 7", Online Available at: https://www.youtube.com/watch?v=tUec42Qd7ng, Dec. 24, 2012, pp. 1-5.
Wolfe Joanna, "Annotation Technologies: A Software and Research Review", Computers and Composition, vol. 19, No. 4, 2002, pp. 471-497.
Non-Final Office Action received for U.S. Appl. No. 17/410,169, dated Sep. 16, 2022, 42 pages.
Notice of Allowance received for U.S. Appl. No. 17/349,226, dated Sep. 20, 2022, 7 pages.
Notice of Hearing received for Indian Patent Application No. 201617008296, dated Sep. 11, 2022, 3 pages.
Applicant-Initiated Interview Summary received for U.S. Appl. No. 17/410,169, dated Nov. 7, 2022, 5 pages.
Corrected Notice of Allowance received for U.S. Appl. No. 14/913,349, dated Nov. 3, 2022, 2 pages.
Office Action received for Chinese Patent Application No. 201780034059.4, dated Oct. 9, 2022, 11 pages (5 pages of English Translation and 6 pages of Official Copy).
Applicant-Initiated Interview Summary received for U.S. Appl. No. 16/775,528, dated Aug. 30, 2021, 4 pages.
Examiner-Initiated Interview Summary received for U.S. Appl. No. 14/913,349, dated Sep. 22, 2021, 2 pages.
Examiner's Answer to Appeal Brief received for U.S. Appl. No. 14/913,349, mailed on Sep. 30, 2021, 23 pages.
Non-Final Office Action received for U.S. Appl. No. 16/775,528, dated Sep. 13, 2021, 14 pages.
Notice of Allowance received for Japanese Patent Application No. 2019-138053, dated Jul. 2, 2021, 4 pages (1 page of English Translation and 3 pages of Official Copy).
Office Action received for Indian Patent Application No. 202018015998, dated Nov. 17, 2021, 6 pages.
Office Action received for Indian Patent Application No. 202018016000, dated Nov. 16, 2021, 6 pages.
Office Action received for Korean Patent Application No. 10-2021-7017259, dated Jul. 19, 2021, 10 pages (4 pages of English Translation and 6 pages of Official Copy).
Decision of Appeal received for Korean Patent Application No. 10-2021-7017259, mailed on Jun. 29, 2022, 28 pages (04 pages of English Translation and 24 pages of Official Copy).
Notice of Allowance received for Chinese Patent Application No. 201910446753.8, dated Jun. 29, 2022, 2 pages (1 page of English Translation and 1 page of Official Copy).
Notice of Allowance received for U.S. Appl. No. 14/913,349, dated Jul. 15, 2022, 6 pages.
Office Action received for European Patent Application No. 20217518.8, dated Jul. 6, 2022, 5 pages.
Applicant-Initiated Interview Summary received for U.S. Appl. No. 14/913,349, dated Oct. 12, 2022, 2 pages.
Corrected Notice of Allowance received for U.S. Appl. No. 14/913,349, dated Oct. 3, 2022, 3 pages.
Record of Oral Hearing received for U.S. Appl. No. 14/913,349 mailed on Sep. 23, 2022, 12 pages.
Notice of Acceptance received for Australian Patent Application No. 2021201748, dated Jun. 23, 2022, 3 pages.
Notice of Allowance received for Chinese Patent Application No. 201910447678.7, dated Jun. 20, 2022, 2 pages (1 page of English Translation and 1 page of Official Copy).
Notice of Allowance received for U.S. Appl. No. 16/775,528, dated Jun. 15, 2022, 6 pages.
Applicant-Initiated Interview Summary received for U.S. Appl. No. 16/775,528, dated Jan. 13, 2022, 4 pages.
Corrected Notice of Allowance received for U.S. Appl. No. 16/775,528, dated Mar. 25, 2022, 2 pages.
Decision on Appeal received for U.S. Appl. No. 14/913,349, mailed on Apr. 20, 2022, 13 pages.
Notice of Allowance received for U.S. Appl. No. 16/775,528, dated Feb. 24, 2022, 18 pages.
Office Action received for Australian Patent Application No. 2021201748, dated Mar. 18, 2022, 6 pages.
Office Action received for Chinese Patent Application No. 201910446753.8, dated Mar. 2, 2022, 11 pages (5 pages of English Translation and 6 pages of Official Copy).
Office Action received for Chinese Patent Application No. 201910447678.7, dated Mar. 21, 2022, 14 pages (6 pages of English Translation and 8 pages of Official Copy).
Office Action received for Chinese Patent Application No. 201910447678.7, dated Nov. 29, 2021, 17 pages (7 pages of English Translation and 10 pages of Official Copy).

(56) References Cited

OTHER PUBLICATIONS

Office Action received for Korean Patent Application No. 10-2021-7017259, dated Jan. 10, 2022, 6 pages (3 pages of English Translation and 3 pages of Official Copy).
Office Action received for Korean Patent Application No. 10-2021-7017259, dated Mar. 3, 2022, 8 pages (4 pages of English Translation and 4 pages of Official Copy).
Corrected Notice of Allowance received for U.S. Appl. No. 14/913,349, dated Sep. 1, 2022, 2 pages.
Office Action received for Japanese Patent Application No. 2021-126843, dated Aug. 29, 2022, 6 pages (3 pages of English Translation and 3 pages of Official Copy).
Restriction Requirement received for U.S. Appl. No. 17/505,252, dated Dec. 13, 2022, 5 pages.
Final Office Action received for U.S. Appl. No. 17/410,169, dated Feb. 6, 2023, 47 pages.
Office Action received for European Patent Application No. 17810739.7, dated Feb. 17, 2023, 8 pages.
Notice of Allowance received for Chinese Patent Application No. 201780034059.4, dated Feb. 19, 2023, 2 pages (1 page of English Translation and 1 page of Official Copy).
Notice of Allowance received for Japanese Patent Application No. 2021-126843, dated Jan. 6, 2023, 4 pages (1 page of English Translation and 3 pages of Official Copy).
Non-Final Office Action received for U.S. Appl. No. 17/349,226, dated Mar. 16, 2023, 9 pages.

* cited by examiner

MULTI-DIMENSIONAL OBJECT REARRANGEMENT

CROSS-REFERENCE TO RELATED APPLICATIONS

This application is a continuation of U.S. application Ser. No. 16/130,838, entitled "MULTI-DIMENSIONAL OBJECT REARRANGEMENT," filed Sep. 13, 2018, which is a continuation of U.S. application Ser. No. 14/641,287, entitled "MULTI-DIMENSIONAL OBJECT REARRANGEMENT," filed Mar. 6, 2015, which claims priority to U.S. Provisional Application Ser. No. 62/044,987, entitled "MULTI-DIMENSIONAL OBJECT REARRANGEMENT," filed Sep. 2, 2014. The contents of which are hereby incorporated by reference in their entireties.

This application relates to the following applications: International Patent Application Serial No. PCT/US2013/040087, entitled "Device, Method, and Graphical User Interface for Moving a User Interface Object Based on an Intensity of a Press Input," filed May 8, 2013; International Patent Application Serial No. PCT/US2013/040072, entitled "Device, Method, and Graphical User Interface for Providing Feedback for Changing Activation States of a User Interface Object," filed May 8, 2013; International Patent Application Serial No. PCT/US2013/040070, entitled "Device, Method, and Graphical User Interface for Providing Tactile Feedback for Operations Performed in a User Interface," filed May 8, 2013; International Patent Application Serial No. PCT/US2013/040067, entitled "Device, Method, and Graphical User Interface for Facilitating User Interaction with Controls in a User Interface," filed May 8, 2013; International Patent Application Serial No. PCT/US2013/040061, entitled "Device, Method, and Graphical User Interface for Displaying User Interface Objects Corresponding to an Application," filed May 8, 2013; International Patent Application Serial No. PCT/US2013/040058, entitled "Device, Method, and Graphical User Interface for Displaying Additional Information in Response to a User Contact," filed May 8, 2013; International Patent Application Serial No. PCT/US2013/040056, entitled "Device, Method, and Graphical User Interface for Scrolling Nested Regions," filed May 8, 2013; International Patent Application Serial No. PCT/US2013/040054, entitled "Device, Method, and Graphical User Interface for Manipulating Framed Graphical Objects," filed May 8, 2013; International Patent Application Serial No. PCT/US2013/069489, entitled "Device, Method, and Graphical User Interface for Switching Between User Interfaces," filed Nov. 11, 2013; International Patent Application Serial No. PCT/US2013/069486, entitled "Device, Method, and Graphical User Interface for Determining Whether to Scroll or Select Content," filed Nov. 11, 2013; International Patent Application Serial No. PCT/US2013/069484, entitled "Device, Method, and Graphical User Interface for Moving a Cursor According to a Change in an Appearance of a Control Icon with Simulated Three-Dimensional Characteristics," filed Nov. 11, 2013; International Patent Application Serial No. PCT/US2013/069483, entitled "Device, Method, and Graphical User Interface for Transitioning Between Touch Input to Display Output Relationships," filed Nov. 11, 2013; International Patent Application Serial No. PCT/US2013/069479, entitled "Device, Method, and Graphical User Interface for Forgoing Generation of Tactile Output for a Multi-Contact Gesture," filed Nov. 11, 2013; International Patent Application Serial No. PCT/US2013/069472, entitled "Device, Method, and Graphical User Interface for Navigating User Interface Hierarchies," filed Nov. 11, 2013; International Patent Application Serial No. PCT/US2013/040108, entitled "Device, Method, and Graphical User Interface for Moving and Dropping a User Interface Object," filed May 8, 2013; International Patent Application Serial No. PCT/US2013/040101, entitled "Device, Method, and Graphical User Interface for Selecting User Interface Objects," filed May 8, 2013; International Patent Application Serial No. PCT/US2013/040098, entitled "Device, Method, and Graphical User Interface for Displaying Content Associated with a Corresponding Affordance," filed May 8, 2013; International Patent Application Serial No. PCT/US2013/040093, entitled "Device, Method, and Graphical User Interface for Transitioning Between Display States in Response to a Gesture," filed May 8, 2013; International Patent Application Serial No. PCT/US2013/040053, entitled "Device, Method, and Graphical User Interface for Selecting Object within a Group of Objects," filed May 8, 2013; U.S. Patent Application Ser. No. 61/778,211, entitled "Device, Method, and Graphical User Interface for Facilitating User Interaction with Controls in a User Interface," filed Mar. 12, 2013; U.S. Patent Application Ser. No. 61/778,191, entitled "Device, Method, and Graphical User Interface for Displaying User Interface Objects Corresponding to an Application," filed Mar. 12, 2013; U.S. Patent Application Ser. No. 61/778,171, entitled "Device, Method, and Graphical User Interface for Displaying Additional Information in Response to a User Contact," filed Mar. 12, 2013; U.S. Patent Application Ser. No. 61/778,179, entitled "Device, Method and Graphical User Interface for Scrolling Nested Regions," filed Mar. 12, 2013; U.S. Patent Application Ser. No. 61/778,156, entitled "Device, Method, and Graphical User Interface for Manipulating Framed Graphical Objects," filed Mar. 12, 2013; U.S. Patent Application Ser. No. 61/778,125, entitled "Device, Method, And Graphical User Interface for Navigating User Interface Hierarchies," filed Mar. 12, 2013; U.S. Patent Application Ser. No. 61/778,092, entitled "Device, Method, and Graphical User Interface for Selecting Object Within a Group of Objects," filed Mar. 12, 2013; U.S. Patent Application Ser. No. 61/778,418, entitled "Device, Method, and Graphical User Interface for Switching Between User Interfaces," filed Mar. 13, 2013; U.S. Patent Application Ser. No. 61/778,416, entitled "Device, Method, and Graphical User Interface for Determining Whether to Scroll or Select Content," filed Mar. 13, 2013; U.S. Patent Application Ser. No. 61/747,278, entitled "Device, Method, and Graphical User Interface for Manipulating User Interface Objects with Visual and/or Haptic Feedback," filed Dec. 29, 2012; U.S. Patent Application Ser. No. 61/778,414, entitled "Device, Method, and Graphical User Interface for Moving and Dropping a User Interface Object," filed Mar. 13, 2013; U.S. Patent Application Ser. No. 61/778,413, entitled "Device, Method, and Graphical User Interface for Selecting User Interface Objects," filed Mar. 13, 2013; U.S. Patent Application Ser. No. 61/778,412, entitled "Device, Method, and Graphical User Interface for Displaying Content Associated with a Corresponding Affordance," filed Mar. 13, 2013; U.S. Patent Application Ser. No. 61/778,373, entitled "Device, Method, and Graphical User Interface for Managing Activation of a Control Based on Contact Intensity," filed Mar. 12, 2013; U.S. Patent Application Ser. No. 61/778,265, entitled "Device, Method, and Graphical User Interface for Transitioning Between Display States in Response to a Gesture," filed Mar. 12, 2013; U.S. Patent Application Ser. No. 61/778,367, entitled "Device, Method, and Graphical User Interface for Moving a User Interface Object Based on an Intensity of a Press Input," filed Mar. 12, 2013; U.S.

Patent Application Ser. No. 61/778,363, entitled "Device, Method, and Graphical User Interface for Transitioning Between Touch Input to Display Output Relationships," filed Mar. 12, 2013; U.S. Patent Application Ser. No. 61/778,287, entitled "Device, Method, and Graphical User Interface for Providing Feedback for Changing Activation States of a User Interface Object," filed Mar. 12, 2013; U.S. Patent Application Ser. No. 61/778,284, entitled "Device, Method, and Graphical User Interface for Providing Tactile Feedback for Operations Performed in a User Interface," filed Mar. 12, 2013; U.S. Patent Application Ser. No. 61/778,239, entitled "Device, Method, and Graphical User Interface for Forgoing Generation of Tactile Output for a Multi-Contact Gesture," filed Mar. 12, 2013; U.S. Patent Application Ser. No. 61/688,227, entitled "Device, Method, and Graphical User Interface for Manipulating User Interface Objects with Visual and/or Haptic Feedback," filed May 9, 2012; U.S. Patent Application No. 62/005,958, "Canned Answers in Messages," filed May 30, 2014. The content of these applications are hereby incorporated by reference in their entirety.

BACKGROUND

1. Field

The present disclosure relates generally to computer user interfaces, and more specifically to techniques and user interface screens for reconfiguring user interface objects.

2. Description of Related Art

Modern electronic devices may include the ability to store, access, and/or run a large number of application programs. The applications may be launched by selecting respective icons displayed on a user interface screen of a device. Accordingly, a screen may include a large number of displayed application icons. A user may desire for the icons to be displayed in a particular arrangement so that, for example, the icons of the most frequently used applications are displayed in a position that are easy to locate and select (e.g., the top or center of the display). Thus, there is a need for techniques that allow a user to easily and efficiently rearrange icons displayed on a user interface to desired locations.

In addition, recent advances in computer technology have enabled manufacturers to produce such electronic devices in relatively small form factors. One challenge created by a small form factor, is that the display may be small, which can make it difficult for a user to view and position icons in the desired locations.

Thus, there is a need for user-friendly techniques and reduced size user interfaces for displaying and reconfiguring user interface objects such as application icons on devices with small form factors.

BRIEF SUMMARY

In some embodiments, a method comprises: at an electronic device with a touch-sensitive display: displaying on the display a plurality of application icons for launching application programs, the application icons arranged in a first configuration, wherein the application icons occupy respective locations on a hexagonal grid in relation to an origin; detecting a first input on the touch-sensitive display; in response to detecting the first input, causing the electronic device to operate in a user interface reconfiguration mode for reconfiguring the application icons on the display; detecting a second input on the touch-sensitive display representing a selection of a first application icon at a first location on the hexagonal grid; in response to the second input, removing the display of the first application icon; determining a second configuration of the application icons without the first application icon, wherein a sum of the distances from the origin of the application icons in the first configuration, minus the distance from the origin of the first application icon in the first configuration, is greater than a sum of the distances from the origin of the application icons in the second configuration; and transitioning the display of the plurality of application icons from the first configuration to the second configuration.

In some embodiments, a method comprises: at an electronic device with a touch-sensitive display: displaying, on the display, a plurality of application icons in a user interface reconfiguration mode for reconfiguring the application icons on the display, wherein the plurality of application icons occupy respective locations on a hexagonal grid; detecting a user contact on the touch-sensitive display at a first position corresponding to a first application icon at a first location on the hexagonal grid; while continuing to detect the user contact, detecting movement of the user contact from the first position to a second position without a break in contact of the user contact on the touch-sensitive display, the second position corresponding to a second application icon at a second location on the hexagonal grid; in response to detecting movement of the user contact from the first position to the second position: translating the display of the first application icon from the first location to the second position; and moving the display of the second application icon to the first location.

In some embodiments, a method comprises: at an electronic device with a display: displaying, on the display, a plurality of application icons in a user interface reconfiguration mode for reconfiguring the application icons on the display, the plurality of application icons occupying respective locations on a hexagonal grid; detecting a user contact on the touch-sensitive display at a first position corresponding to a first application icon at a first location on the hexagonal grid; while continuing to detect the user contact, detecting movement of the user contact from the first position to a second position without a break in contact of the user contact on the touch-sensitive display, the second position corresponding to a second location on the hexagonal grid, wherein the second location is unoccupied; in response to detecting movement of the user contact from the first position to the second position, translating the display of the first application icon from the first location to the second position; detecting a break in contact of the user contact on the touch-sensitive display; in response to the break in contact of the user contact on the touch-sensitive display, determining whether there are less than two occupied locations adjacent to the second location; in accordance with a determination that there are less than two occupied locations adjacent to the second location: determining a third location on the hexagonal grid having at least two adjacent locations that are occupied; and moving the display of the first application icon to the third location on the hexagonal grid.

In some embodiments, a method comprises: at an electronic device with a touch-sensitive display: displaying, on the display, a plurality of application icons in a user interface reconfiguration mode for reconfiguring the application icons on the display, the application icons arranged in a first configuration, wherein the application icons occupy respective locations on a hexagonal grid in relation to an origin, and wherein the application icons have corresponding ranks based on their respective locations in relation to the origin; detecting a user contact on the touch-sensitive display at a first position corresponding to a first application icon at a first location on the hexagonal grid; while continuing to detect the user contact, detecting movement of the user contact from the first position to a second position without a break in contact of the user contact on the touch-sensitive display, the second position corresponding to a second application icon at a second location on the hexagonal grid; in response to detecting movement of the user contact from the first position to the second position: translating the display of the first application icon from the first location to the second position; determining a second configuration of the application icons based on the first location and the second location; and transitioning the display of the application icons from the first configuration to the second configuration, wherein, in the second configuration, no application icon except the first application icon is displaced by more than one location relative to the first configuration, and wherein transitioning the display of the application icons from the first configuration to the second configuration comprises: moving the display of the second application icon to a third location adjacent to the second location; and moving a display of a third application icon to the first location from a fourth location adjacent to the first location.

In some embodiments, a method comprises: at an electronic device with a touch-sensitive display: displaying one or more application icons in a hexagonal arrangement; detecting a first input on the touch-sensitive display; and in response to the first input: causing the electronic device to operate in a user interface reconfiguration mode for reconfiguring the application icons on the display; and causing the display of the first application icon to fluctuate in size.

In some embodiments, a method comprises: at an electronic device with a touch-sensitive display, wherein the touch-sensitive display comprises one or more sensors to detect the intensity of contacts with the touch-sensitive display: displaying one or more application icons in a hexagonal arrangement; detecting, on the touch-sensitive display, a touch corresponding to a selection of a first application icon corresponding to a respective application; determining whether the touch has a characteristic intensity above a threshold intensity; and in accordance with a determination that the characteristic intensity is above the threshold intensity, removing the display of the selected icon.

In some embodiments, a method comprises: at an electronic device with a touch-sensitive display, wherein the touch-sensitive display comprises one or more sensors to detect the intensity of contacts with the touch-sensitive display: displaying one or more application icons in a hexagonal arrangement; detecting, on the touch-sensitive display, a first touch; determining whether the touch has a characteristic intensity above a threshold intensity; and in accordance with a determination that the characteristic intensity is above the threshold intensity, displaying a deletion confirmation affordance.

In some embodiments, a system comprises means for performing any of the methods described above.

In some embodiments, a non-transitory computer-readable storage medium comprises instructions for performing the methods described above. In some embodiments, a system comprises the non-transitory computer-readable storage medium; and one or more processors capable of executing the instructions of the non-transitory computer-readable storage medium.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
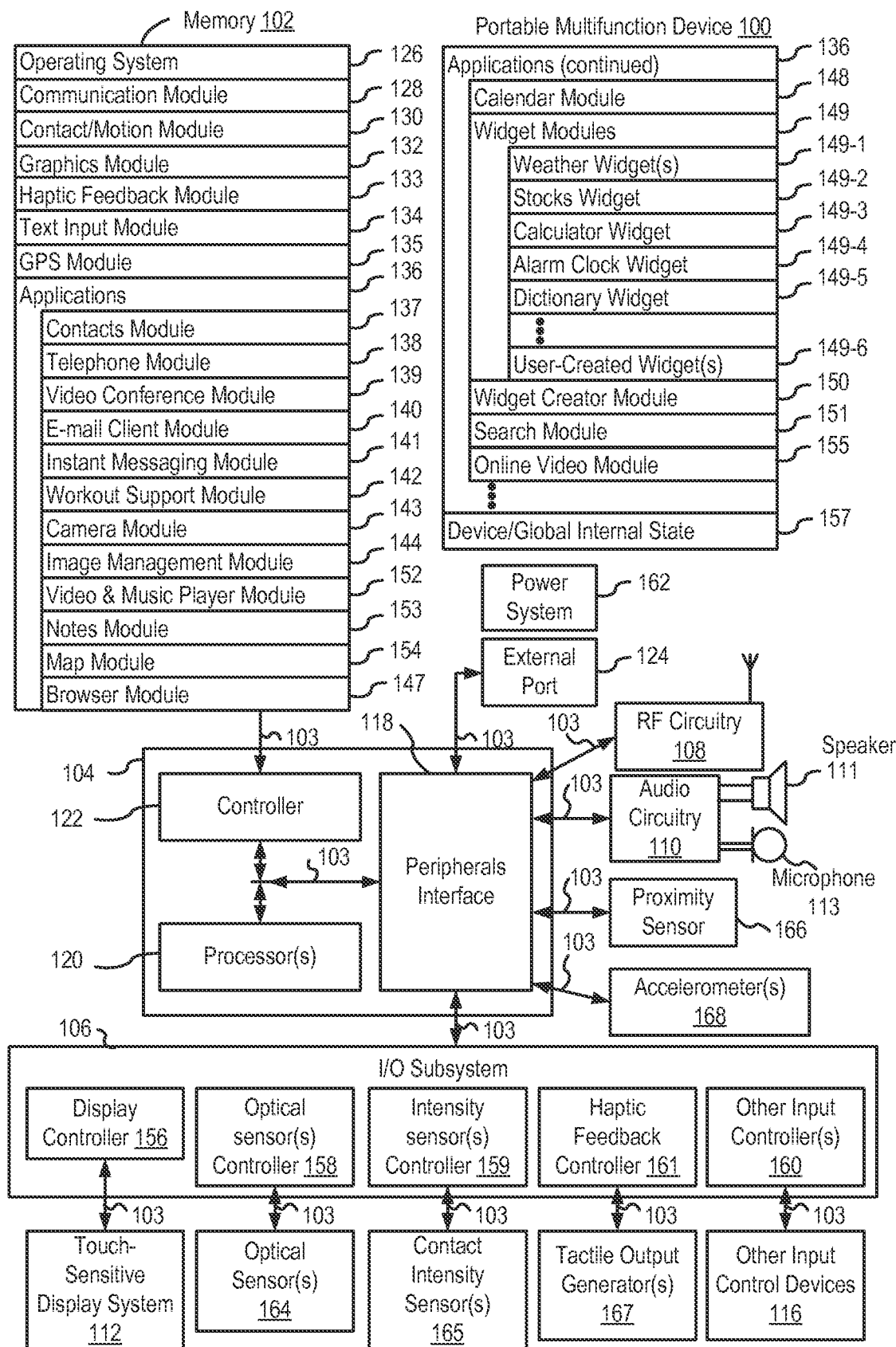
FIG. 1A is a block diagram illustrating a portable multifunction device with a touch-sensitive display in accordance with some embodiments.

The following description sets forth exemplary methods, parameters and the like. It should be recognized, however, that such description is not intended as a limitation on the scope of the present disclosure but is instead provided as a description of exemplary embodiments.

Below, FIGS. 1A-1B, 2, 3, 4A-4B, and 5A-5B provide a description of exemplary devices that may perform techniques associated with reconfiguring a user interface. FIGS. 6-15 illustrate exemplary techniques for reconfiguring user interfaces, including rearranging user interface objects such as application icons. The user interfaces in the figures are also used to illustrate the processes described below, including the processes in FIGS. 16-22.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system."

Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
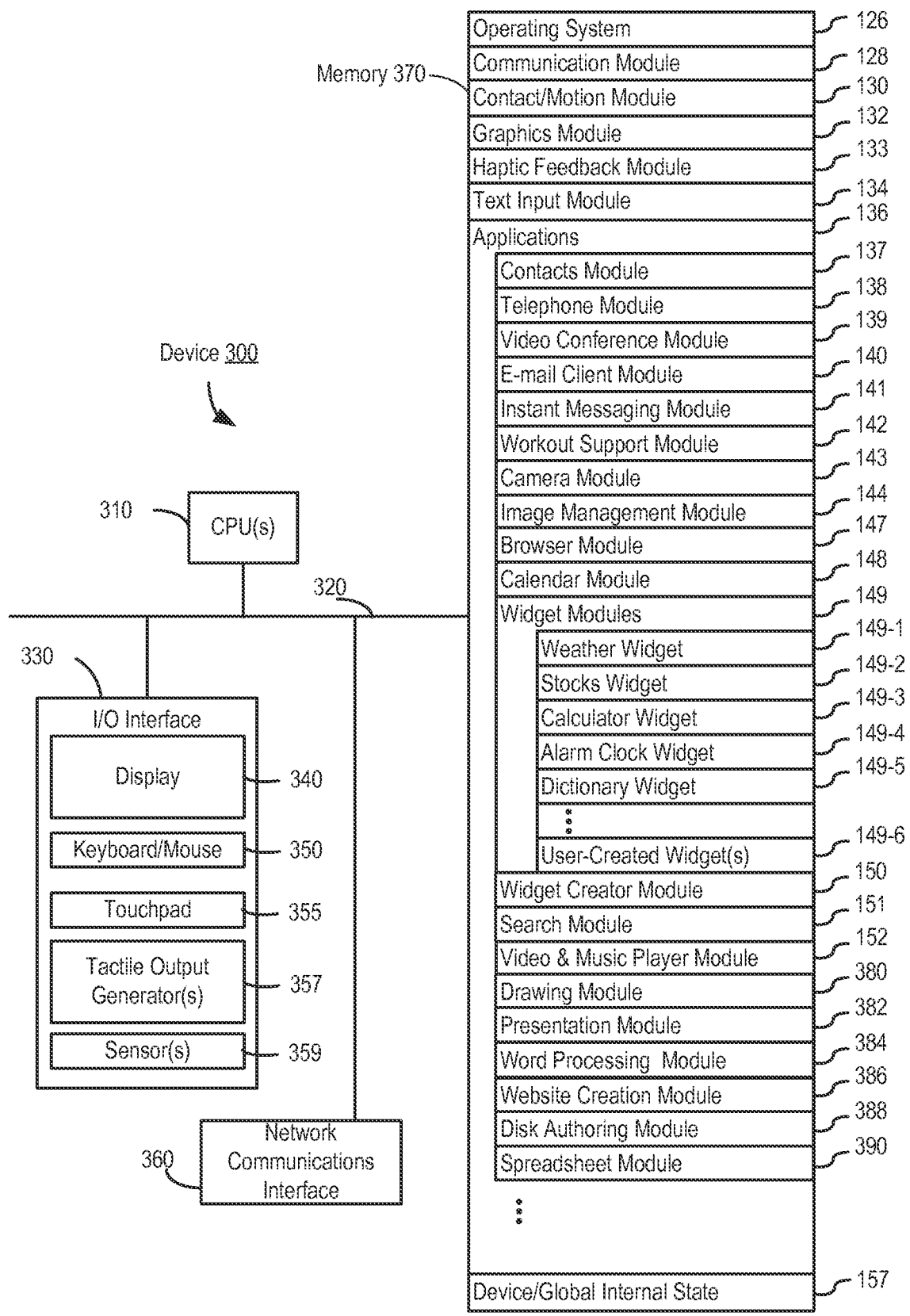
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., DARWIN, RTXC, LINUX, UNIX, OS X, iOS, WINDOWS, or an embedded operating system such as VXWORKS) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JAVASCRIPT file (e.g., YAHOO! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
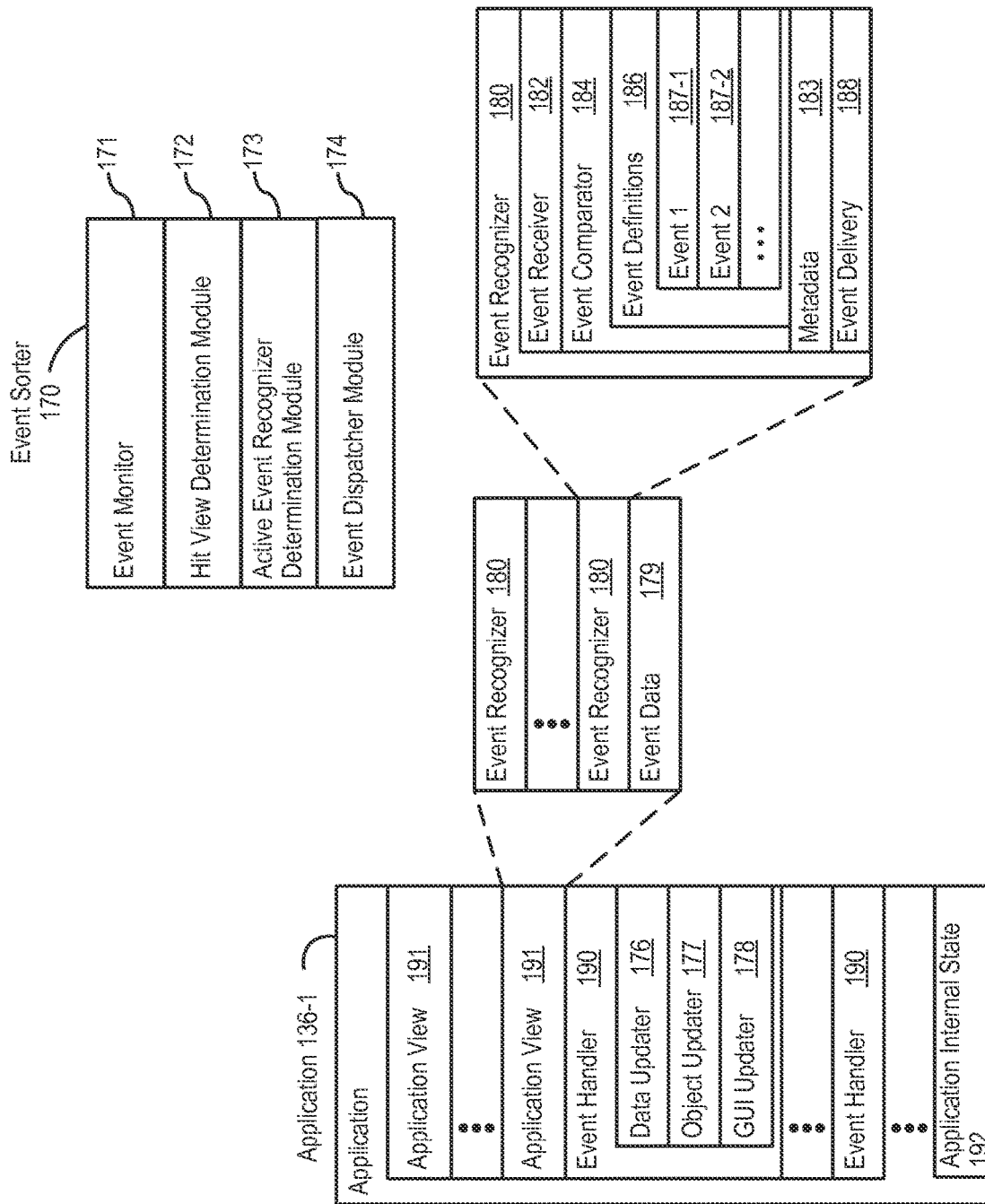
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of:

resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
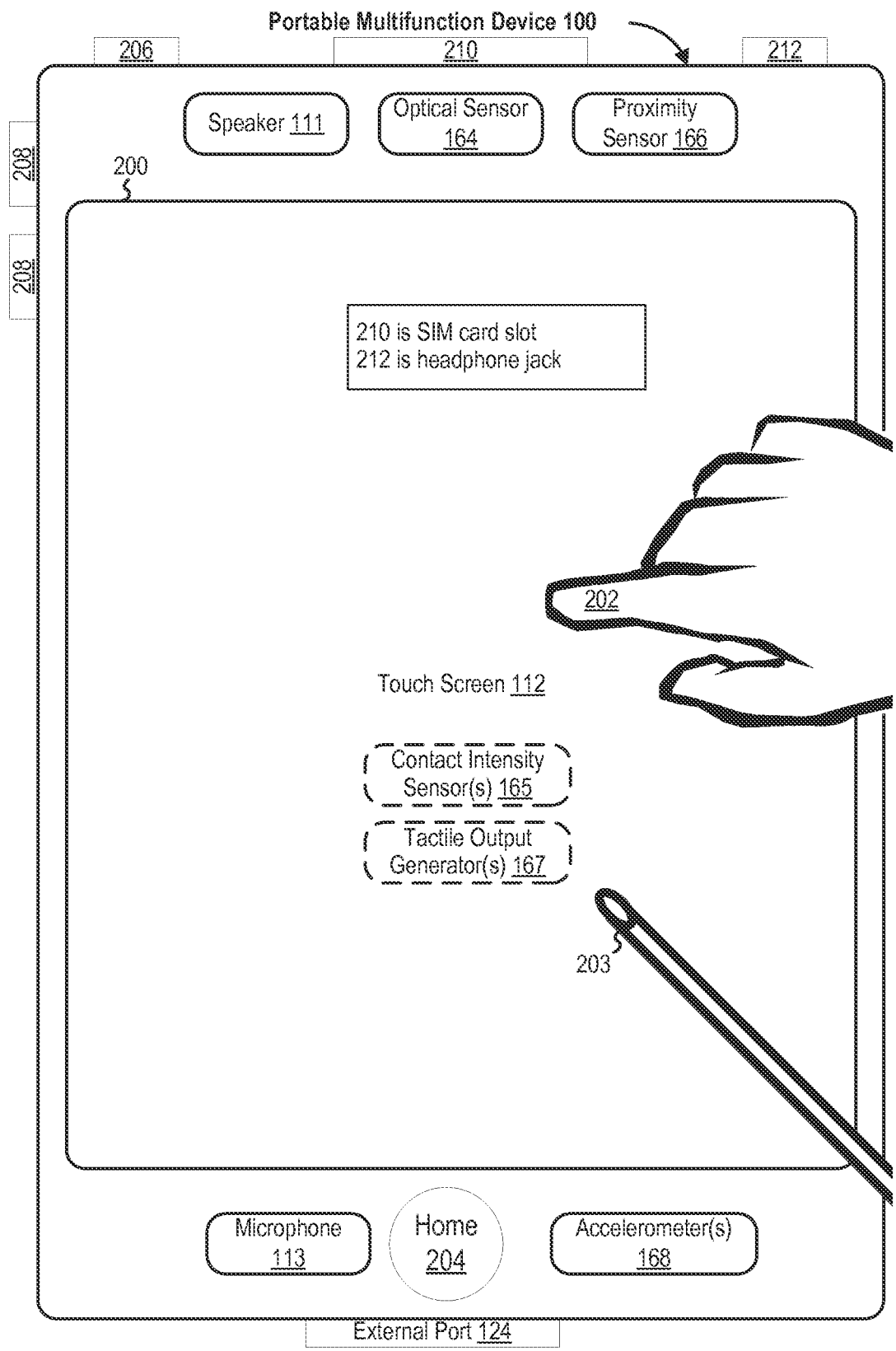
FIG. 2 illustrates a portable multifunction device having a touch-sensitive display in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
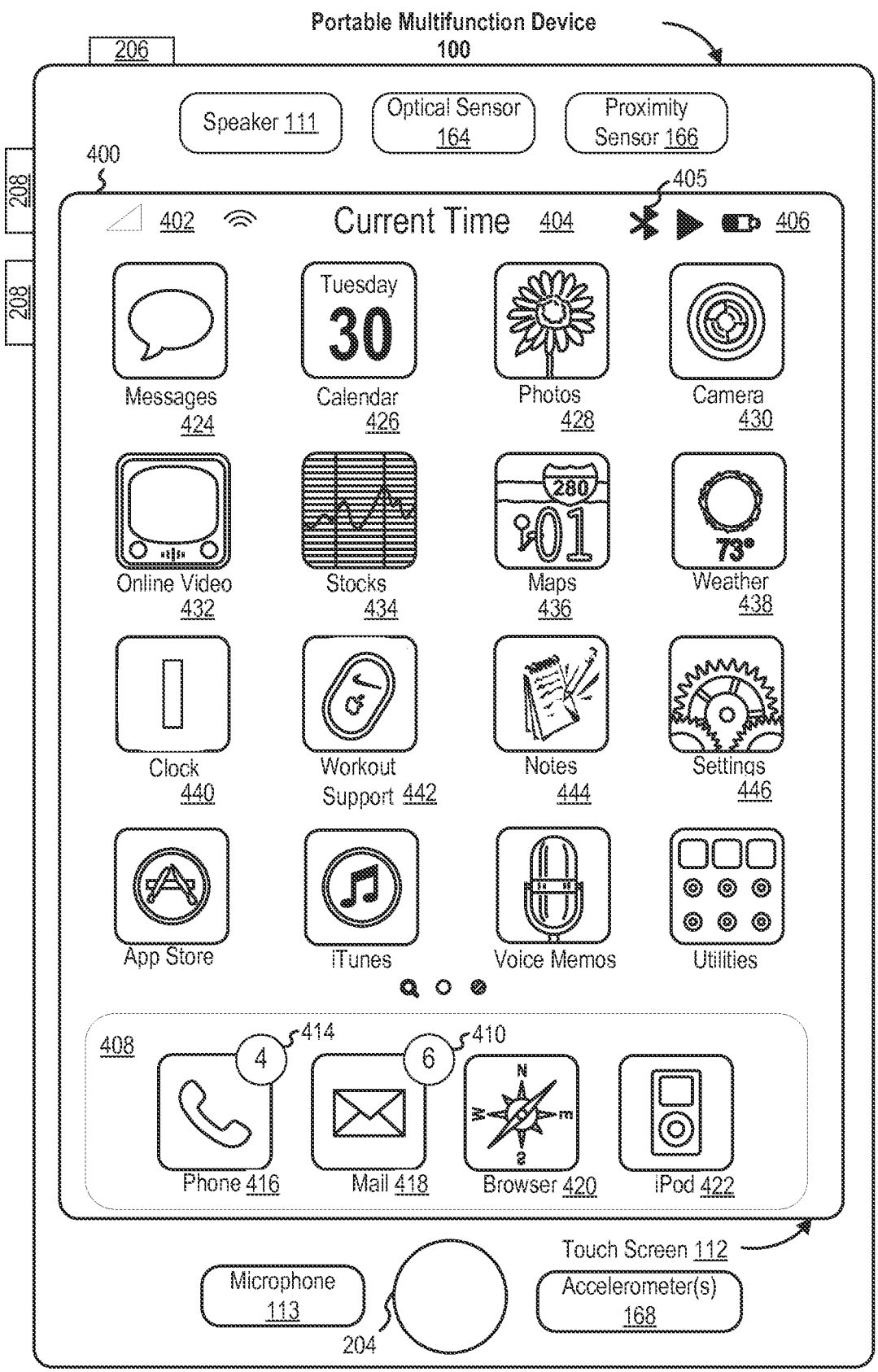
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
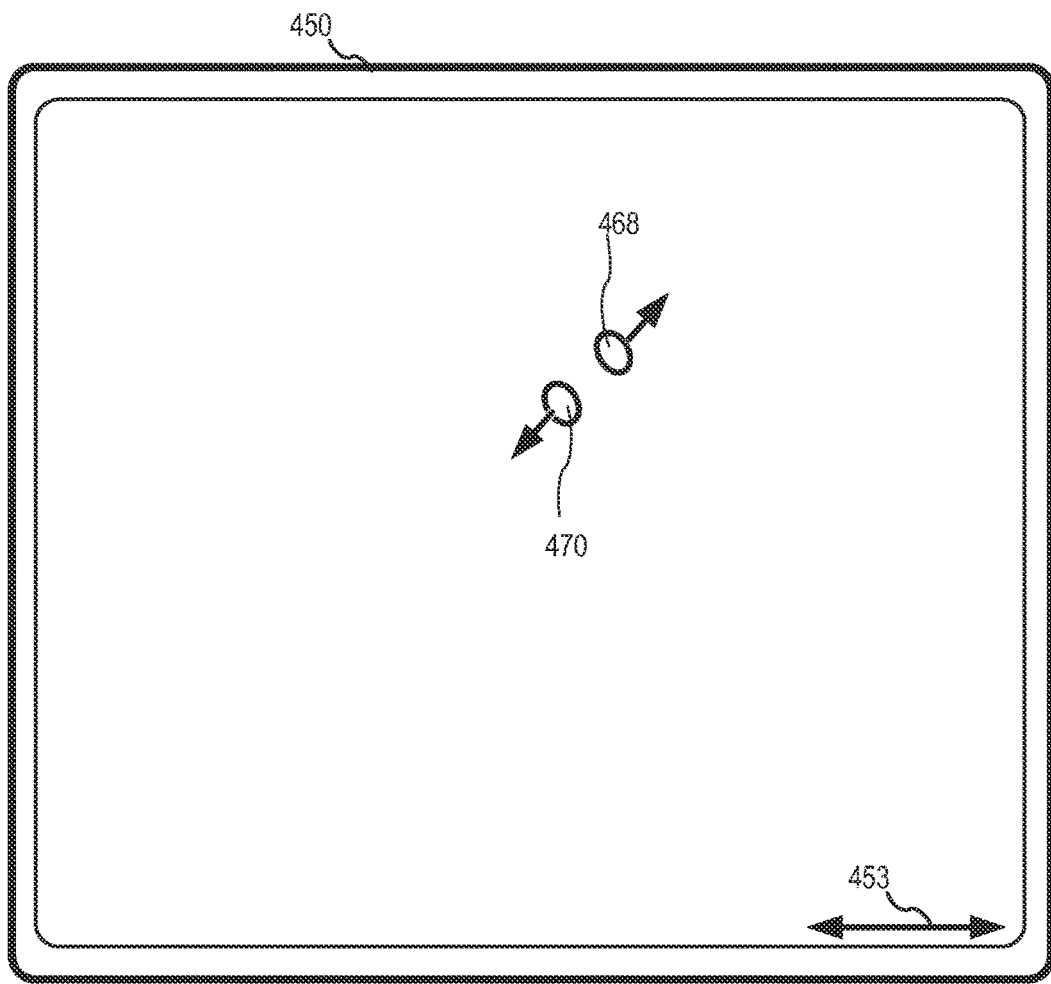
FIG. 4B illustrates an exemplary user interface for a multifunction device with a touch-sensitive surface that is separate from the display in accordance with some embodiments.
Figure 4B:
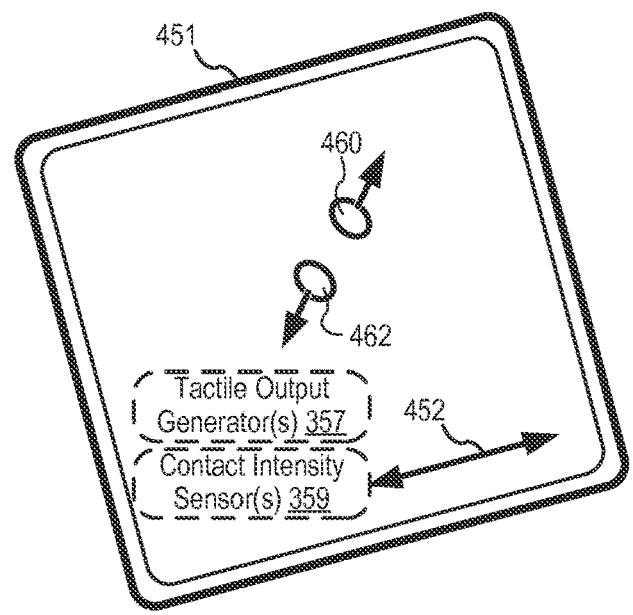

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
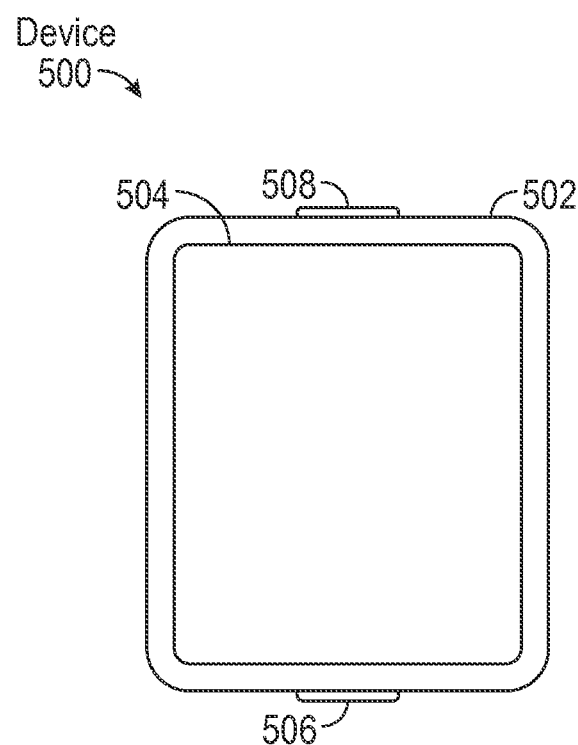
FIG. 5A is a block diagram illustrating a portable multifunction device with a touch-sensitive display and a rotatable input mechanism in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) may have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
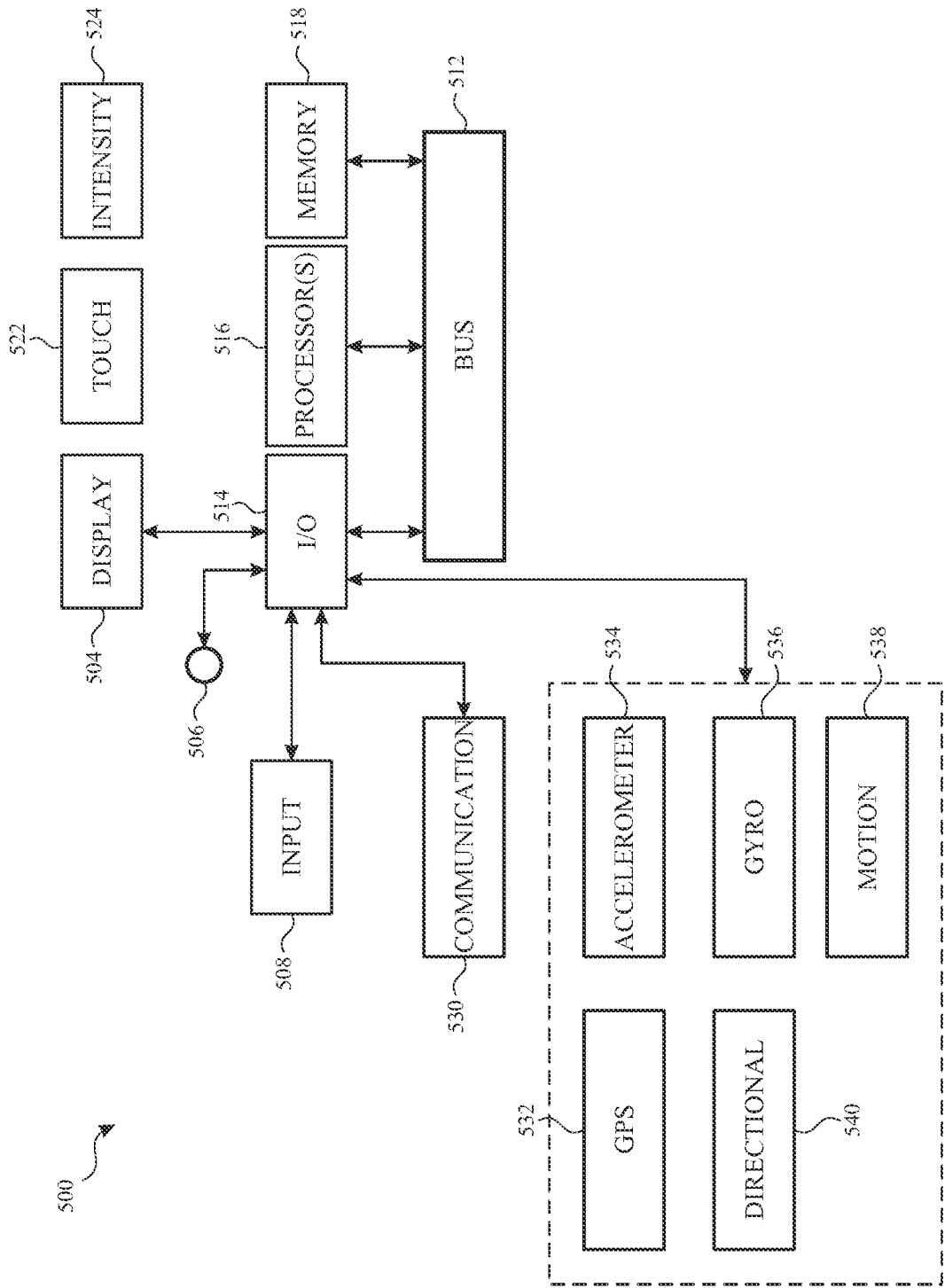
FIG. 5B illustrates a portable multifunction device having a touch-sensitive display and a rotatable input mechanism in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 may be a rotatable input device or a depressible and rotatable input device, for example. Input mechanism 508 may be a button, in some examples.

Input mechanism 508 may be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including processes 1600-2200 (FIGS. 16-22). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 6:
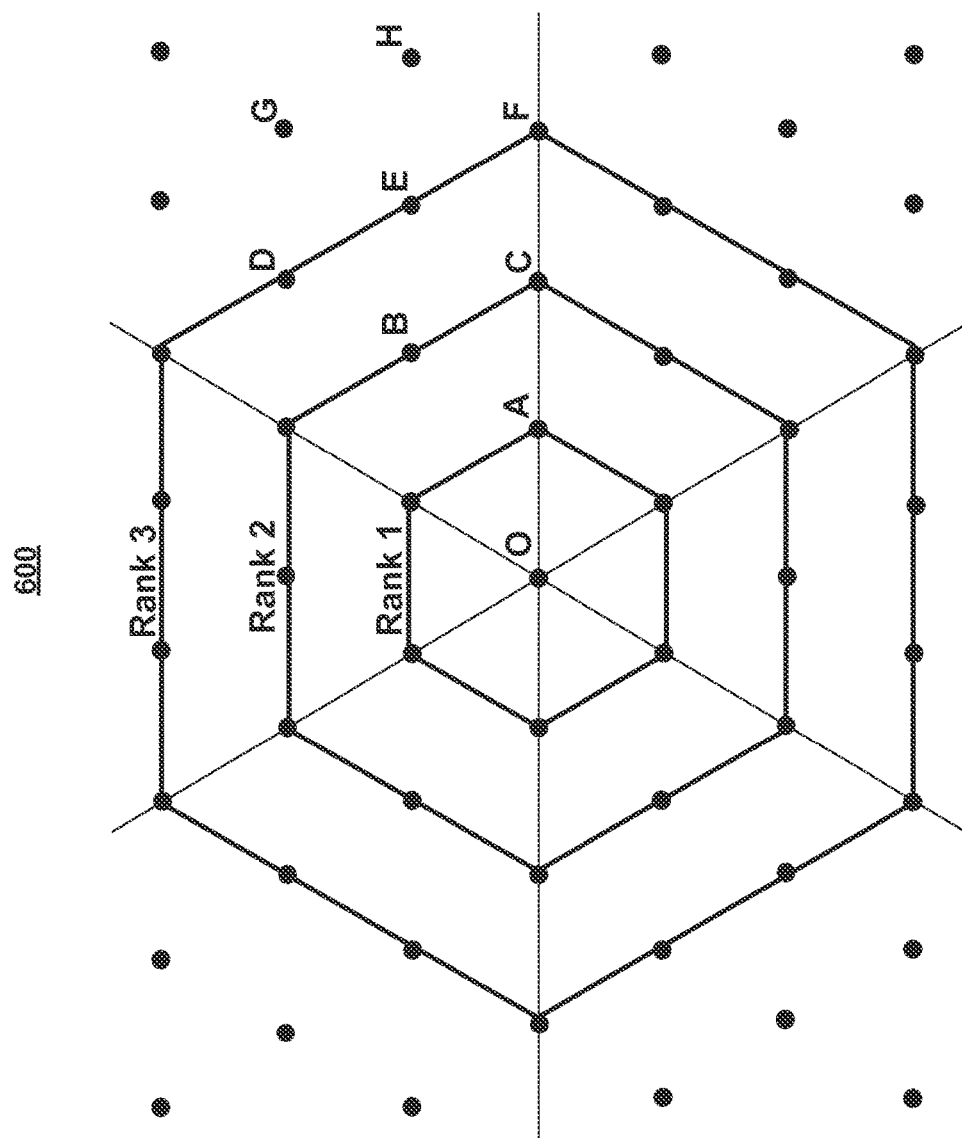
FIG. 6 illustrates an exemplary hexagonal grid in accordance with some embodiments.

Attention is now directed to FIG. 6, which depicts an exemplary hexagonal grid 600 according to some embodiments. Hexagonal grid 600 includes a two-dimensional array of discrete locations represented by dots. With the exception of the locations near the edges of grid 600, each location is surrounded by six adjacent locations. For example, location E is adjacent to locations B, C, D, F, G, and H. The six locations adjacent to any particular location define a hexagon. The locations are arranged such that the hexagons defined by the adjacent locations of any two locations are congruent.

A location may be defined as the origin of the hexagonal grid. In grid 600, location O is defined as the origin. An integer rank value may be defined for each location based on its location in relation to the origin O. The rank of a location is defined as the minimum number of discrete steps along locations on grid 600 that can be taken to move from the origin to the location. A discrete step is a step from a location on the hexagonal grid to an adjacent location on the hexagonal grid. For example, it is possible to move from the origin O to location B in three steps via points A and C (i.e., O-A-C-B); however, it is also possible to reach point B in only two steps via location A (e.g., by going directly to B from A). Location B cannot be reached in fewer than two steps along a path of adjacent points. Accordingly, location B has a rank value of two. As shown in FIG. 6, locations having the same rank form hexagonal "shells" around the origin O. While rank is generally described herein as increasing with distance from the origin, it is understood that the reverse could be true. For example, the closest "shell" could be assigned a rank of 100 with successive "shells" being assigned successively lower ranks (e.g., 99, 98, 97).

Attention is now directed to user interfaces and associated processes that may be implemented on a multifunction device with a display and a touch-sensitive surface, such as devices 100, 300, and/or 500 (FIGS. 1A, 3, and/or 5A), to reconfigure user interface objects, including user interface objects arranged in a hexagonal pattern.

Figure 7:
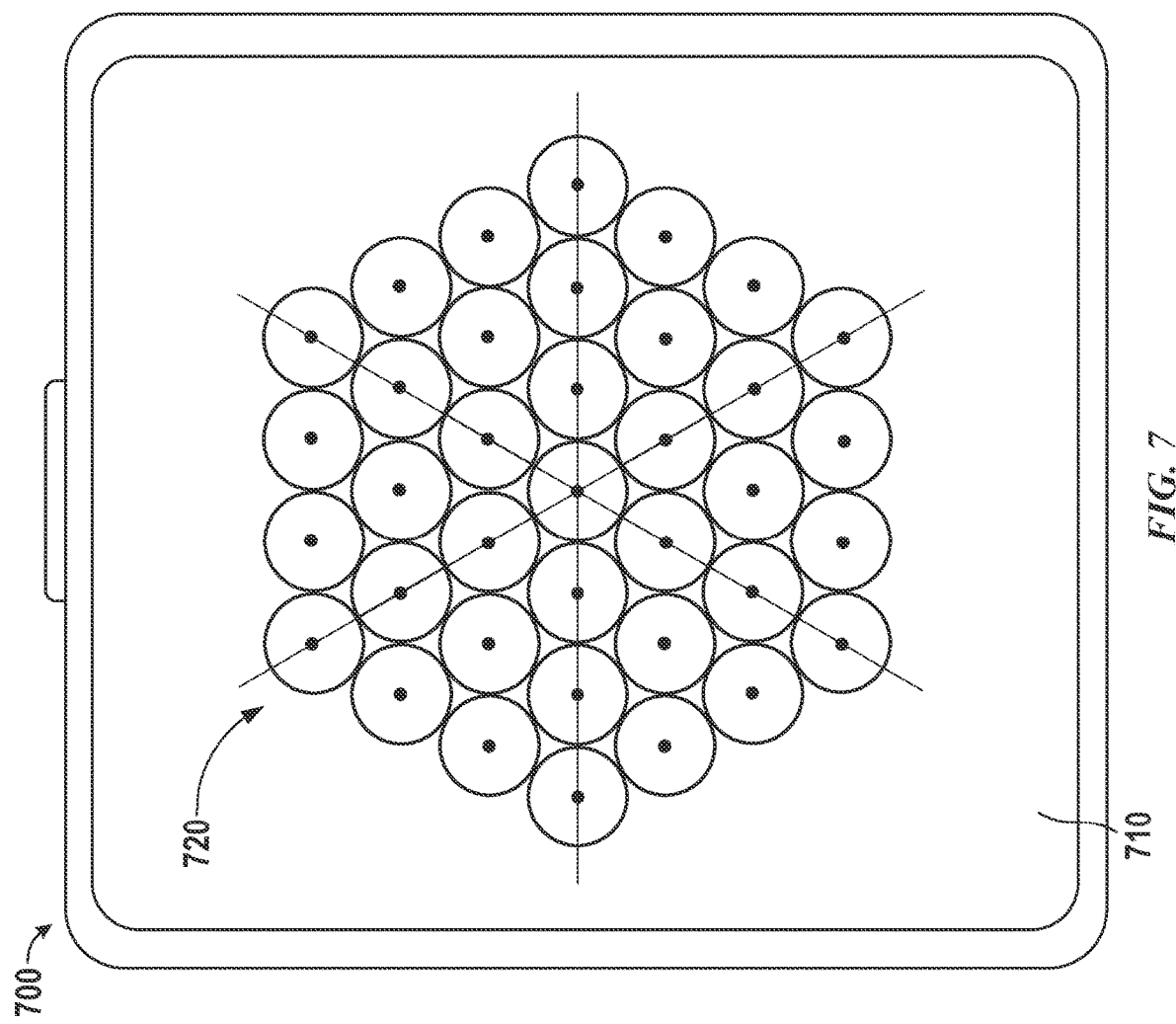
FIG. 7 illustrates an exemplary user interface with a plurality of user interface objects arranged on a hexagonal grid in accordance with some embodiments.

FIG. 7 illustrates exemplary electronic device 700. Device 700 may be device 500 (FIG. 5A) in some embodiments. In the illustrated example, device 700 is a wearable electronic device. In some embodiments, device 700 may be a smartphone.

As shown, device 700 may display user interface screen 710 having a plurality of user interface objects arranged in a configuration 720. Each user interface object is positioned at (e.g., occupies) a location on a hexagonal grid. On user interface screen 710, the user interface objects are displayed as circular icons centered on their respective grid locations. Icons may be affordances that correspond to applications executable on device 700 (e.g., a messaging application), meaning device 700 may launch a corresponding application in response to a user's selection of an icon.

It should be recognized that the icons may have various sizes and shapes (e.g., hexagon, square, triangle, rounded rectangle, star, etc.). The icons also do not have to all be the same shape and do not have to be the same size as the grid spacing. Furthermore, the grid may be configured in various ways. For example, the grid may be elongated, skewed, and/or oriented in a different direction (e.g., rotated 60 degrees so that one of the axes is vertical). Also, in some embodiments, the hexagonal grid (e.g., the grid location indicators and axes) is not displayed.

Device 700 may operate in a user interface reconfiguration mode in which the user interface displayed on the display may be reconfigured. While in the user interface reconfiguration mode, displayed user interface objects (e.g., application icons) may be moved, deleted, added, changed, or the like. Exemplary methods for entering and exiting a user interface reconfiguration mode are described below.

Figure 8A:
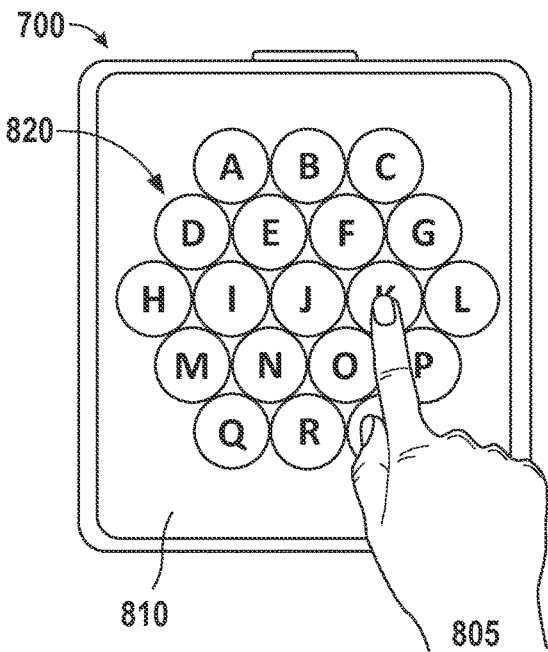
FIGS. 8A-8D illustrate exemplary techniques for reconfiguring a user interface in accordance with some embodiments.

FIG. 8A illustrates an exemplary user interface screen 810 that may be displayed on the display of device 700. Screen 810 includes a plurality of application icons 820 arranged in a hexagonal configuration.

In one embodiment, device 700 may include a touch-sensitive display. Device 700 may detect an input on the touch-sensitive display, such as touch 805. The touch may be detected at a position corresponding to one of the plurality of displayed application icons. In FIG. 8A, touch 805 is located at a position corresponding to icon K. In response to the touch, device 700 may be set to operate in a user interface reconfiguration mode for reconfiguring the application icons on the display. Optionally, device 700 may determine whether the duration of the touch 805 exceeds a predetermined threshold and be set to operate in the user interface reconfiguration mode in accordance with a determination that the duration of the touch 805 exceeds the predetermined threshold. Alternatively, in accordance with a determination that the duration of the touch 805 does not exceed the predetermined threshold, device 700 may launch an application corresponding to the touched icon (e.g., Application K).

In some embodiments, the touch-sensitive display may comprise one or more sensors to detect the intensity of contacts with the touch-sensitive display. Device 700 may determine whether the touch 805 has a characteristic intensity above a threshold intensity and may operate in the user interface reconfiguration mode in accordance with a determination that the characteristic intensity is above the threshold intensity. Alternatively, in accordance with a determination that the characteristic intensity is below the threshold intensity, device 700 may launch an application corresponding to the touched icon (e.g., Application K).

In some embodiments, device 700 may display an indication that the device is operating in the user interface configuration mode (i.e., that the displayed user interface may be reconfigured). The indication may include causing the display of one or more user interface objects (e.g., an application icon) to fluctuate in size.

Figure 8B:
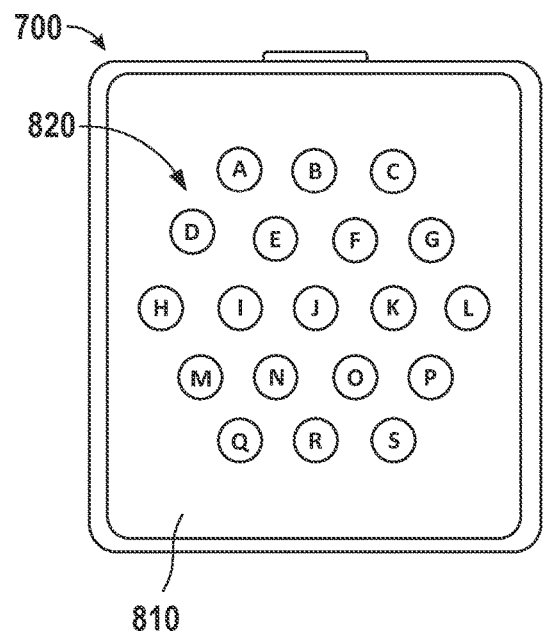

FIGS. 8A and 8B illustrate an exemplary implementation of user interface objects fluctuating in size. FIG. 8A shows the icons 820 displayed at a first size. FIG. 8B shows the icons 820 displayed at a second size smaller than the first size. In response to touch 805 (e.g., when device 700 is set to or is operating in the user interface configuration mode), device 700 may transition the display of the icons from the first size to the second size. The display of the icons may be further transitioned back to the first size such that icons fluctuate between the first size and the second size. The icons may continue to fluctuate in size until device 700 exits the user interface reconfiguration mode. Optionally, the fluctuation in size may be animated to simulate that the icons are pulsing.

In some embodiments, the fluctuation may include an oscillation of the size of the icons 820 about an average size (e.g., the average of the first and second sizes). Optionally, the center of the icons may remain fixed at a position on the display as they fluctuate.

In another exemplary implementation, device 700 may indicate that it is operating in the user interface reconfiguration mode by causing the display of the icons to jiggle or oscillate about a point. For example, device 700 may cause the icons to move as described in U.S. Pat. No. 8,423,911, entitled "Device, Method, and Graphical User Interface for Managing Folders," issued Apr. 16, 2013.

Figure 8C:
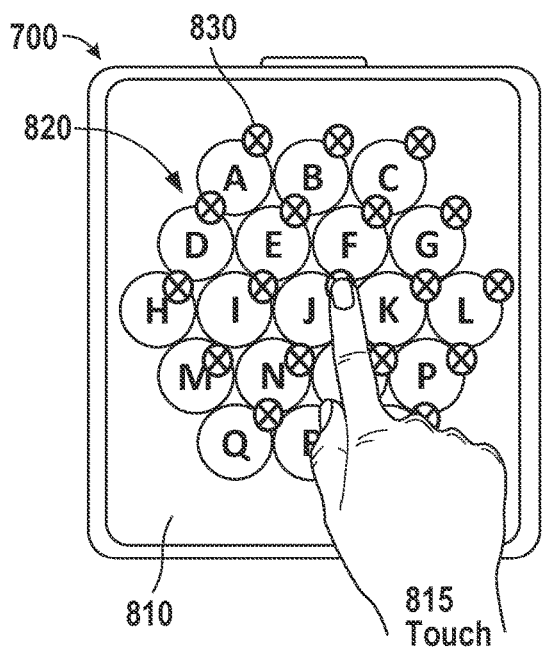

Attention is now directed to techniques and user interfaces that allow a user to cause a user interface object to be removed. In some embodiments, when device 700 is operating in the user interface reconfiguration mode, an application icon may include a deletion region indicating that the icon can be deleted (i.e., that the icon is deletable). FIG. 8C depicts an exemplary deletion region 830 on icon A.

Figure 8D:
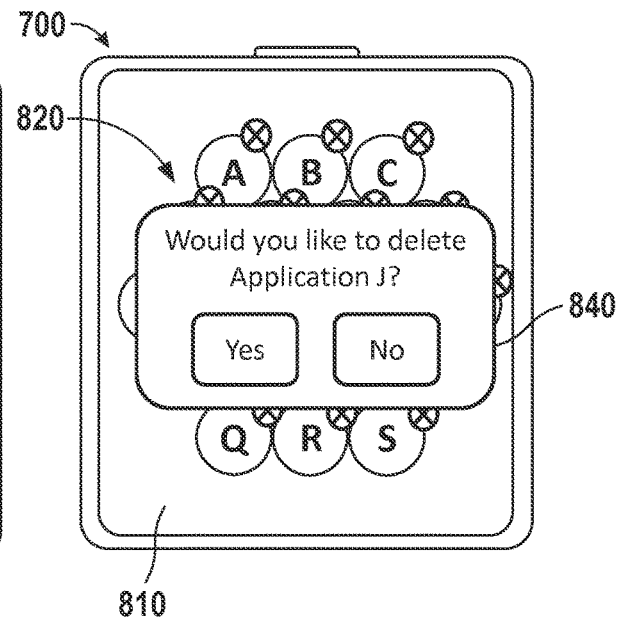

While in the user interface reconfiguration mode, device 700 may detect an input corresponding to a selection of a deletion region, and in response, remove the display of the respective icon. For example, FIG. 8C depicts a touch 815 representing a selection of the deletion region of icon J. In response to touch 815, device 700 may remove the display of icon J. Alternatively, in response to touch 815, device 700 may display a deletion confirmation affordance. FIG. 8D depicts an exemplary deletion confirmation affordance 840 that may be displayed on screen 810 in response touch 815. In response to a selection of "Yes", device 700 may remove the display of icon J. Device 700 may also cause the actual application corresponding to icon J to become unavailable (e.g., remove the application from memory). In response to a selection of "No", device 700 may remove the deletion confirmation affordance 840 from screen 810.

Yet another technique for removing an icon may include determining the intensity of a touch input. The touch-sensitive display of device 700 may comprise one or more sensors to detect the intensity of contacts with the touch-sensitive display. Device 700 may determine whether a touch representing a selection of an icon (e.g., touch 805 or 815) has a characteristic intensity above a threshold intensity. In accordance with a determination that the characteristic intensity is above the threshold intensity, device 700 may remove the display of the selected icon. Alternatively, in accordance with a determination that the characteristic intensity is not above the threshold intensity, device 700 may take no action or launch an application corresponding to the icon at the position of the touch.

In some embodiments, device 700 may detect a touch, determine the intensity, and remove the selected icon while operating in the user interface configuration mode. Optionally, providing a touch with sufficient intensity may allow a user to remove an icon without having to first enter the user interface reconfiguration mode. That is, device 700 may detect a touch, determine the intensity, and remove the selected icon while operating in a normal operation mode in which the user interface is not otherwise reconfigurable.

Device 700 may also provide a means for a user to exit the user interface reconfiguration mode. For example, while in the user interface reconfiguration mode, device 700 may detect an input, and in response, exit the user interface reconfiguration mode. Device 700 may transition from the user interface reconfiguration mode to a normal operation mode. In an exemplary normal operation mode, icons cannot be reconfigured and selection of an icon may cause device 700 to launch the corresponding application program.

Attention is now directed to techniques for reconfiguring a two-dimensional arrangement of user interface objects displayed on the display of device 700. Particular attention is directed to reconfiguring icons that occupy locations on a hexagonal grid, such as grid 600 described above. As part of reconfiguring the user interface, icons may be deleted, moved, added, etc.

Figure 9A:
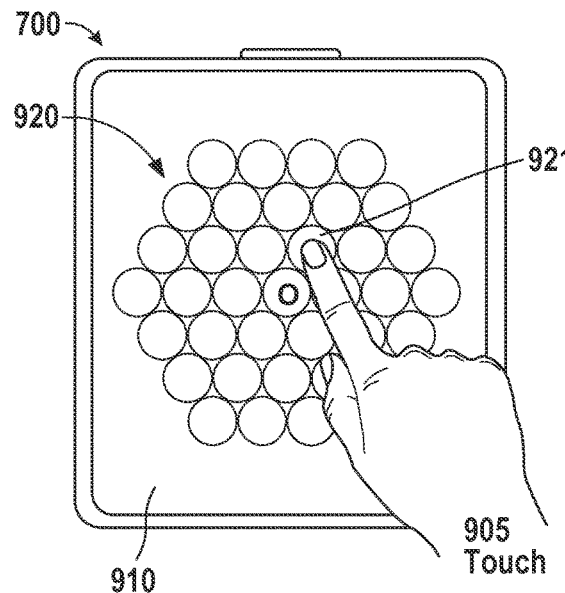
FIGS. 9A-9D illustrate exemplary techniques for reconfiguring a user interface in accordance with some embodiments.
Figure 9B:
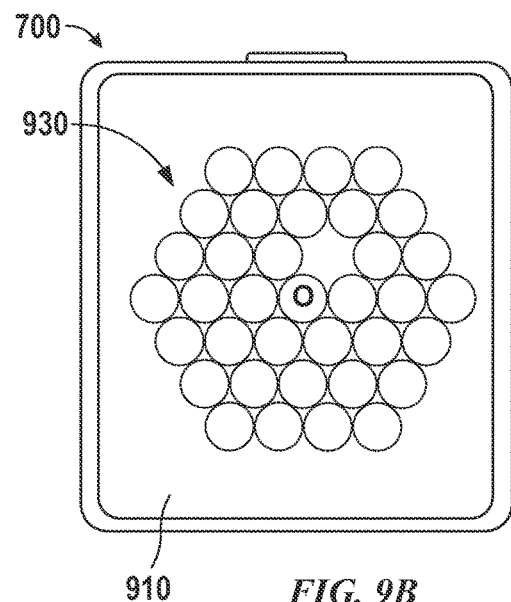

FIG. 9A shows an exemplary user interface screen 910 displayed on the display of device 700. Screen 910 includes a plurality of user interface objects arranged in an initial configuration 920 in which the application icons occupy locations on a hexagonal grid. The grid itself is not displayed. In the illustrated example, the user interface objects are application icons. The plurality of application icons may be displayed while device 700 is operating in a user interface reconfiguration mode for reconfiguring the application icons on the display.

In FIG. 9A, device 700 receives an input in the form of touch 905 at icon 921. Touch 905 may represent a request to delete icon 921. Device 700 may detect touch gesture 905 and, in response, remove the display of application icon 921. Removing icon 921 results in an unoccupied location on the hexagonal grid, as shown by the configuration 930 in FIG. 9B.

In response to detecting touch gesture 905, device 700 may also determine a new configuration for the remaining icons (i.e., a configuration without application icon 921).

The new configuration may be determined to compact the remaining icons such that the icons, as a whole, are closer to the origin compared to configuration 930. Stated another way, a sum of the distances of the icons from the origin O in the initial configuration 920, minus the distance from the origin of the removed icon 921 in the initial configuration 920, is greater than a sum of the distances from the origin of the application icons in the new configuration. In some cases, the icons may be compacted by reducing the rank (as defined above) of one or more icons. In some embodiments, the unoccupied location is filled by moving an adjacent icon in a higher rank that results in the greatest reduction in the sum distance.

The new configuration may also be determined such that there are no interior unoccupied locations in the configuration. As used herein, an interior unoccupied location refers to an unoccupied location on the hexagonal grid that is adjacent to six application icons (i.e., an unoccupied location that is entirely surrounded by other icons). The space resulting from removal of icon 921 is an example of an interior unoccupied location.

Furthermore, the new configuration may be determined such that no icon is displaced by more than one location on the hexagonal grid relative to its location in the initial configuration.

Figure 9C:
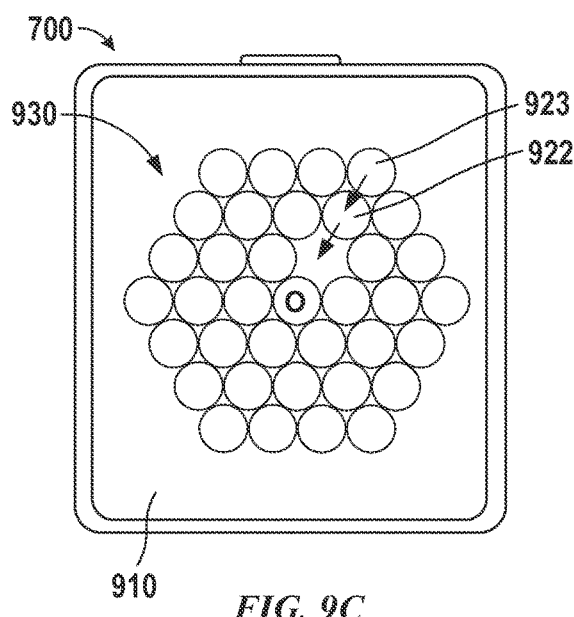
Figure 9D:
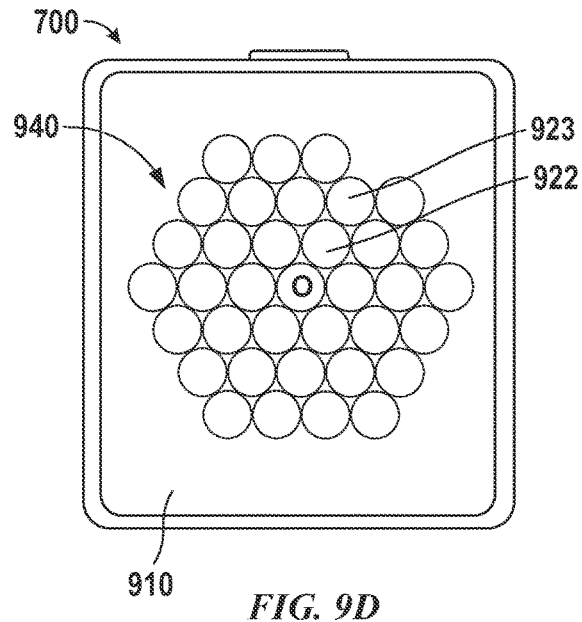

Once the new configuration is determined, device 700 may transition the display of the plurality of icons to the new configuration. FIGS. 9C-9D illustrate an exemplary transition of the plurality of icons from configuration 930 (i.e., the initial configuration 920 without icon 921) to an exemplary new configuration 940. As indicated in FIG. 9C, the plurality of icons is reconfigured by reducing the rank of icons 922 and 923. Icon 922 located diagonally adjacent to the unoccupied location is moved one step radially inward toward the origin O to fill the unoccupied location, reducing its rank from two to one. Icon 923 is also moved one step radially inward toward the origin to occupy the previous location of icon 922, reducing its rank from three to two. Icon 923 is moved so as not to leave the new configuration 940 with an unoccupied location completely surrounded by six adjacent icons. The exemplary new compacted configuration 940 is shown in FIG. 9D.

Notably, there are no interior unoccupied locations in the new configuration 940, and the sum of the distances of the icons from the origin O in the new configuration 940 is less than in configuration 930 by the total distance that the relocated icons 922 and 923 are moved toward the origin O. Also, both of the moved icons 922 and 923 were translated only one step and occupy adjacent locations of lower rank relative to their previous respective locations. Furthermore, moving icons 922 and 923 are the adjacent icons in a higher rank than the unoccupied location that result in the greatest possible reduction in the sum distance.

As shown in the illustrated example, transitioning the display of the plurality of application icons may include moving a display of an icon to an unoccupied location from a location diagonally adjacent to the unoccupied location with respect to the orientation of the display. That is, the icon that fills the location of the removed icon may do so by translating in both the vertical and horizontal directions on the display from an adjacent location.

The foregoing example provides an intuitive way to remove an icon from a hexagonal configuration of icons, and to reconfigure the remaining icons. It reduces the cognitive burden on a user when deleting the display of icons, thereby creating a more efficient human-machine interface. The rearrangement of the hexagonal grid in response to the removal of the icon maintains many of the icons in their original positions, while allowing the selected icon to be removed from the grid. Icons that are moved remain close (e.g., adjacent) to their previous positions. This allows a user, who may have familiarity with the grid arrangement, to affect the arrangement while maintaining continuity from the old arrangement to the new. This may be both aesthetically appealing and may allow a user to quickly and easily locate an icon after it has been moved. For battery-operated computing devices, enabling a user to organize and access application programs more quickly and more efficiently conserves power and increases the time between battery charges.

Attention is now directed to techniques and user interfaces for reconfiguring a plurality of user interface objects in response to relocation of one of the objects to a different location. FIGS. 10A-10D illustrate an example in which an icon on a hexagonal grid is relocated to an adjacent occupied location on the grid.

Figure 10A:
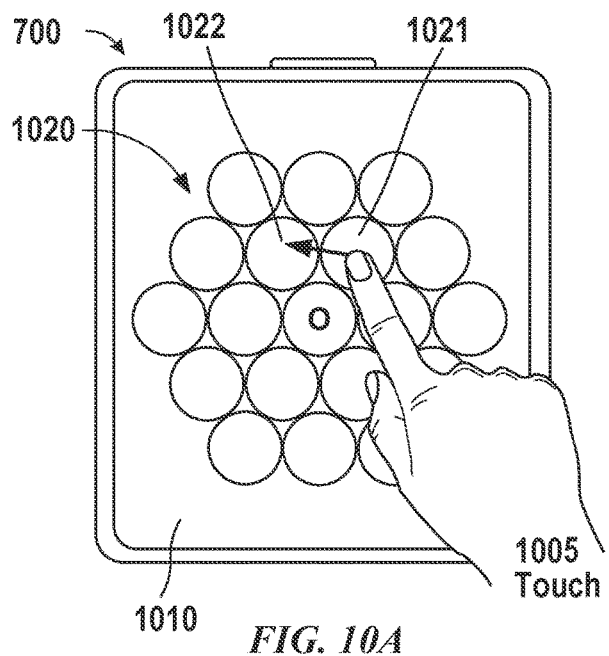
FIGS. 10A-10D illustrate exemplary techniques for reconfiguring a user interface in accordance with some embodiments.

FIG. 10A shows an exemplary user interface screen 1010 displayed on the display of device 700. Screen 1010 includes an initial configuration 1020 of a plurality of icons occupying locations on a hexagonal grid. The grid itself is not displayed. The plurality of icons may be displayed while device 700 is operating in a user interface reconfiguration mode for reconfiguring the icons on the display.

As shown in FIG. 10A, device 700 receives an input in the form of touch gesture 1005. Touch gesture 1005 represents a user contact on the touch-sensitive display at a position corresponding to icon 1021 located at a first location on the hexagonal grid. In some embodiments, touch 1005 may be a continuation of a touch that causes the device 700 to be set to a user interface reconfiguration mode (e.g., touch 805).

As indicated in FIG. 10A, touch 1005 is translated along the touch-sensitive display, without a break in contact from the touch-sensitive display, to a second position corresponding to icon 1022, which occupies a second location on the hexagonal grid.

Figure 10B:
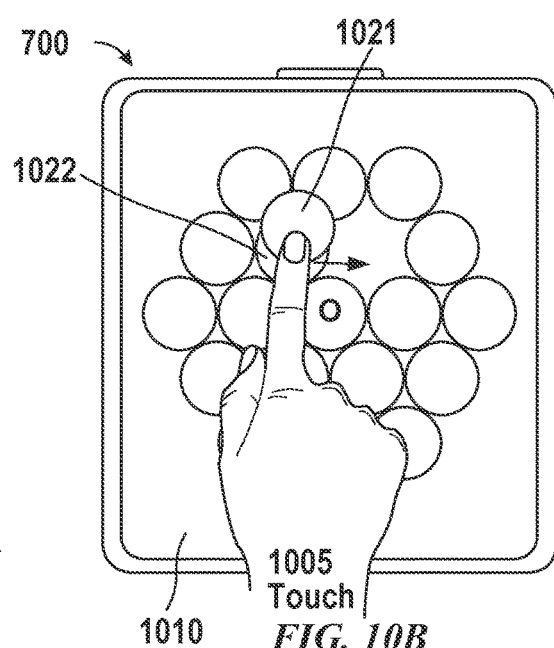
Figure 10C:
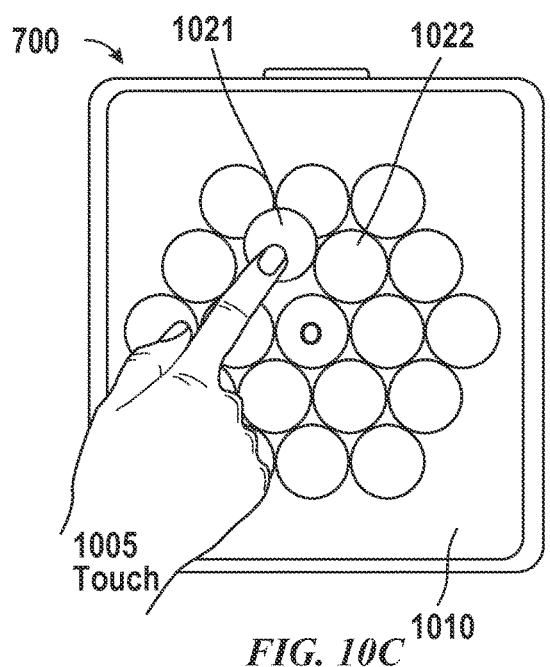
Figure 10D:
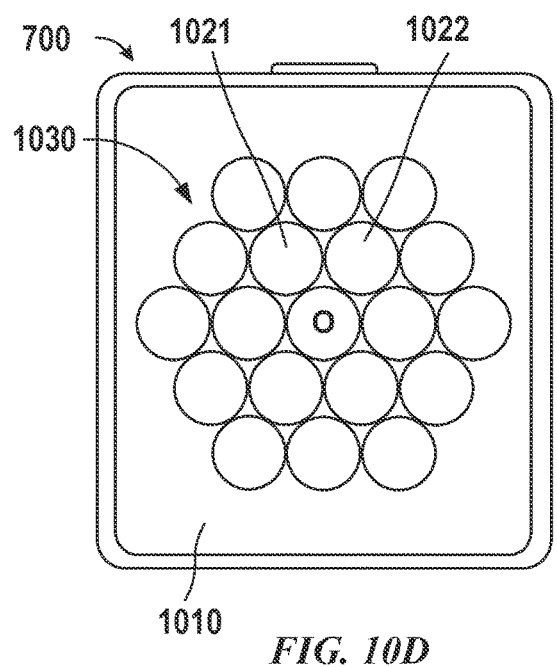

Device 700 may detect the contact and movement of touch 1005 on the touch-sensitive display. As illustrated in FIG. 10B, in response to detecting the movement of touch 1005 from the first position to the second position, device 700 may translate the display of icon 1021 from its initial location to the second position of the touch slightly above and to the right of the center of icon 1022. In some embodiments, the translation of icon 1021 may track the movement of the touch 1005.

Translating the display of icon 1021 results in the initial location of icon 1021 being unoccupied. In further response to detecting the movement of touch 1005 from the first position to the second position, device 700 may move the display of icon 1022 to the location on the hexagonal grid previously occupied by icon 1021, resulting in configuration 1030 illustrated in FIG. 10D. When touch 1005 is released, icon 1021 may be moved to the previous location of icon 1022. In some embodiments, icon 1022 may be moved to the unoccupied location before touch 1005 is released.

The foregoing example illustrates an intuitive way to move a selected application icon in a hexagonal configuration of icons to a desired location and reduces the cognitive burden on a user when organizing icons, thereby creating a more efficient human-machine interface. The rearrangement of the hexagonal grid in response to the movement of the icon maintains the greatest number of icons in their original positions, while allowing the selected icon to be moved within the grid. This allows a user, who may have familiarity with the grid arrangement, to affect the arrangement while maintaining continuity from the old arrangement to the new. This may be both aesthetically appealing and may allow a user to quickly and easily locate an icon after it has been moved. For battery-operated computing devices, enabling a user to organize and access application programs more quickly and more efficiently conserves power and increases the time between battery charges.

Figure 11A:
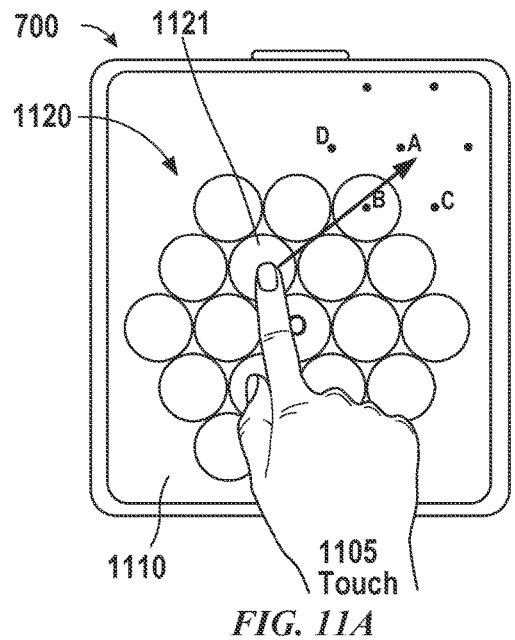
FIGS. 11A-11D illustrate exemplary techniques for reconfiguring a user interface in accordance with some embodiments.

Attention is now directed to an example in which an icon on a hexagonal grid is relocated to an unoccupied location is described. FIG. 11A shows an exemplary user interface screen 1110 displayed on the display of device 700. Screen 1110 includes an initial configuration 1120 of a plurality of icons occupying locations on a hexagonal grid. The grid itself is not displayed. The plurality of icons may be displayed while device 700 is operating in a user interface reconfiguration mode for reconfiguring the icons on the display.

Device 700 may detect an input 1105 representing a selection of icon 1121. In FIG. 11A, the input 1105 is a touch gesture representing a user contact on the touch-sensitive display at a position corresponding to icon 1121 located at a first location on the hexagonal grid. In some embodiments, touch 1105 may be a continuation of a touch that causes the device 700 to be set to a user interface reconfiguration mode (e.g., touch 805).

As indicated in FIG. 11A, touch 1105 is translated along the touch-sensitive display, without a break in contact from the touch-sensitive display, to a second position corresponding to an unoccupied location on the hexagonal grid. In the present example, touch 1105 is translated to the position shown in FIG. 11B, which corresponds an unoccupied location outside of configuration 1120 above and to the right of icon 1122.

Figure 11B:
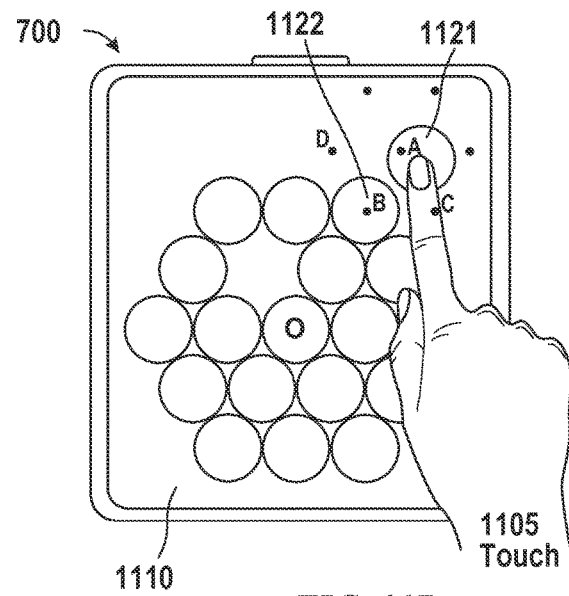

Device 700 may detect the contact and movement of touch 1105. In response, device 700 may translate the display of icon 1121 from its initial location on the hexagonal grid to the second position as shown in FIG. 11B. In some embodiments, the translation of icon 1121 may track the movement of the touch 1105.

Figure 11C:
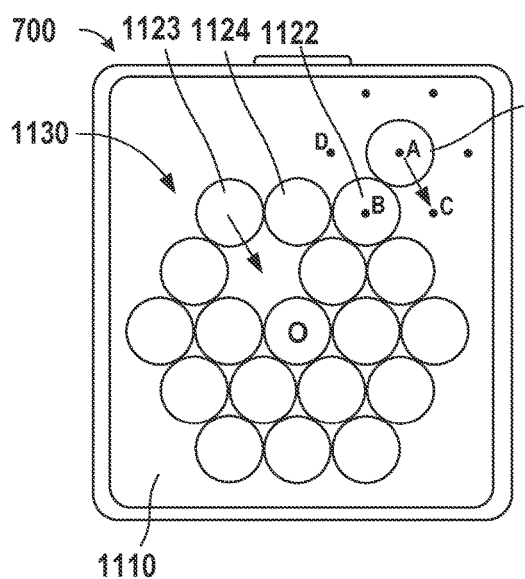

FIG. 11C depicts grid locations near the second position of touch 1105. In the illustrated example, the second position of touch 1105 corresponds to a location represented by grid indicator A. Indicators representing location A and the locations adjacent to A are shown in FIG. 11C for reference, but may not actually be displayed on screen 1110. A user may attempt to place icon 1121 at location A by breaking contact of touch 1105 from the touch-sensitive display, leaving the plurality of icons in the configuration 1130 shown in FIG. 11C.

In some embodiments, device 700 may require that each icon in a plurality of icons have at least two neighboring icons on the hexagonal grid. That is, at least two locations on the hexagonal grid adjacent to an icon must be occupied. Stated another way, no more than four of the location on the hexagonal grid adjacent to an icon may be unoccupied.

Device 700 may detect the break in contact of touch 1105 and, in response, determine whether there are less than two occupied locations adjacent to the location associated with the second position of touch 1105 (i.e., location A). In the illustrated example, since location B is the only location on the hexagonal grid adjacent to location A that is occupied, device 700 determines that icon 1121 has only one neighbor.

In accordance with a determination that there are less than two occupied locations adjacent to location A, device 700 may determine an alternative unoccupied location on the hexagonal grid for icon 1121 that has at least two adjacent occupied locations, and move the display of icon 1121 to the alternative location. Device 700 may determine the alternative location based on proximity to the requested location. The alternative location may be a location on the hexagonal grid nearest to location A that is adjacent to at least two occupied locations. In FIG. 11C, locations C and D are unoccupied, equidistant from location A, and adjacent to at least two other icons. As indicated in the illustrated example, device 700 determines location C as the alternative location and moves icon 1121 accordingly (see FIG. 11D).

In accordance with a determination that there are greater than two occupied locations adjacent to location A, device 700 may leave icon 1121 in the location corresponding to the second position of touch 1105.

Notably, translating the display of icon 1121 result in an unoccupied interior location in the hexagonal grid (i.e., an unoccupied location adjacent to six icons). In accordance with a determination that the unoccupied location is adjacent to six icons, device 700 may determine a new configuration of the plurality of application icons without an unoccupied location adjacent to six application icons. Optionally, in accordance with a determination that the unoccupied location is not adjacent to six application icons, the display of the plurality of application icons may be maintained in its current configuration.

Device 700 may determine the new configuration according to one or more of the techniques described above with reference to FIGS. 9A-9D. For example, the new configuration may be determined to compact the icons such that, as a whole, the icons move closer to the origin. The configuration may also be determined such that the new configuration has no unoccupied locations adjacent to six icons and no icon is moved more than one step.

Figure 11D:
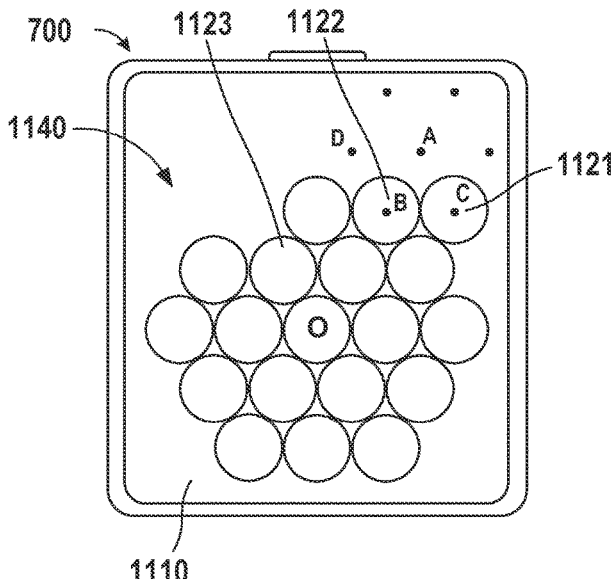

FIGS. 11C-11D illustrate an exemplary transition of the plurality of icons to an exemplary new configuration 1140. As indicated in FIG. 11C, device 700 transitions the display of icon 1123 one step on the hexagonal grid toward the origin so that the configuration no longer includes an unoccupied location with six adjacent icons. Moving icon 1123 toward the origin also reduces the sum of the distances of the icons from the origin. FIG. 11D shows the icons arranged in the new configuration 1140. Furthermore, icon 1123 is the icon of higher rank adjacent to the unoccupied location that results in the greatest reduction in sum distance from the origin of the configuration.

The foregoing example illustrates an intuitive way to move a selected application icon in a hexagonal configuration of icons to a desired location and reduces the cognitive burden on a user when organizing icons, thereby creating a more efficient human-machine interface. The rearrangement of the hexagonal grid in response to the movement of the icon keeps the icons together and maintains many of the icons in their original positions, while allowing the selected icon to be moved within the grid. Icons that are moved remain close (e.g., adjacent) to their previous positions. This allows a user, who may have familiarity with the grid arrangement, to affect the arrangement while maintaining continuity from the old arrangement to the new. This may be both aesthetically appealing and may allow a user to quickly and easily locate an icon after it has been moved. For battery-operated computing devices, enabling a user to organize and access application programs more quickly and more efficiently conserves power and increases the time between battery charges.

It should be recognized that icon 1123 may be moved before, after, or at the same time as icon 1121 is moved from location A to location C (e.g., upon the translation of icon 1121 to location A). It should also be recognized that removal of an icon, may result in a remaining icon being left with only one neighbor. In which case, the techniques described above may be applied to reconfigure the remaining icons such that no icon has less than two adjacent icons.

Figure 12A:
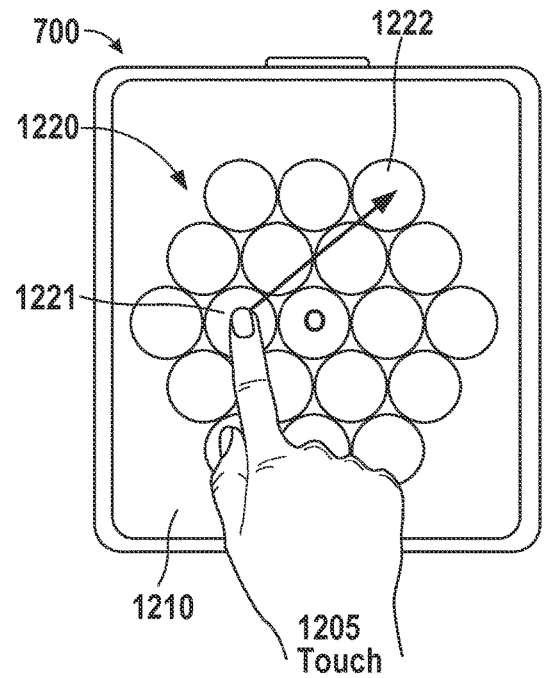
FIGS. 12A-12D illustrate exemplary techniques for reconfiguring a user interface in accordance with some embodiments.

Attention is now directed to examples in which an icon is moved to a non-adjacent occupied location. FIG. 12A shows an exemplary user interface screen 1210 displayed on the display of device 700. Screen 1210 includes an initial configuration 1220 of a plurality of icons occupying locations on a hexagonal grid. The grid itself is not displayed. The plurality of icons may be displayed while device 700 is operating in a user interface reconfiguration mode for reconfiguring the icons on the display.

Device 700 may detect an input 1205 representing a selection of icon 1221. In FIG. 12A, the input 1205 is a touch gesture representing a user contact on the touch-sensitive display at a position corresponding to icon 1221 located at a first location on the hexagonal grid. In some embodiments, touch 1205 may be a continuation of a touch that causes the device 700 to be set to a user interface reconfiguration mode (e.g., touch 805).

As indicated in FIG. 12A, touch 1205 is translated along the touch-sensitive display, without a break in contact from the touch-sensitive display, to a second position corresponding to a location on the hexagonal grid occupied by icon 1222.

Device 700 may detect the contact and movement of touch 1205. In response, device 700 may translate the display of icon 1221 from its initial location on the hexagonal grid to the second position of the touch slightly offset to the right of location A indicated in FIG. 12B. In some embodiments, the translation of icon 1221 may track the movement of the touch 1205.

In further response to detecting the movement of touch 1205 from the first position to the second position, device 700 may determine a new configuration of the icons based on the previous location of icon 1221 (indicated by point D in FIG. 12B) and the location corresponding to the second position of the touch, location A. The new configuration may be determined to fill the unoccupied location resulting from the translation of icon 1221 (i.e., location D). The new configuration may also be determined such that no icon, except the selected icon 1221 is displaced by more than one location relative to its location in configuration 1220.

Figure 12B:
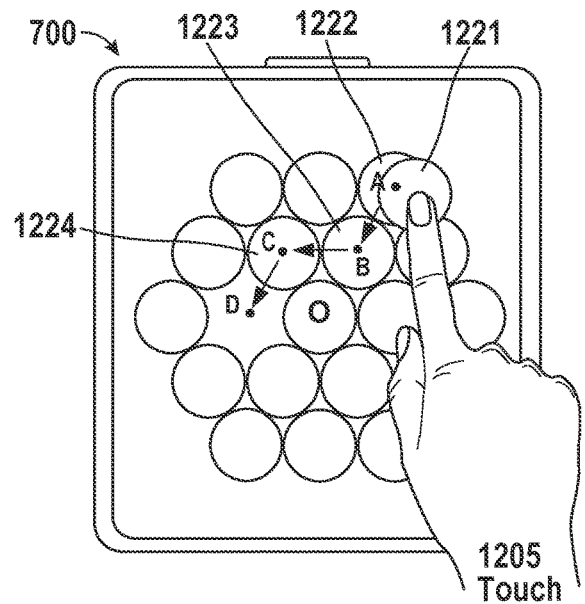
Figure 12C:
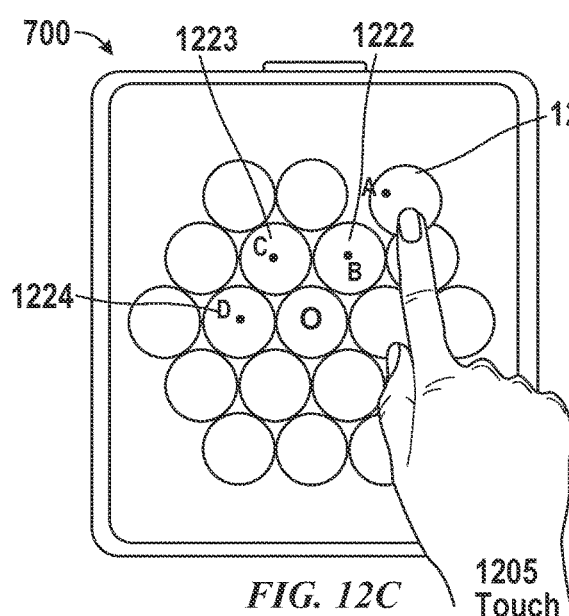
Figure 12D:
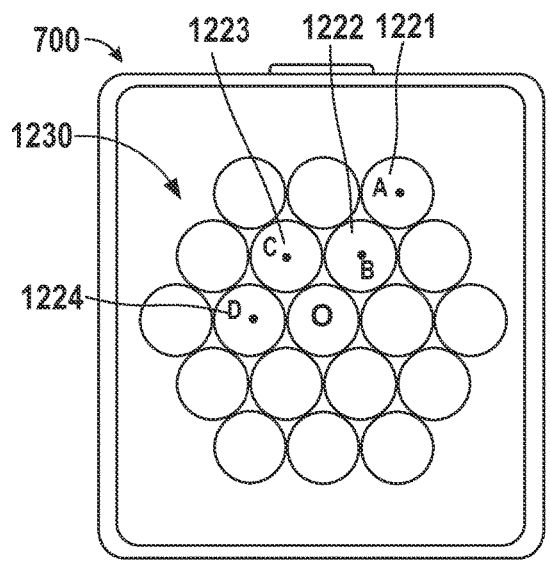

FIGS. 12B-12D illustrate an exemplary transition of the plurality of icons to an exemplary new configuration 1230. As indicated in FIG. 12B, icon 1222 is moved one step on the hexagonal grid toward the origin to location B; icon 1223 is moved one step on the hexagonal grid counter-clockwise around the origin to location C; and icon 1224 is moved one step on the hexagonal grid counter-clockwise around the origin to location D. As shown in FIG. 12C, the display of the icons may be transitioned to the new configuration before touch 1205 is released.

In some embodiments, device 700 may determine which icons to move, and to which locations, according to the following technique. If a first icon in a first location (e.g., the selected icon) is moved to the location of a second icon at a higher rank, the second icon is moved to an adjacent location in the next lowest rank that is closest to the unoccupied first location. If the location to which the second icon is moved is occupied by a third icon, the third icon is moved according to the same method as the second icon provided it is in a higher rank than the unoccupied first location. Device 700 may attempt to move each subsequent icon according to this technique until an icon is reached with the same rank as the unoccupied first location left by the first icon. If an icon has the same rank as the unoccupied first location, the icon is moved to an adjacent location in the same rank that is closest to the unoccupied first location. This process may continue until an icon is moved into the first unoccupied location. Notably, the rank of each moved icon is reduced until an icon in the same rank as the unoccupied location is reached.

The new configuration 1230 and transition described above with reference to FIGS. 12B-12D illustrate an exemplary implementation of this technique. Icon 1221 is moved from location D in rank one to location A of icon 1222 in rank two (i.e., a higher rank). Location B is the location adjacent to location A in the next lowest rank that is closes to location D. Thus, icon 1222 is moved to location B. Icon 1223 is located at location B. Since location B has the same rank as unoccupied location D, icon 1223 is moved to location C, which is the location adjacent to location B within the same rank that is closest to location D. Icon 1224 at location C moves to location D since it is adjacent to location D.

In some embodiments, once touch 1205 breaks contact with the touch-sensitive display, the display of icon 1221 is moved such that it is centered on location A. FIG. 12D shows the icons arranged in the new configuration 1230 with icon 1221 at location A. It should be recognized that the display of the plurality of icons may be transitioned to the new configuration before, after, or at the same time as icon 1221 is moved to a position corresponding to a different location on the hexagonal grid (e.g., upon the translation of icon 1221 to the position close to location A).

The foregoing example illustrates an intuitive way to move a selected application icon in a hexagonal configuration of icons to a desired location and reduces the cognitive burden on a user when organizing icons, thereby creating a more efficient human-machine interface. The rearrangement of the hexagonal grid in response to the movement of the icon maintains many of the icons in their original positions, while allowing the selected icon to be moved within the grid. Icons that are moved remain close (e.g., adjacent) to their previous positions. This allows a user, who may have familiarity with the grid arrangement, to affect the arrangement while maintaining continuity from the old arrangement to the new. This may be both aesthetically appealing and may allow a user to quickly and easily locate an icon after it has been moved. For battery-operated computing devices, enabling a user to organize and access application programs more quickly and more efficiently conserves power and increases the time between battery charges.

In some embodiments, a configuration may be determined such that an icon is not moved if it has a lower rank than both the location of the selected icon (e.g., icon 1221) and the location corresponding to the second position of the touch 1205. That is, icons having a rank lower than the rank of the location corresponding to the first position of the touch and lower than the rank of the location corresponding to the second position of the touch are displayed in the same location in the new configuration as in the initial configuration.

Figure 13A:
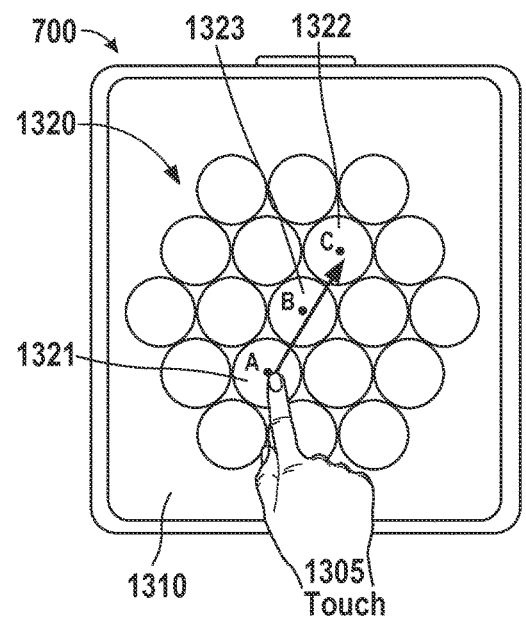
FIGS. 13A-13D illustrate exemplary techniques for reconfiguring a user interface in accordance with some embodiments.
Figure 13B:
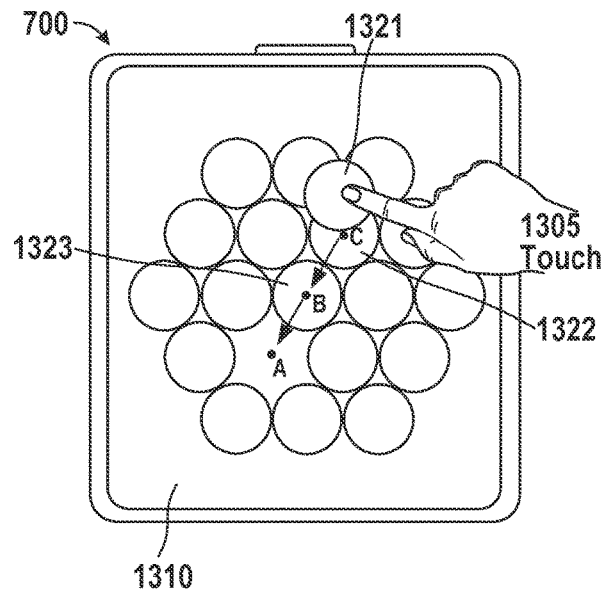

FIGS. 13A-13D illustrate an exemplary implementation of this technique. FIGS. 13A-13D also illustrate an example of a selected icon being moved to a different location within the same rank. FIG. 13A shows an exemplary user interface screen 1310 displayed on the display of device 700. Screen 1310 includes an initial configuration 1320 of a plurality of icons occupying locations on a hexagonal grid. The grid itself is not displayed. The plurality of icons may be displayed while device 700 is operating in a user interface reconfiguration mode for reconfiguring the icons on the display.

Device 700 may detect an input 1305 representing a selection of icon 1321. In FIG. 13A, the input 1305 is a touch gesture representing a user contact on the touch-sensitive display at a position corresponding to icon 1321 located at a first location on the hexagonal grid. In some embodiments, touch 1305 may be a continuation of a touch that causes the device 700 to be set to a user interface reconfiguration mode (e.g., touch 805).

As indicated in FIG. 13A, touch 1305 is translated along the touch-sensitive display, without a break in contact from the touch-sensitive display, to a second position corresponding to a location on the hexagonal grid occupied by icon 1322.

Device 700 may detect the contact and movement of touch 1305. In response, device 700 may translate the display of icon 1321 from its initial location on the hexagonal grid to the second position of the touch shown in FIG. 13B. In some embodiments, the translation of icon 1321 may track the movement of the touch 1305.

In further response to detecting the movement of touch 1305 from the first position to the second position, device 700 may determine a new configuration and transition the display of the icons based on the previous location of icon 1321 (indicated by point A) and the location corresponding to the second position of the touch, location C.

Figure 13C:
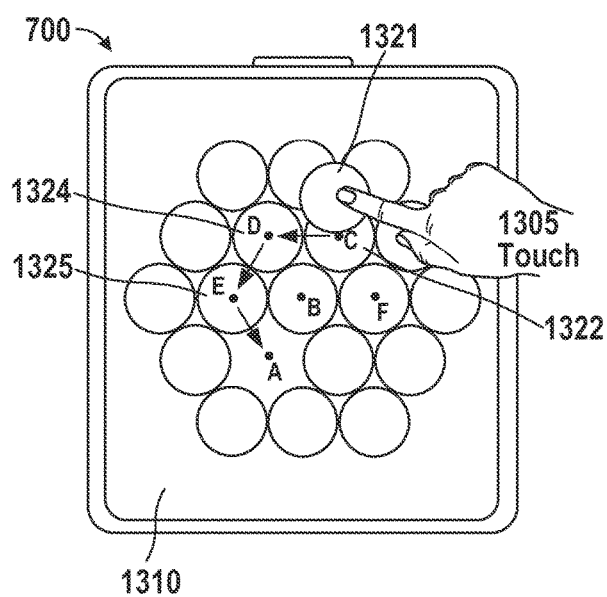
Figure 13D:
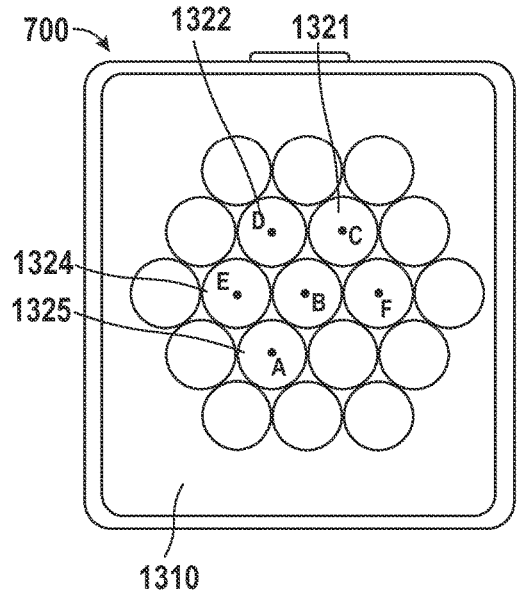

In some embodiments, the icons may be reconfigured by moving icon 1322 to location B (i.e., the origin O) and icon 1323 from location B to location A. However, the location of the selected icon 1321 and the location to which icon 1321 is moved both have a rank of one. Location B (the origin) has a rank of zero. To satisfy the criterion of maintaining the position of icons having a lower rank than the locations of the selected icon and the location corresponding to the second position of the touch 1305, the icons may be moved around the origin to avoid moving icon 1323. For example, as illustrated in FIGS. 13C-13D, icons 1322, 1324, and 1325 may each be moved one location counter-clockwise around the origin to fill unoccupied location A.

Notably, this reconfiguration is another example of the technique described above in which icons with the same rank as the unoccupied location of the selected icon are moved to an adjacent location in the same rank that is closest to the unoccupied location. As shown in FIG. 13C, locations D and F are in the same rank as location C and are equally close to the unoccupied location A. Thus, icon 1322 could have been moved to either location D or F. In the illustrated example, device 700 determines to move icon 1322 to location D. Location E is the location adjacent to E in the same rank that is closest to A, so icon 1324 is moved to location E. Icon 1325 is adjacent to location A and is thus moved to fill the unoccupied location.

The foregoing example illustrates an intuitive way to move a selected application icon in a hexagonal configuration of icons to a desired location and reduces the cognitive burden on a user when organizing icons, thereby creating a more efficient human-machine interface. The rearrangement of the hexagonal grid in response to the movement of the icon maintains many of the icons in their original positions, while allowing the selected icon to be moved within the grid. Icons that are moved remain close (e.g., adjacent) to their previous positions. This allows a user, who may have familiarity with the grid arrangement, to affect the arrangement while maintaining continuity from the old arrangement to the new. This may be both aesthetically appealing and may allow a user to quickly and easily locate an icon after it has been moved. For battery-operated computing devices, enabling a user to organize and access application programs more quickly and more efficiently conserves power and increases the time between battery charges.

In some embodiments, a selected icon may be moved to a non-adjacent location of lower rank. For example, the second point of a dragged touch in the example above may correspond to a location of lower rank than the location corresponding to the first point of the touch.

Figure 14A:
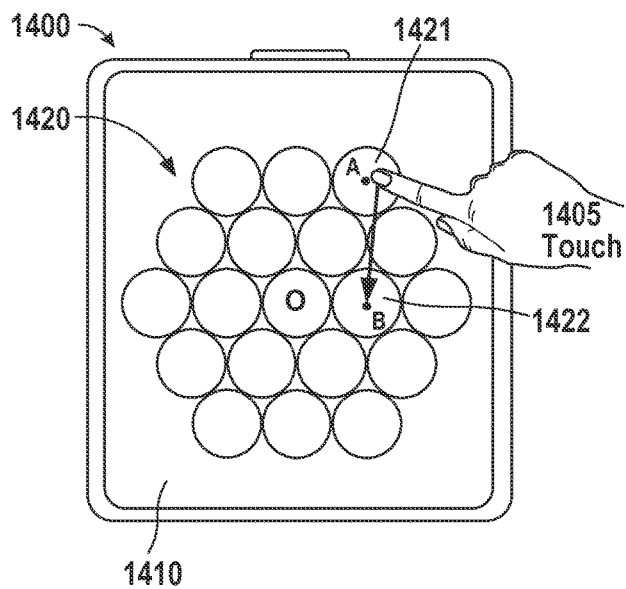
FIGS. 14A-14D illustrate exemplary techniques for reconfiguring a user interface in accordance with some embodiments.

FIGS. 14A-14D illustrate an example in which a selected icon is moved to a non-adjacent location of lower rank. FIG. 14A shows an exemplary user interface screen 1410 displayed on the display of device 700. Screen 1410 includes an initial configuration 1420 of a plurality of icons occupying locations on a hexagonal grid. The grid itself is not displayed. The plurality of icons may be displayed while device 700 is operating in a user interface reconfiguration mode for reconfiguring the icons on the display.

Device 700 may detect an input 1405 representing a selection of icon 1421. In FIG. 14A, the input 1405 is a touch gesture representing a user contact on the touch-sensitive display at a position corresponding to icon 1421 located at a first location on the hexagonal grid. In some embodiments, touch 1405 may be a continuation of a touch that causes the device 700 to be set to a user interface reconfiguration mode (e.g., touch 805).

As indicated in FIG. 14A, touch 1405 is translated along the touch-sensitive display, without a break in contact from the touch-sensitive display, to a second position corresponding to a location on the hexagonal grid occupied by icon 1422.

Device 700 may detect the contact and movement of touch 1405. In response, device 700 may translate the display of icon 1421 from its initial location on the hexagonal grid to the second position of the touch shown in FIG. 14B. In some embodiments, the translation of icon 1421 may track the movement of the touch 1405.

In further response to detecting the movement of touch 1405 from the first position to the second position, device 700 may determine a new configuration and transition the display of the icons based on the previous location of icon 1421 (location A) and the location corresponding to the second position of the touch (location B). Notably, location A has a rank of two and location B has a rank of one.

Figure 14B:
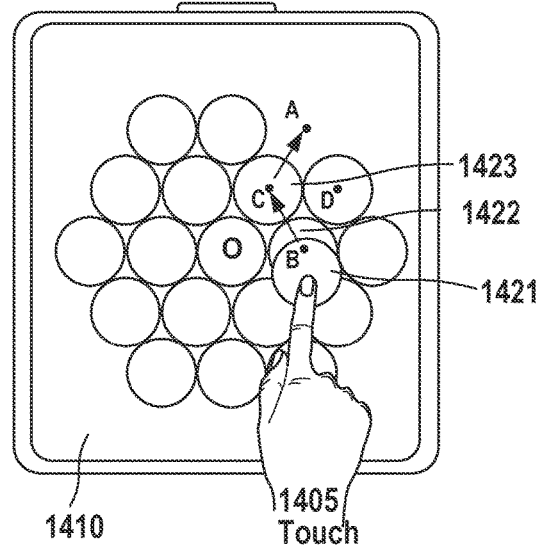
Figure 14C:
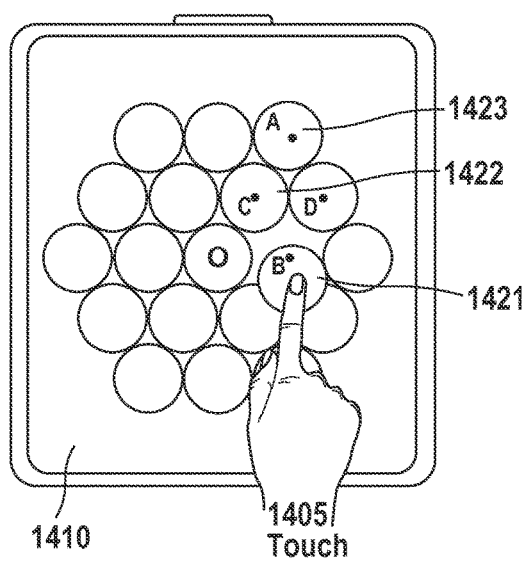
Figure 14D:
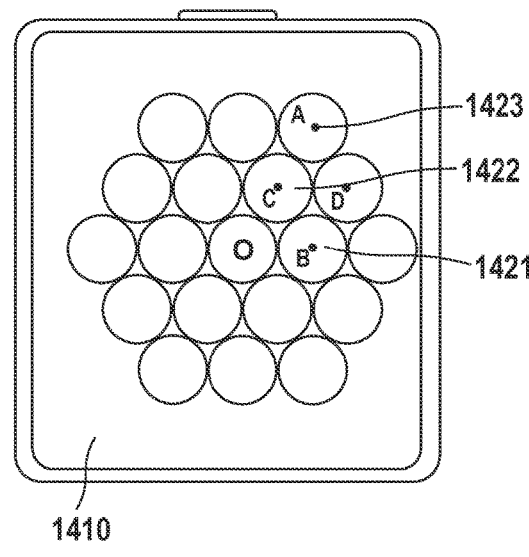

Device 700 may determine a new configuration and transition the display of the icons as indicated in FIGS. 14B-14D. FIG. 14B indicates that the display of the icons transition to the new configuration by moving icon 1422 within rank one to location C and moving icon 1423 from rank one to rank two into unoccupied location A. More generally, the unoccupied location is filled by an icon from a lower rank, and the icon at the location to which the selected icon is being moved stays in the same rank. Notably, the icons are also transitioned such that no icon moves more than one step on the hexagonal grid, the icon at the origin is not moved, and there are no unoccupied interior locations.

In some embodiments, device 700 may determine which icons to move, and to which locations, according to the following technique. If a first icon in a first location (e.g., the selected icon) is moved to the location of a second icon at a lower rank, the second icon is moved to an adjacent location in an equal or higher rank that is closest to the unoccupied first location. In some embodiments, if there are two adjacent locations that are equally close to the unoccupied location, the icon is moved to the location with equal rank. If the location to which the second icon is moved is occupied by a third icon, the third icon is moved according to the same method as the second icon. Device 700 may attempt to move each subsequent icon according to this technique until an icon is moved into the unoccupied location left by the first icon.

The new configuration and transition described above with reference to FIGS. 14B-14D illustrate an exemplary implementation of this technique. Icon 1421 is moved from location A in rank two to location B of icon 1422 in rank one. Location C is the location adjacent to location B that is closest to unoccupied location A and is in the same rank. Note that relative to location B, adjacent location D is the same distance from A as location C, but is in a higher rank. Thus, icon 1422 is moved to location C. Icon 1423 is located at location C. Since location C is adjacent to the unoccupied location A, icon 1423 moves up in rank to fill the unoccupied location.

The foregoing example illustrates an intuitive way to move a selected application icon in a hexagonal configuration of icons to a desired location and reduces the cognitive burden on a user when organizing icons, thereby creating a more efficient human-machine interface. The rearrangement of the hexagonal grid in response to the movement of the icon maintains many of the icons in their original positions, while allowing the selected icon to be moved within the grid. Icons that are moved remain close (e.g., adjacent) to their previous positions. This allows a user, who may have familiarity with the grid arrangement, to affect the arrangement while maintaining continuity from the old arrangement to the new. This may be both aesthetically appealing and may allow a user to quickly and easily locate an icon after it has been moved. For battery-operated computing devices, enabling a user to organize and access application programs more quickly and more efficiently conserves power and increases the time between battery charges.

In addition to the techniques described above, various other techniques are possible for reconfiguring user interface objects arranged on a hexagonal grid. For example, the icons may be arranged such that there are no breaks between groups of icons. That is, there is no icon that is adjacent only to icons of equal or higher rank (i.e., every icon is adjacent to at least one icon of lower rank).

Attention is now directed to techniques and user interfaces for improving the ability of a user to accurately position a touch on a touch-sensitive display. The ability to accurately position a touch may make use of a device more efficient by helping a user relocate a selected icon to a desired location.

Figure 15A:
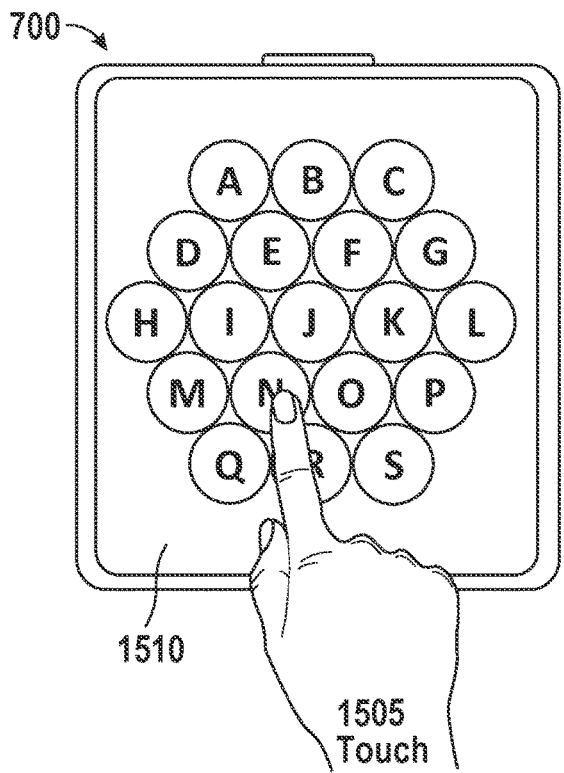
FIGS. 15A-15C illustrate exemplary techniques for reconfiguring a user interface in accordance with some embodiments.

FIG. 15A shows an exemplary user interface screen 1510 displayed on the display of device 700. Screen 1510 includes a plurality of user interface objects (e.g., application icons for launching application programs) arranged in a hexagonal grid. The plurality of user interface objects may be displayed while device 700 is operating in a user interface reconfiguration mode for reconfiguring the application icons on the display.

Figure 15B:
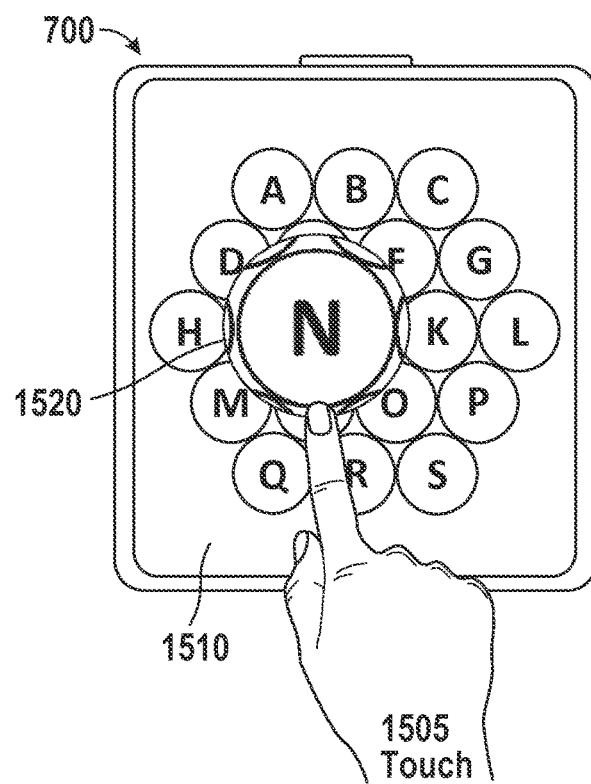

In FIG. 15A, a user contact in the form of a touch input 1505 is positioned on an icon corresponding to application N. In some embodiments, device 700 may determine whether the duration of the touch 1505 exceeds a predetermined threshold. In accordance with a determination that the duration of the touch 1505 exceeds the predetermined threshold, device 700 may display an enlarged portion 1520 of the displayed screen 1510 that includes an area surrounding the current position of the touch 1505. FIG. 15B depicts an exemplary enlarged view 1520. In the illustrated example, the enlarged view includes a circular display positioned above the current point of contact on the touch-sensitive display.

In some embodiments, it may be possible for a user to scan along the display to view an enlarged view of a different portion of the screen 1510. Without releasing the touch 1505, a user may drag (e.g., slide) the touch to a different point on the display. If device 700 has a small form factor and/or a small display, the enlarged portion of the screen may help the user know the current position of the touch and to accurately place icon N in a new desired location.

Figure 15C:
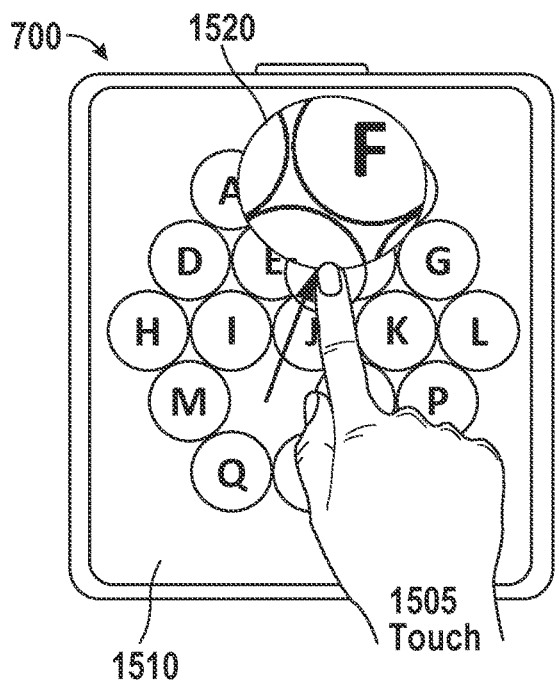

As indicated by the arrow in FIG. 15C, the touch is moved, without breaking contact with the touch-sensitive display, to a position on an icon corresponding to application F. While in the a user interface reconfiguration mode, device 700 may detect touch 1505 on the touch-sensitive display at icon N, and while continuing to detect touch 1505, may detect the movement of the touch from the position on icon N to the position on icon F without a break in contact of the touch on the touch-sensitive display.

In response to detecting the movement, device 700 may update enlarged view as touch 1505 is moved along the touch-sensitive display. Also, icon N may be translated along with the movement of the touch such that the icon is displayed at the point of contact of the touch (e.g., underneath the user's finger). In the illustrated example, however, icon N does not appear in the enlarged view 1520. In some embodiments, the enlarged view of the displayed screen may include the display of the icon being relocated (e.g., icon N).

In some embodiments, instead of, or in addition to displaying the enlarged view in accordance with a determination that the duration of the touch 1505 exceeds the predetermined threshold, device 700 may display the enlarged view in response to detecting the movement.

Attention is now directed to exemplary processes for carrying out the user interface techniques described above.

Figure 16:
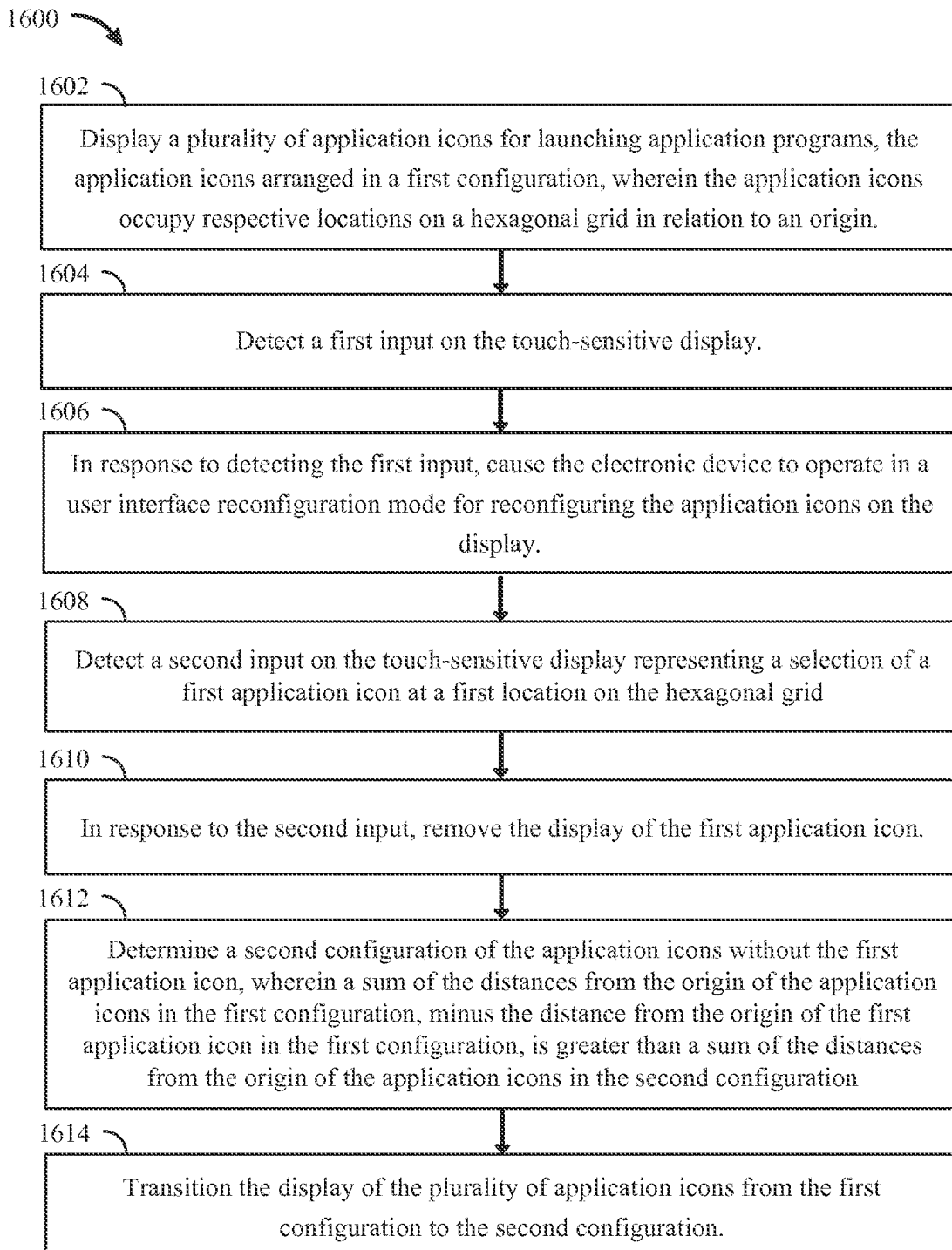
FIG. 16 is a flow diagram illustrating a process for reconfiguring a user interface in accordance with some embodiments.

FIG. 16 is a flow diagram illustrating process 1600 for reconfiguring a user interface at an electronic device with a touch-sensitive display. Process 1600 may be carried out by electronic devices such as devices 100, 300, and/or 500 (FIGS. 1A, 3, 5A) in various embodiments.

Process 1600 may provide an intuitive way to remove an application icon from a hexagonal configuration of icons, and to reconfigure the remaining icons. The method reduces the cognitive burden on a user when deleting the display of icons, thereby creating a more efficient human-machine interface. Process 1600 also provides a way to reorganize icons that keeps the icons together and close to their previous positions. This may be both aesthetically appealing and may allow a user to quickly and easily locate an icon after it has been moved. For battery-operated computing devices, enabling a user to organize and access application programs more quickly and more efficiently conserves power and increases the time between battery charges.

At block 1602, a plurality of application icons (e.g., 820) for launching application programs is displayed on the display (e.g., 112, 340, 504). The application icons may be arranged in a first configuration (e.g., 920) and may occupy respective locations on a hexagonal grid (e.g., 600) in relation to an origin. At block 1604, a first input (e.g., 805) on the touch-sensitive display is detected. At block 1606, in response to detecting the first input, the electronic device is caused to operate in a user interface reconfiguration mode for reconfiguring the application icons on the display. At block 1608, a second input (e.g. 905) is detected on the touch-sensitive display representing a selection of a first application icon (e.g., 921) at a first location on the hexagonal grid. At block 1610, in response to the second input (e.g., 905), the display of the first application icon (e.g., 921) is removed. At block 1612, a second configuration (e.g., 940) of the application icons without the first application icon (e.g., 921) is determined such that a sum of the distances from the origin of the application icons in the first configuration (e.g., 920), minus the distance from the origin of the first application icon (e.g., 921) in the first configuration, is greater than a sum of the distances from the origin of the application icons in the second configuration (e.g., 920). At block 1614, the display of the plurality of application icons is transitioned from the first configuration (e.g., 920) to the second configuration (e.g., 940).

Figure 17:
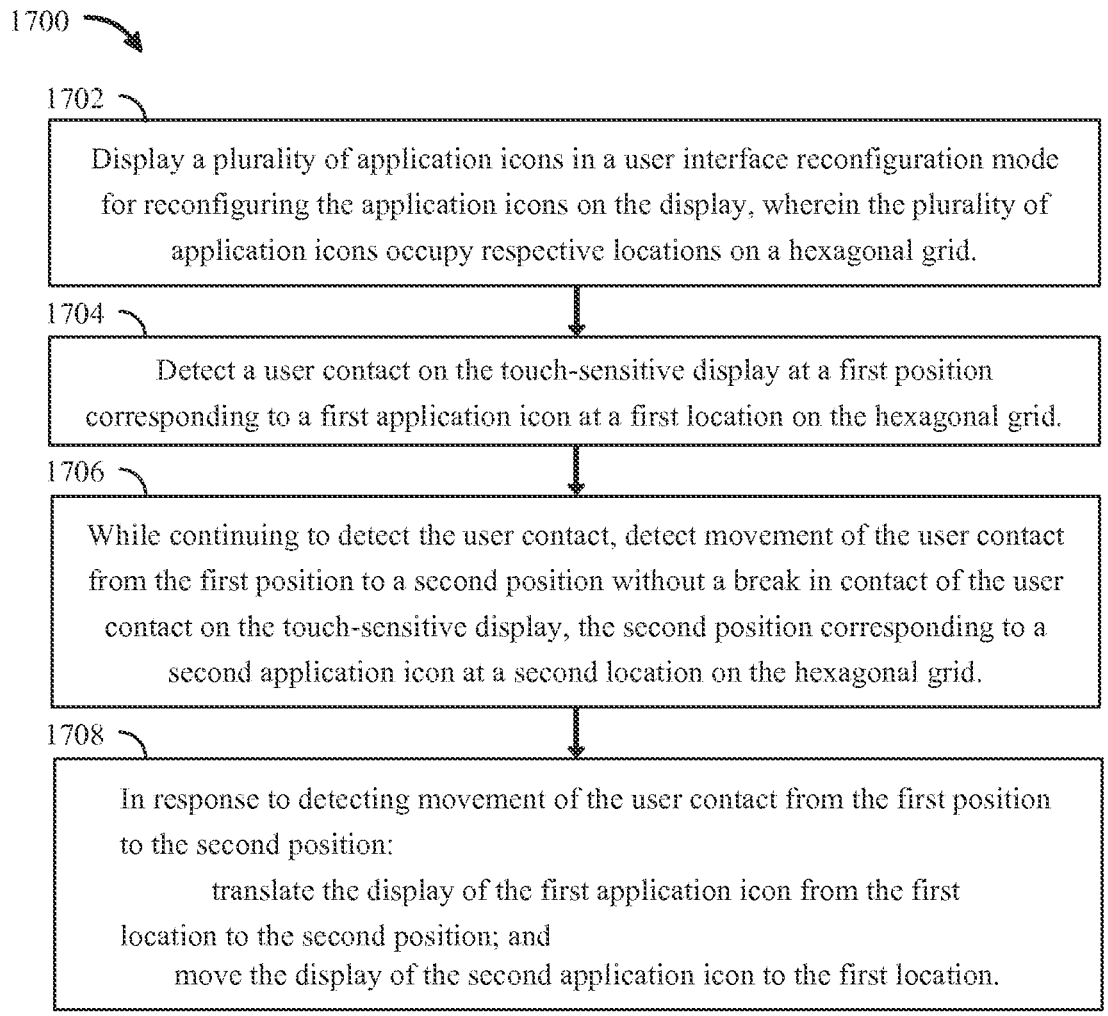
FIG. 17 is a flow diagram illustrating a process for reconfiguring a user interface in accordance with some embodiments.

FIG. 17 is a flow diagram illustrating process 1700 for reconfiguring a user interface at an electronic device with a touch-sensitive display. Process 1700 may be carried out by electronic devices such as devices 100, 300, and/or 500 (FIGS. 1A, 3, 5A) in various embodiments.

Process 1700 may provide an intuitive way to move a selected application icon in a hexagonal configuration of icons to a desired location, and to reconfigure the icons to make room for the selected icon at the desired location. The method reduces the cognitive burden on a user when organizing icons, thereby creating a more efficient human-machine interface. Process 1700 also provides a way to reorganize icons that keeps the icons together and close to their previous positions. This may be both aesthetically appealing and may allow a user to quickly and easily locate an icon after it has been moved. For battery-operated computing devices, enabling a user to organize and access application programs more quickly and more efficiently conserves power and increases the time between battery charges.

At block 1702, a plurality of application icons (e.g. 1020) is displayed on the display (e.g., 112, 340, 504) in a user interface reconfiguration mode for reconfiguring the application icons on the display. The plurality of application icons occupy respective locations on a hexagonal grid. At block 1704, a user contact (e.g., 1005) is detected on the touch-sensitive display (e.g., 112, 340, 504) at a first position corresponding to a first application icon (e.g., 1021) at a first location on the hexagonal grid. At block 1706, while continuing to detect the user contact, movement of the user contact (e.g., 1005) from the first position to a second position without a break in contact of the user contact on the touch-sensitive display is detected. The second position may correspond to a second application icon (e.g., 1022) at a second location on the hexagonal grid. At block 1708, in response to detecting movement of the user contact from the first position to the second position: the display of the first application icon (e.g., 1021) is translated from the first location to the second position; and the display of the second application icon (e.g., 1022) is moved to the first location.

Figure 18:
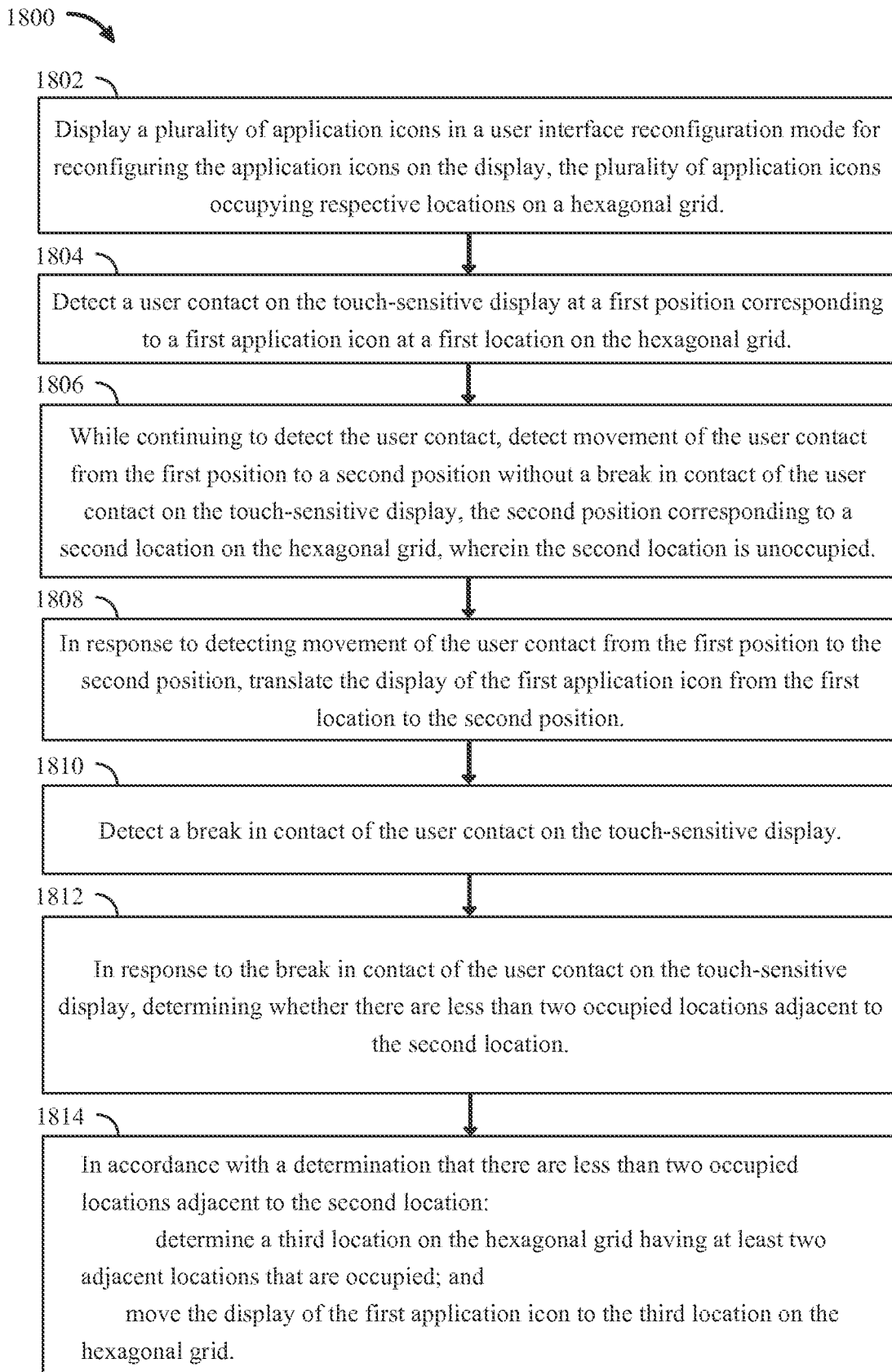
FIG. 18 is a flow diagram illustrating a process for reconfiguring a user interface in accordance with some embodiments.

FIG. 18 is a flow diagram illustrating process 1800 for reconfiguring a user interface at an electronic device with a display. Process 1800 may be carried out by electronic devices such as devices 100, 300, and/or 500 (FIGS. 1A, 3, 5A) in various embodiments.

Process 1800 may provide an intuitive way to move a selected application icon in a hexagonal configuration of icons to another location, and to reconfigure the icons. The method reduces the cognitive burden on a user when organizing icons, thereby creating a more efficient human-machine interface. Process 1800 also provides a way to reorganize icons that keeps the icons together and close to their previous positions. This may be both aesthetically appealing and may allow a user to quickly and easily locate an icon after it has been moved. For battery-operated computing devices, enabling a user to organize and access application programs more quickly and more efficiently conserves power and increases the time between battery charges.

At block 1802, a plurality of application icons (e.g., 1120) is displayed on the display (e.g., 112, 340, 504) in a user interface reconfiguration mode for reconfiguring the application icons on the display, the plurality of application icons occupying respective locations on a hexagonal grid. At block 1804, a user contact (e.g., 1105) is detected on the touch-sensitive display at a first position corresponding to a first application icon (e.g., 1121) at a first location on the hexagonal grid. At block 1806, while continuing to detect the user contact, movement of the user contact from the first position to a second position without a break in contact of the user contact on the touch-sensitive display is detected, the second position corresponding to a second location (e.g., FIG. 11B, location A) on the hexagonal grid, wherein the second location is unoccupied. At block 1808, in response to detecting movement of the user contact from the first position to the second position, the display of the first application icon (e.g., 1121) is transitioned from the first location to the second position. At block 1810, a break in contact of the user contact on the touch-sensitive display is detected. At block 1812, in response to the break in contact of the user contact on the touch-sensitive display, a determination is made whether there are less than two occupied locations adjacent to the second location (FIG. 11B, location A). At block 1814, in accordance with a determination that there are less than two occupied locations adjacent to the second location: a third location (e.g., FIG. 11C, location C) on the hexagonal grid having at least two adjacent locations that are occupied is determined, and the display of the first application icon (e.g., 1121) is moved to the third location on the hexagonal grid.

Figure 19:
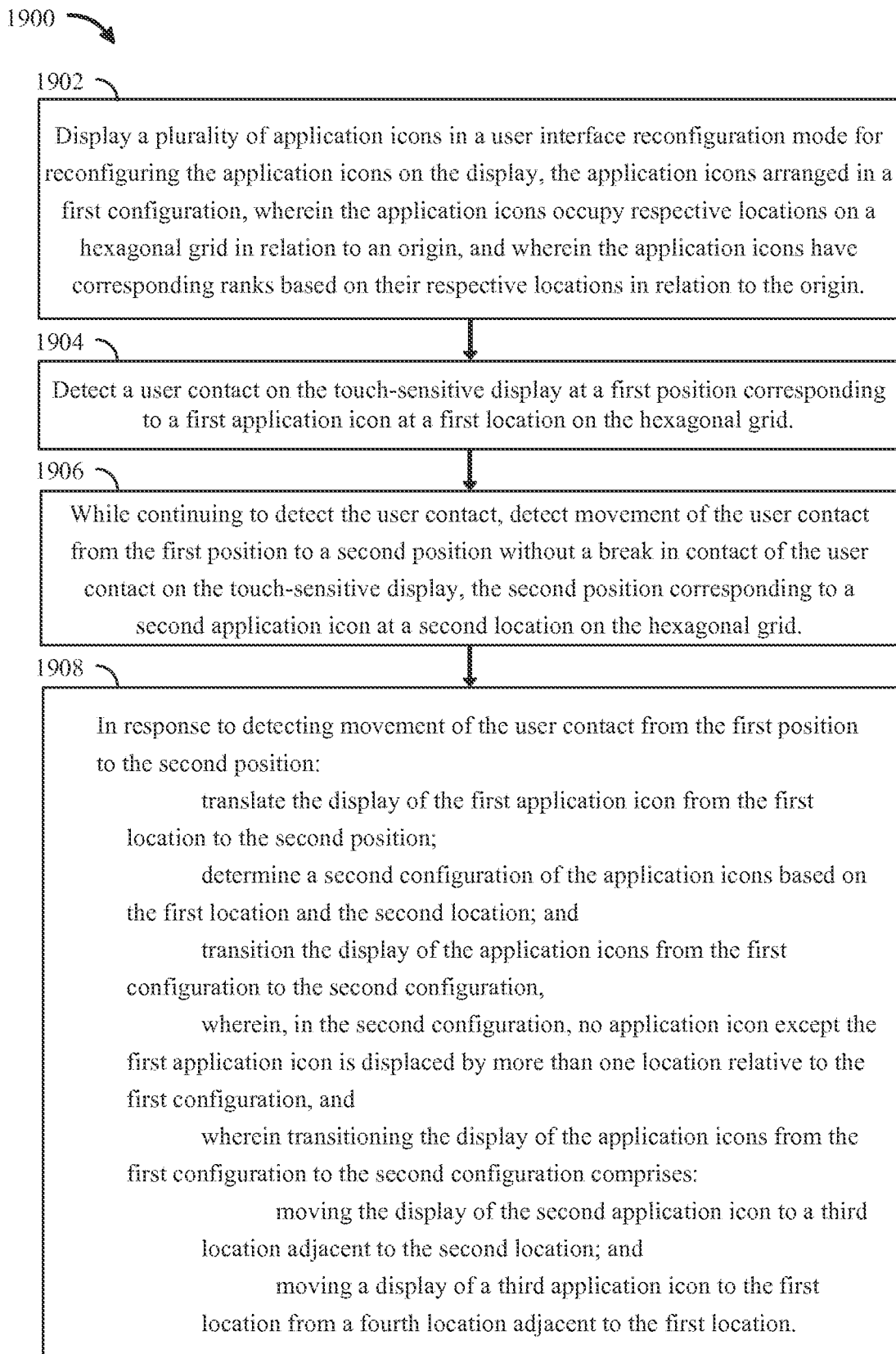
FIG. 19 is a flow diagram illustrating a process for reconfiguring a user interface in accordance with some embodiments.

FIG. 19 is a flow diagram illustrating process 1900 for reconfiguring a user interface at an electronic device with a touch-sensitive display. Process 1900 may be carried out by electronic devices such as devices 100, 300, and/or 500 (FIGS. 1A, 3, 5A) in various embodiments.

Process 1900 may provide an intuitive way to move a selected application icon in a hexagonal configuration of icons to another location, and to reconfigure the icons to make room for the selected icon at the desired location. The method reduces the cognitive burden on a user when organizing icons, thereby creating a more efficient human-machine interface. Process 1900 also provides a way to reorganize icons that keeps the icons together and close to their previous positions. This may be both aesthetically appealing and may allow a user to quickly and easily locate an icon after it has been moved. For battery-operated computing devices, enabling a user to organize and access application programs more quickly and more efficiently conserves power and increases the time between battery charges.

At block 1902, a plurality of application icons is displayed on the display (e.g., 112, 340, 504) in a user interface reconfiguration mode for reconfiguring the application icons on the display, the application icons arranged in a first configuration (e.g. 1220), wherein the application icons occupy respective locations on a hexagonal grid in relation to an origin, and wherein the application icons have corresponding ranks based on their respective locations in relation to the origin. At block 1904, a user contact (e.g., 1205) on the touch-sensitive display is detected at a first position corresponding to a first application icon (e.g., 1221) at a first location on the hexagonal grid. At block 1906, while continuing to detect the user contact, movement of the user contact from the first position to a second position without a break in contact of the user contact on the touch-sensitive display is detected, the second position corresponding to a second application icon (e.g., 1222) at a second location (e.g., FIG. 12B, location A) on the hexagonal grid. At block 1908, in response to detecting movement of the user contact from the first position to the second position: the display of the first application icon is translated from the first location to the second position; a second configuration (e.g., 1230) of the application icons is determined based on the first location and the second location (e.g., FIG. 12B, locations D and A, respectively); and the display of the application icons is transitioned from the first configuration (e.g., 1220) to the second configuration (e.g., 1230), wherein, in the second configuration, no application icon except the first application icon is displaced by more than one location relative to the first configuration, and wherein transitioning the display of the application icons from the first configuration to the second configuration comprises: moving the display of the second application icon to a third location (e.g., FIG. 12B, location B) adjacent to the second location (e.g., FIG. 12B, location A); and moving a display of a third application icon (e.g., 1224) to the first location from a fourth location (e.g., FIG. 12B, location C) adjacent to the first location.

Figure 20:
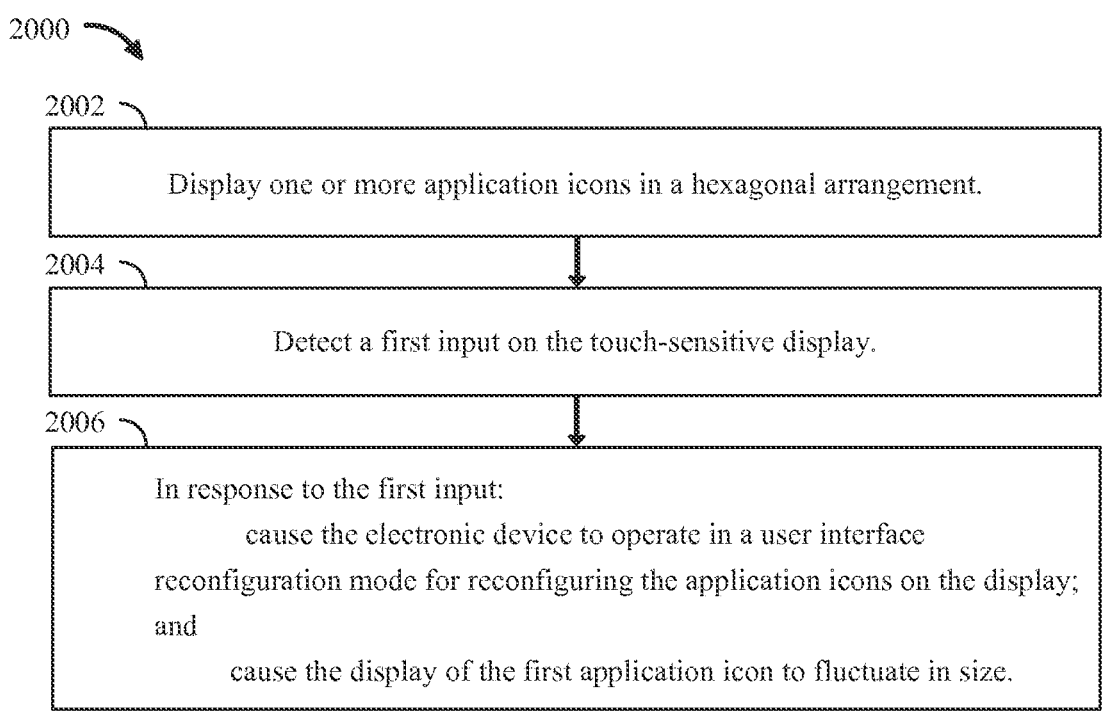
FIG. 20 is a flow diagram illustrating a process for reconfiguring a user interface in accordance with some embodiments.

FIG. 20 is a flow diagram illustrating process 2000 for reconfiguring a user interface at an electronic device with a touch-sensitive display. Process 2000 may be carried out by electronic devices such as devices 100, 300, and/or 500 (FIGS. 1A, 3, 5A) in various embodiments.

Process 2000 may provide an intuitive way to reconfigure a user interface and to indicate that the interface may be reconfigured. The method reduces the cognitive burden on a user when reconfiguring icons on a user interface, thereby creating a more efficient human-machine interface. The indication may be both aesthetically appealing and may allow a user to quickly and easily acknowledge that the interface may be reconfigured. For battery-operated computing devices, enabling a user to reconfigure icons more quickly and more efficiently conserves power and increases the time between battery charges.

At block 2002, one or more application icons (e.g., 820) are displayed in a hexagonal arrangement. At block 2004, a first input (e.g., 805) on the touch-sensitive display (e.g., 112, 340, 504) is detected. At block 2006, in response to the first input: the electronic device is caused to operate in a user interface reconfiguration mode for reconfiguring the application icons on the display; and the display of the first application icon is caused to fluctuate in size (e.g., FIGS. 8A-8B).

Figure 21:
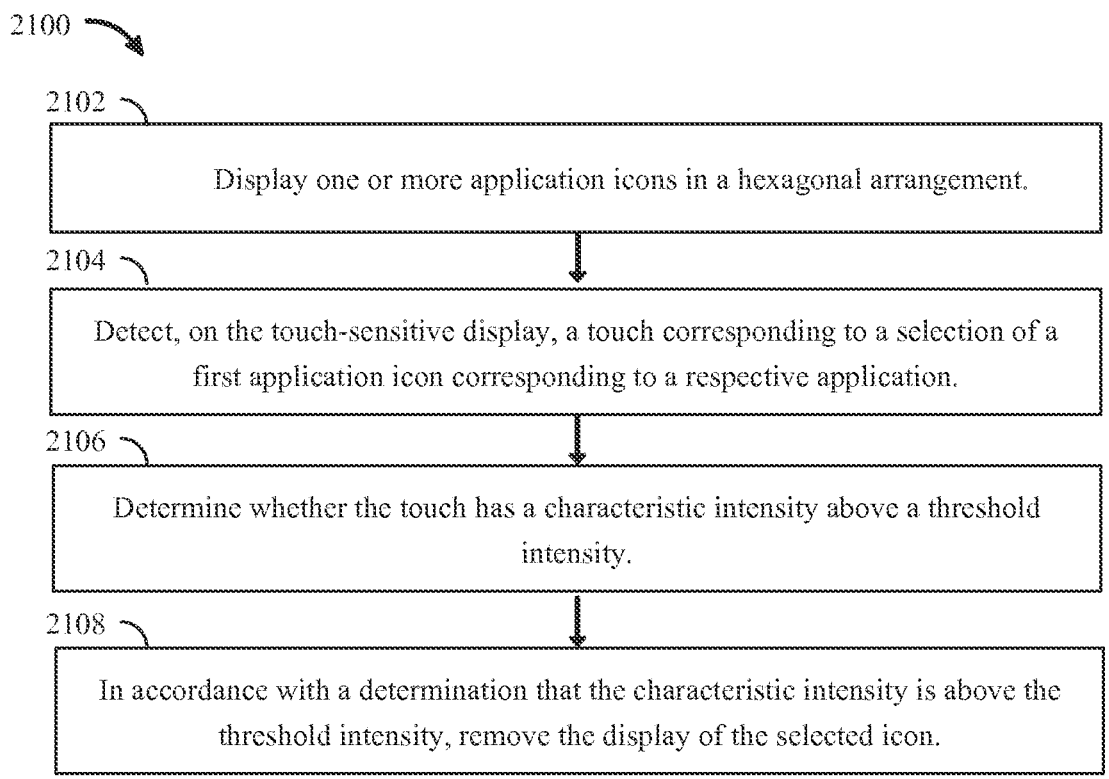
FIG. 21 is a flow diagram illustrating a process for reconfiguring a user interface in accordance with some embodiments.

FIG. 21 is a flow diagram illustrating process 2100 for reconfiguring a user interface at an electronic device with a touch-sensitive display, the touch-sensitive display comprising one or more sensors to detect the intensity of contacts with the touch-sensitive display. Process 2100 may be carried out by electronic devices such as devices 100, 300, and/or 500 (FIGS. 1A, 3, 5A) in various embodiments.

Process 2100 may provide an intuitive way to remove an application icon from a hexagonal configuration of icons. The method reduces the cognitive burden on a user when deleting the display of icons, thereby creating a more efficient human-machine interface. For battery-operated computing devices, enabling a user to organize and access application programs more quickly and more efficiently conserves power and increases the time between battery charges.

At block 2102, one or more application icons (e.g., 920) are displayed in a hexagonal arrangement. At block 2104, on the touch-sensitive display (e.g., 112, 340, 504), a touch (e.g., 905) corresponding to a selection of a first application icon (e.g., 921) corresponding to a respective application is detected. At block 2106, a determination is made whether the touch has a characteristic intensity above a threshold intensity. At block 2108, in accordance with a determination that the characteristic intensity is above the threshold intensity, the display of the selected icon is removed (e.g., 930).

Figure 22:
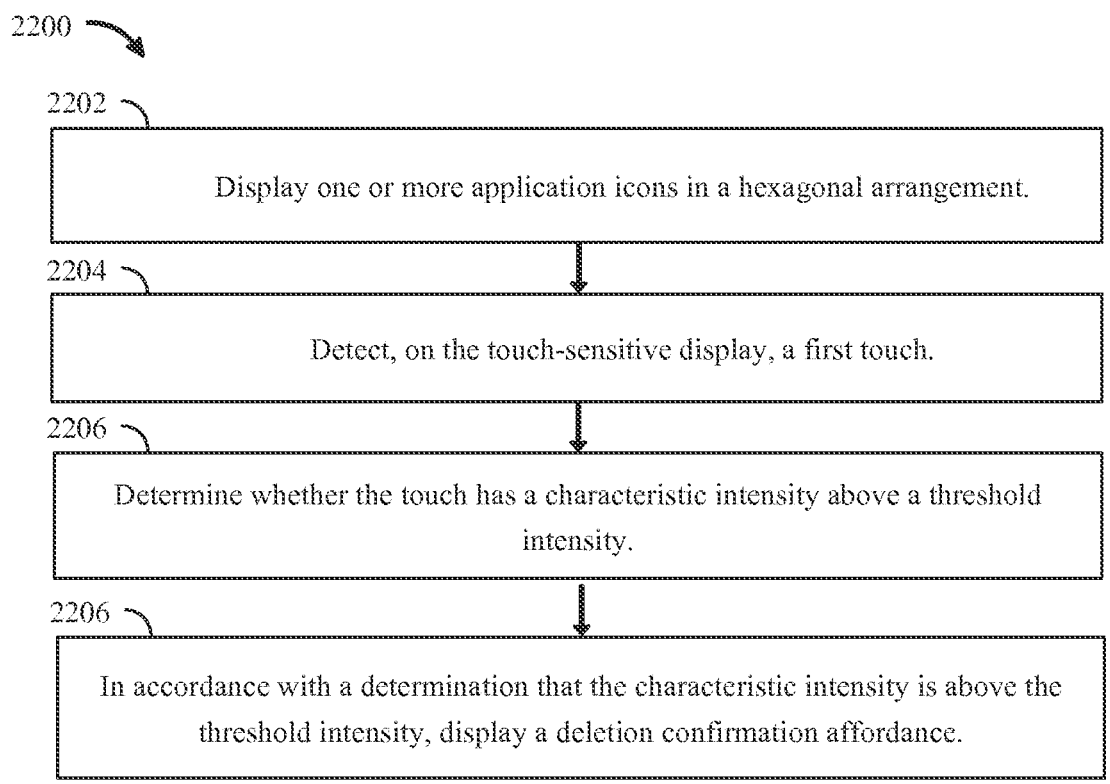
FIG. 22 is a flow diagram illustrating a process for reconfiguring a user interface in accordance with some embodiments.

FIG. 22 is a flow diagram illustrating process 2200 for reconfiguring a user interface at an electronic device with a touch-sensitive display the touch-sensitive display comprising one or more sensors to detect the intensity of contacts with the touch-sensitive display. Process 2200 may be carried out by electronic devices such as devices 100, 300, and/or 500 (FIGS. 1A, 3, 5A) in various embodiments.

Process 2200 may provide an intuitive way to remove an application icon from a hexagonal configuration of icons. The method reduces the cognitive burden on a user when deleting the display of icons, thereby creating a more efficient human-machine interface. For battery-operated computing devices, enabling a user to organize and access application programs more quickly and more efficiently conserves power and increases the time between battery charges.

At block 2202, one or more application icons (e.g., 820) are displayed in a hexagonal arrangement. At block 2204, a first touch (e.g., 805) is detected on the touch-sensitive display (e.g., 112, 340, 504). At block 2206, a determination is made whether the touch has a characteristic intensity above a threshold intensity. At block 2208, in accordance with a determination that the characteristic intensity is above the threshold intensity, a deletion confirmation affordance is displayed (e.g., 840).

It should be understood that the particular order in which the operations in FIGS. 16-22 have been described is exemplary and not intended to indicate that the described order is the only order in which the operations could be performed. One of ordinary skill in the art would recognize various ways to reorder the operations described herein. For brevity, these details are not repeated here. Additionally, it should be noted that aspects of processes 1600-2200 (FIGS. 16-22) may be incorporated with one another.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B, 3, 5A, and 5B) are all included within the scope of protection of the invention.

Figure 23:
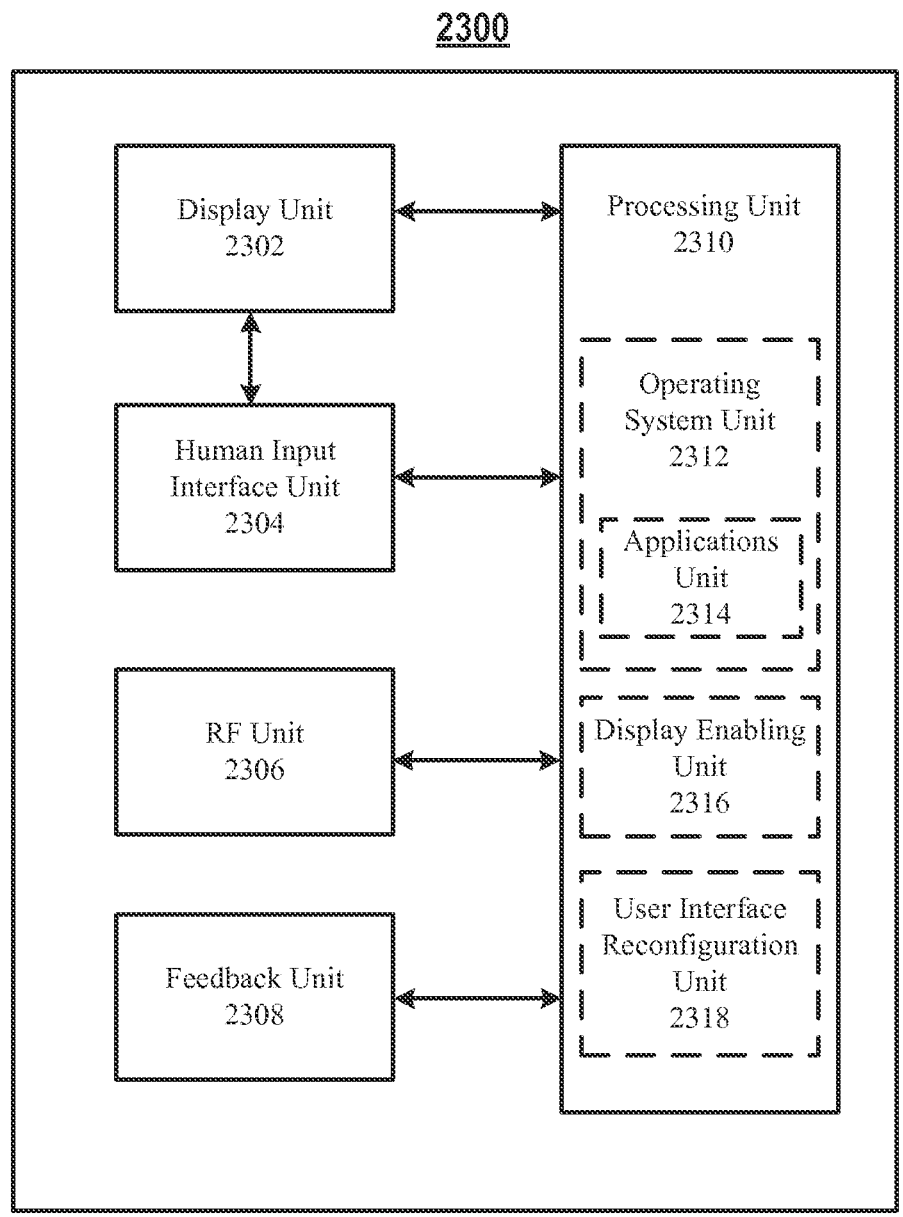
FIG. 23 is a functional block diagram of an electronic device in accordance with some embodiments.

FIG. 23 shows exemplary functional blocks of an electronic device 2300 that, in some embodiments, performs the above-described features. As shown in FIG. 23, an electronic device 2300 may include display unit 2302 configured to display graphical objects; human input interface unit 2304 configured to receive user input; one or more RF units 2306 configured to detect and communicate with external electronic devices; one or more feedback unit 2308 configured to provide a user with haptic, audio, and/or visual feedback; and processing unit 2310 coupled to display unit 2302, human input interface unit 2304, RF unit(s) 2306, and feedback unit 2308. In some embodiments, processing unit 2310 is configured to support an operating system running on operating system unit 2312. In turn, operating system unit 2312 may support an applications unit 2314 for launching and running one or more applications.

In some embodiments, the processing unit 2310 includes a display enabling unit 2316 and a user interface reconfiguration unit 2318. In some embodiments, the display enabling unit 2316 is configured to cause a display of a user interface (or portions of a user interface) in conjunction with the display unit 2302. For example, the display enabling unit 2316 may be used for displaying user interface screens associated with a photos application.

In some embodiments, RF unit 2306 is configured to detect and receive information from an external device, such as photo information. In some embodiments, the RF unit is configured to detect and transmit information to an external device, such information associated with a photo or collection of photos stored on the external device.

In some embodiments, the user interface reconfiguration unit 2318 is configured to receive input, e.g., through the use of human input interface unit 2304 and/or RF unit 2306 and to perform the user interface reconfiguration features described above.

The units of FIG. 23 may be used to implement the various techniques and methods described above with respect to FIGS. 16-22. The units of device 2300 are, optionally, implemented by hardware, software, or a combination of hardware and software to carry out the principles of the various described examples. It is understood by persons of skill in the art that the functional blocks described in FIG. 23 are, optionally, combined or separated into sub-blocks to implement the principles of the various described examples. Therefore, the description herein optionally supports any possible combination or separation or further definition of the functional blocks described herein.

Figure 24:
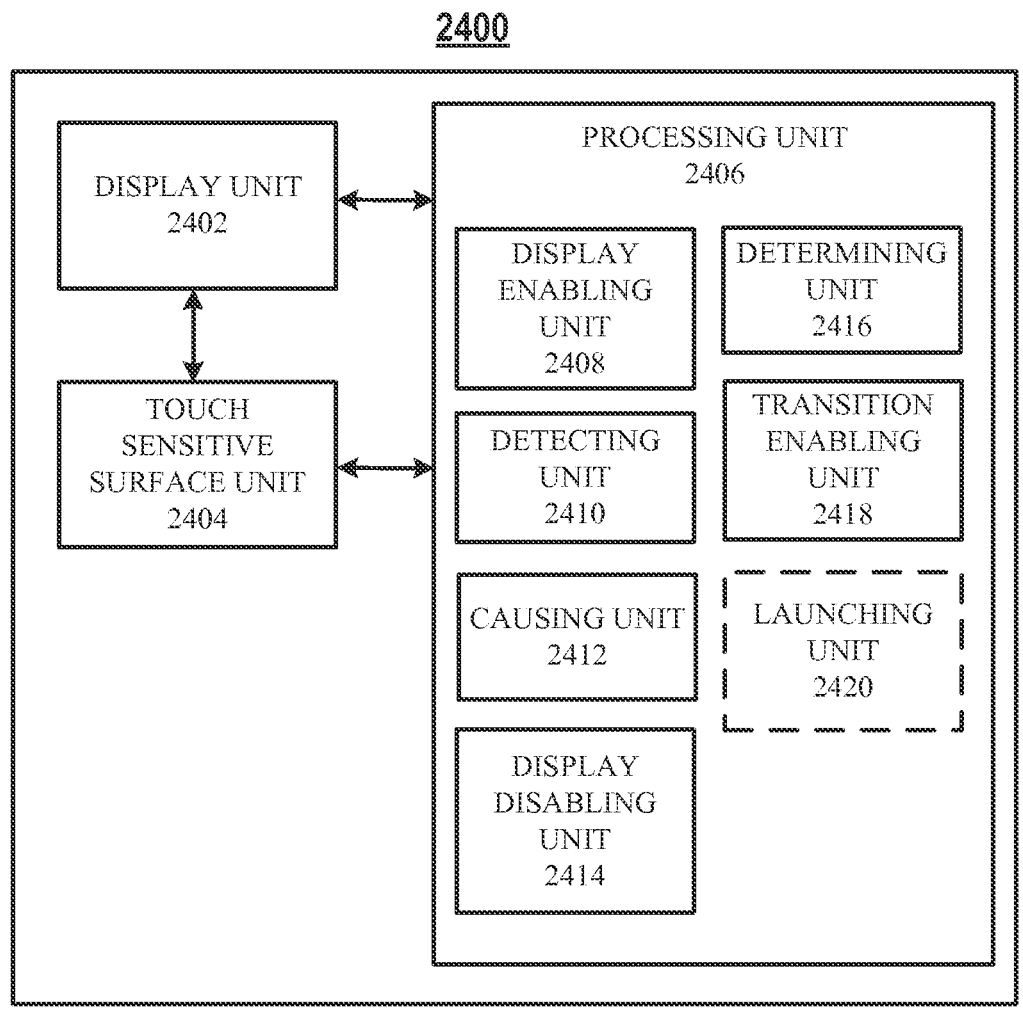
FIG. 24 is a functional block diagram of an electronic device in accordance with some embodiments.

In accordance with some embodiments, FIG. 24 shows a functional block diagram of an electronic device 2400 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 24 are, optionally, combined or separated into sub-blocks to implement the principles of the various described embodiments. Therefore, the description herein optionally supports any possible combination or separation or further definition of the functional blocks described herein.

As shown in FIG. 24, an electronic device 2400 includes a display unit 2402 configured to display a graphic user interface, a touch sensitive surface unit 2404 configured to receive contacts, and a processing unit 2406 coupled to the display unit 2402 and the touch-sensitive surface unit 2404. In some embodiments, the processing unit includes a display enabling unit 2408, a detecting unit 2410, a causing unit 2412, a display disabling unit 2414, a determining unit 2416, a transition enabling unit 2418, and, optionally, a launching unit 2420.

The processing unit 2406 is configured to enable display (e.g., with the display enabling unit 2408) of a plurality of application icons for launching application programs, the application icons arranged in a first configuration, and where the application icons occupy respective locations on a hexagonal grid in relation to an origin. The processing unit 2406 is further configured to detect (e.g., with the detecting unit 2410) a first input on the touch-sensitive surface unit 2404; in response to detecting the first input, cause (e.g., with the causing unit 2412) the electronic device to operate in a user interface reconfiguration mode for reconfiguring the application icons on the display unit 2402; and detect a second input on the touch-sensitive surface unit 2404 representing a selection of a first application icon at a first location on the hexagonal grid. The processing unit 2406 is further configured to, in response to the second input, disable display (e.g., with the display disabling unit 2414) of the first application icon; determine (e.g., with the determining unit 2416) a second configuration of the application icons without the first application icon, where a sum of the distances from the origin of the application icons in the first configuration, minus the distance from the origin of the first application icon in the first configuration, is greater than a sum of the distances from the origin of the application icons in the second configuration; and enable transition (e.g., with the transition enabling unit 2418) of the display of the plurality of application icons from the first configuration to the second configuration.

In some embodiments, disabling the display of the first application icon results in an unoccupied location on the hexagonal grid at the first location; and enabling transition of the display of the plurality of application icons includes moving a display of a second application icon from a second location to the unoccupied location, where the second location is diagonally adjacent to the first location with respect to the display unit 2402.

In some embodiments, the first input is a contact detected at a position corresponding to one of the plurality of application icons.

In some embodiments, the processing unit 2406 is further configured to determine (e.g., with the determining unit 2416) whether the duration of the contact exceeds a predetermined threshold, and the processing unit 2406 is caused to operate in the user interface reconfiguration mode in response to detecting the first input and in accordance with a determination that the duration of the contact exceeds the predetermined threshold.

In some embodiments, the processing unit 2406 is further configured to, in response to detecting the first input and in accordance with a determination that the duration of the contact does not exceed the predetermined threshold, launch (e.g., with the launching unit 2420) the application program corresponding to the application icon at the position of the contact.

In some embodiments, the touch-sensitive surface unit 2404 comprises one or more sensors to detect the intensity of contacts with the touch-sensitive surface unit 2404, the first input is a touch, the processing unit 2406 is further configured to determine (e.g., with the determining unit 2416) whether the touch has a characteristic intensity above a threshold intensity, and the processing unit 2406 is caused to operate in the user interface reconfiguration mode in response to detecting the touch and in accordance with a determination that the characteristic intensity is above the threshold intensity.

The operations described above with reference to FIG. 16 are, optionally, implemented by components depicted in FIGS. 1A-1B or FIG. 24. For example, display operation 1602, detecting operations 1604 and 1608, causing operation 1606, removing operation 1610, determining operation 1612, and transition operation 1614 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 25:
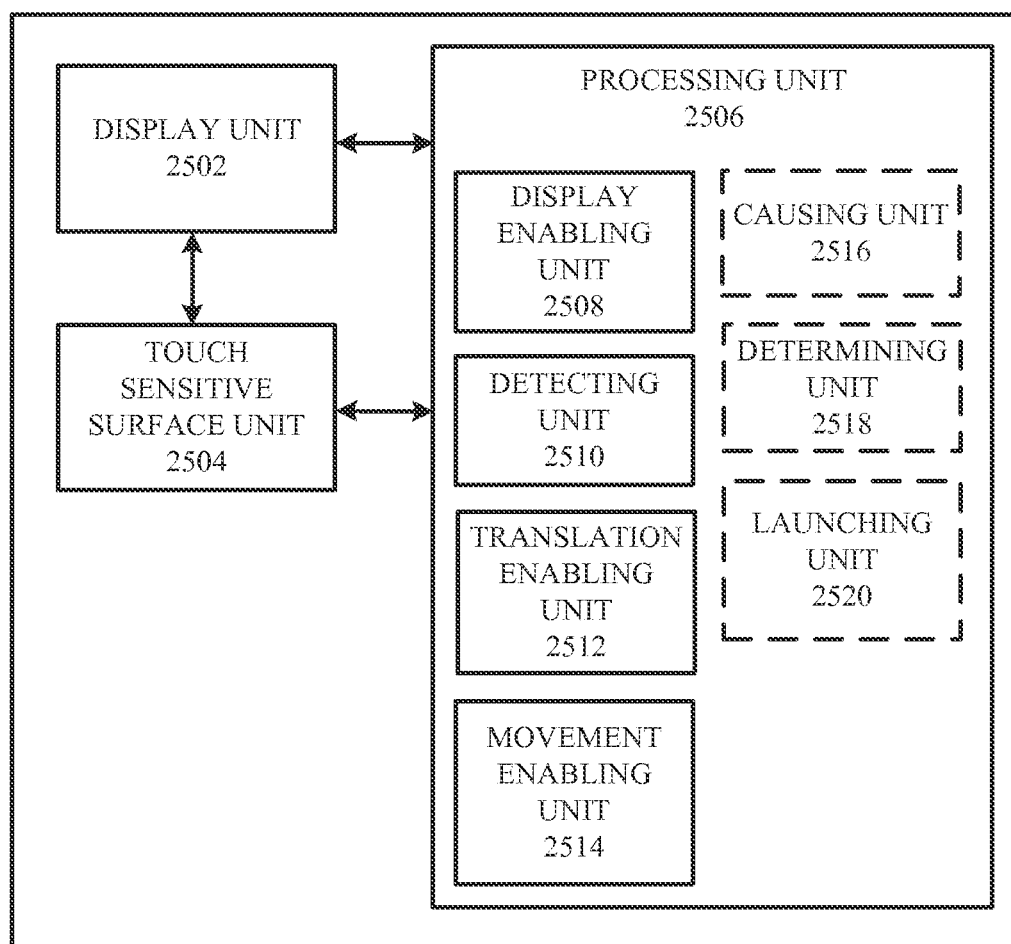
FIG. 25 is a functional block diagram of an electronic device in accordance with some embodiments.

In accordance with some embodiments, FIG. 25 shows a functional block diagram of an electronic device 2500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 25 are, optionally, combined or separated into sub-blocks to implement the principles of the various described embodiments. Therefore, the description herein optionally supports any possible combination or separation or further definition of the functional blocks described herein.

As shown in FIG. 25, an electronic device 2500 includes a display unit 2502 configured to display a graphic user interface, a touch sensitive surface unit 2504 configured to receive contacts, and a processing unit 2506 coupled to the display unit 2502 and the touch-sensitive surface unit 2504. In some embodiments, the processing unit includes a display enabling unit 2508, a detecting unit 2510, a translation enabling unit 2512, a movement enabling unit 2514, and optionally, a causing unit 2516, a determining unit 2518, and a launching unit 2520.

The processing unit 2506 is configured to enable display (e.g., with the display enabling unit 2508) of, on the display unit 2502, a plurality of application icons in a user interface reconfiguration mode for reconfiguring the application icons on the display unit 2502, where the plurality of application icons occupy respective locations on a hexagonal grid; detect (e.g., with the detecting unit 2510) a user contact on the touch-sensitive surface unit 2504 at a first position corresponding to a first application icon at a first location on the hexagonal grid; while continuing to detect the user contact, detect (e.g., with the detecting unit 2510) movement of the user contact from the first position to a second position without a break in contact of the user contact on the touch-sensitive surface unit 2504, the second position corresponding to a second application icon at a second location on the hexagonal grid; in response to detecting movement of the user contact from the first position to the second position: enable translation (e.g., with translation enabling unit 2512) of the display of the first application icon from the first location to the second position; and enable movement (e.g., with movement enabling unit 2514) of the display of the second application icon to the first location.

In some embodiments, the processing unit 2506 further configured to detect (e.g., with detecting unit 2510) a first input on the touch-sensitive surface unit 2504, and in response to detecting the first input, cause (e.g., with causing unit 2516) the processing unit 2506 to operate in the user interface reconfiguration mode.

In some embodiments, the first input is a first contact detected at a position corresponding to one of the plurality of application icons.

In some embodiments, the processing unit 2506 is further configured to determine (e.g., with the determining unit 2518) whether the duration of the first contact exceeds a predetermined threshold, and the processing unit 2506 is caused to operate in the user interface reconfiguration mode in response to detecting the first input and in accordance with a determination that the duration of the first contact exceeds the predetermined threshold.

In some embodiments, the processing unit 2506 is further configured to, in response to detecting the first input and in accordance with a determination that the duration of the first contact does not exceed the predetermined threshold launch (e.g., with the launching unit 2520) the application program corresponding to the application icon at the position of the contact.

In some embodiments, the first input is the user contact.

In some embodiments, the touch-sensitive surface unit 2504 comprises one or more sensors to detect the intensity of contacts with the touch-sensitive surface unit 2504, and the processing unit 2506 is further configured to detect (e.g., with the detecting unit 2510) a first touch on the touch-sensitive surface unit 2504; determine (e.g., with the determining unit 2518) whether the touch has a characteristic intensity above a threshold intensity; and in accordance with a determination that the characteristic intensity is above the threshold intensity, cause (e.g., with the causing unit 2516) the processing unit 2506 to operate in the user interface reconfiguration mode.

The operations described above with reference to FIG. 17 are, optionally, implemented by components depicted in FIGS. 1A-1B or FIG. 25. For example, displaying operation 1702, detecting operations 1704 and 1706, and translating operation 1708 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 26:
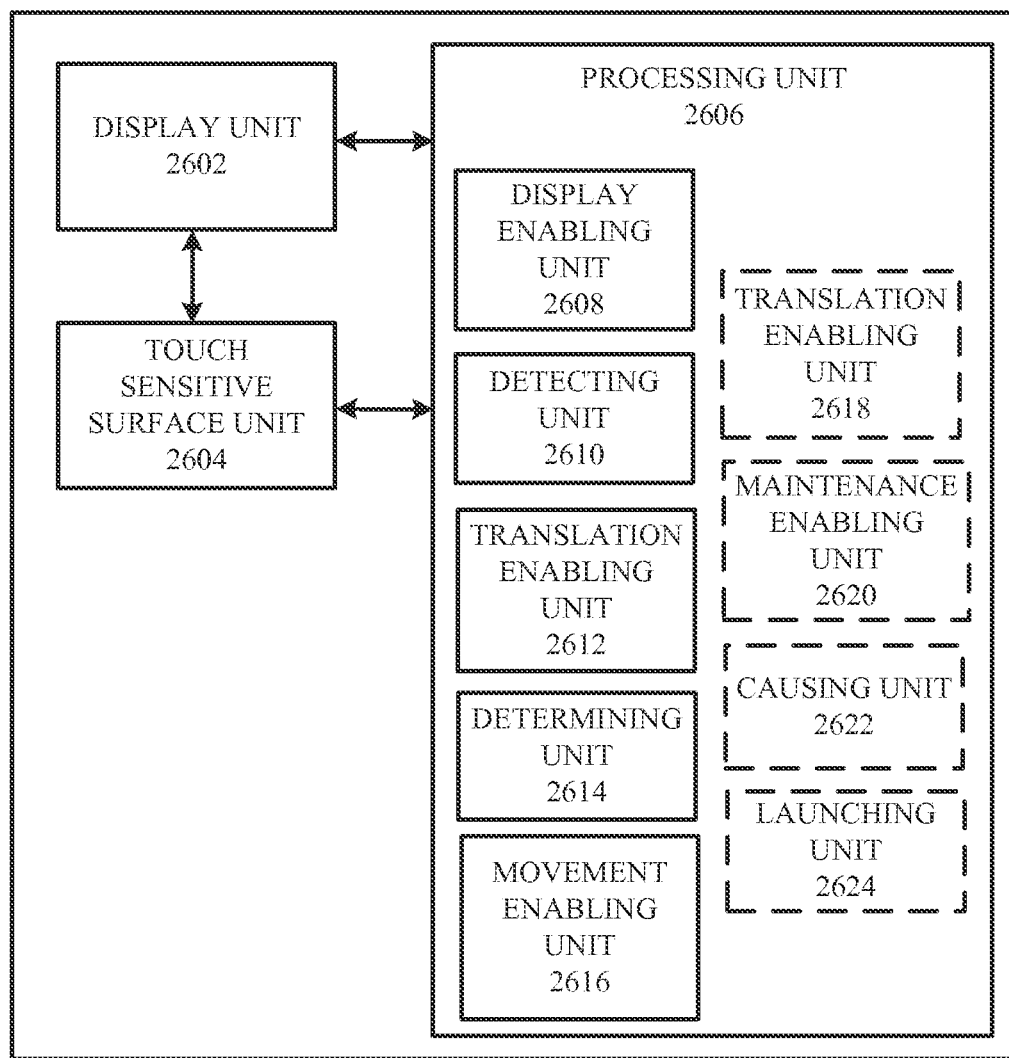
FIG. 26 is a functional block diagram of an electronic device in accordance with some embodiments.

In accordance with some embodiments, FIG. 26 shows a functional block diagram of an electronic device 2600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 26 are, optionally, combined or separated into sub-blocks to implement the principles of the various described embodiments. Therefore, the description herein optionally supports any possible combination or separation or further definition of the functional blocks described herein.

As shown in FIG. 26, an electronic device 2600 includes a display unit 2602 configured to display a graphic user interface, a touch sensitive surface unit 2604 configured to receive contacts, and a processing unit 2606 coupled to the display unit 2602 and the touch-sensitive surface unit 2604. In some embodiments, the processing unit includes a display enabling unit 2608, a detecting unit 2610, a translation enabling unit 2612, a determining unit 2614, a movement enabling unit 2616, and optionally, a transition enabling unit 2618, a maintenance enabling unit 2620, a causing unit 2622, and a launching unit 2624.

The processing unit 2606 is configured to enable display (e.g., display enabling unit 2608) of, on the display unit 2602, a plurality of application icons in a user interface reconfiguration mode for reconfiguring the application icons on the display unit 2602, the plurality of application icons occupying respective locations on a hexagonal grid; detect (e.g., detecting unit 2610) a user contact on the touch-sensitive surface unit 2604 at a first position corresponding to a first application icon at a first location on the hexagonal grid; while continuing to detect the user contact, detect (e.g., detecting unit 2610) movement of the user contact from the first position to a second position without a break in contact of the user contact on the touch-sensitive surface unit 2604, the second position corresponding to a second location on the hexagonal grid, and where the second location is unoccupied; in response to detecting movement of the user contact from the first position to the second position, enable translation (e.g., transition enabling unit 2612) of the display of the first application icon from the first location to the second position; detect (e.g., with the detecting unit 2610) a break in contact of the user contact on the touch-sensitive surface unit 2604; in response to the break in contact of the user contact on the touch-sensitive surface unit 2604, determine (e.g., with the determining unit 2614) whether there are less than two occupied locations adjacent to the second location; and in accordance with a determination that there are less than two occupied locations adjacent to the second location: determine (e.g., with the determining unit 2614) a third location on the hexagonal grid having at least two adjacent locations that are occupied; and enable movement (e.g., with the movement enabling unit 2616) of the display of the first application icon to the third location on the hexagonal grid.

In some embodiments, the third location is a location on the hexagonal grid nearest to the second location that is adjacent to at least two occupied locations.

In some embodiments, translating the display of the first application icon from the first location results in an unoccupied location on the hexagonal grid at the first location, and the processing unit 2606 is further configured to determine (e.g., with the determining unit 2614) whether the unoccupied location is adjacent to six application icons, and in accordance with a determination that the unoccupied location is adjacent to six application icons: determine (e.g., with the determining unit 2614) a configuration of the plurality of application icons without an unoccupied location adjacent to six application icons and enable transition (e.g., with the transition enabling unit 2618) of the display of the plurality of application icons to the determined configuration, wherein enabling transitioning of the display of the plurality of application icons to the determined configuration displaces no application icon except the first application icon by more than one location on the hexagonal grid.

In some embodiments, the processing unit 2606 is further configured to, in accordance with a determination that the unoccupied location is not adjacent to six application icons, enable maintenance (e.g., with the maintenance enabling unit 2620) of the display of the plurality of application icons.

In some embodiments, transitioning the display of the plurality of application icons to the determined configuration reduces a sum of the distances of the application icons from the origin of the hexagonal grid, excluding the distance of the first application icon.

In some embodiments, the processing unit 2606 is further configured to detect (e.g., with the detecting unit 2610) a first input on the touch-sensitive surface unit 2604, and in response to detecting the first input, cause (e.g., with the causing unit 2622) the processing unit 2606 to operate in the user interface reconfiguration mode.

In some embodiments, the first input is a first contact detected at a position corresponding to one of the plurality of application icons.

In some embodiments, the processing unit 2606 is further configured to determine (e.g., with the determining unit 2614) whether the duration of the first contact exceeds a predetermined threshold, and the processing unit 2606 is caused to operate in the user interface reconfiguration mode in response to detecting the first input and in accordance with a determination that the duration of the first contact exceeds the predetermined threshold.

In some embodiments, the processing unit 2606 is further configured to, in response to detecting the first input and in accordance with a determination that the duration of the first contact does not exceed the predetermined threshold, launch (e.g., with the launching unit 2624) the application program corresponding to the application icon at the position of the contact.

In some embodiments, the first input is the user contact.

In some embodiments, the touch-sensitive surface unit 2604 comprises one or more sensors to detect the intensity of contacts with the touch-sensitive surface unit 2604, and the processing unit 2606 is further configured to detect (e.g., with the detecting unit 2610) a first touch on the touch-sensitive surface unit 2604, determine (e.g., with the determining unit 2614) whether the touch has a characteristic intensity above a threshold intensity, and in accordance with a determination that the characteristic intensity is above the threshold intensity, cause (e.g., with the causing unit 2622) the processing unit 2606 to operate in the user interface reconfiguration mode.

The operations described above with reference to FIG. 18 are, optionally, implemented by components depicted in FIGS. 1A-1B or FIG. 26. For example, displaying operation 1802, detecting operations 1804, 1806, and 1810, translating operation 1808, determining operations 1812 and 1814 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 27:
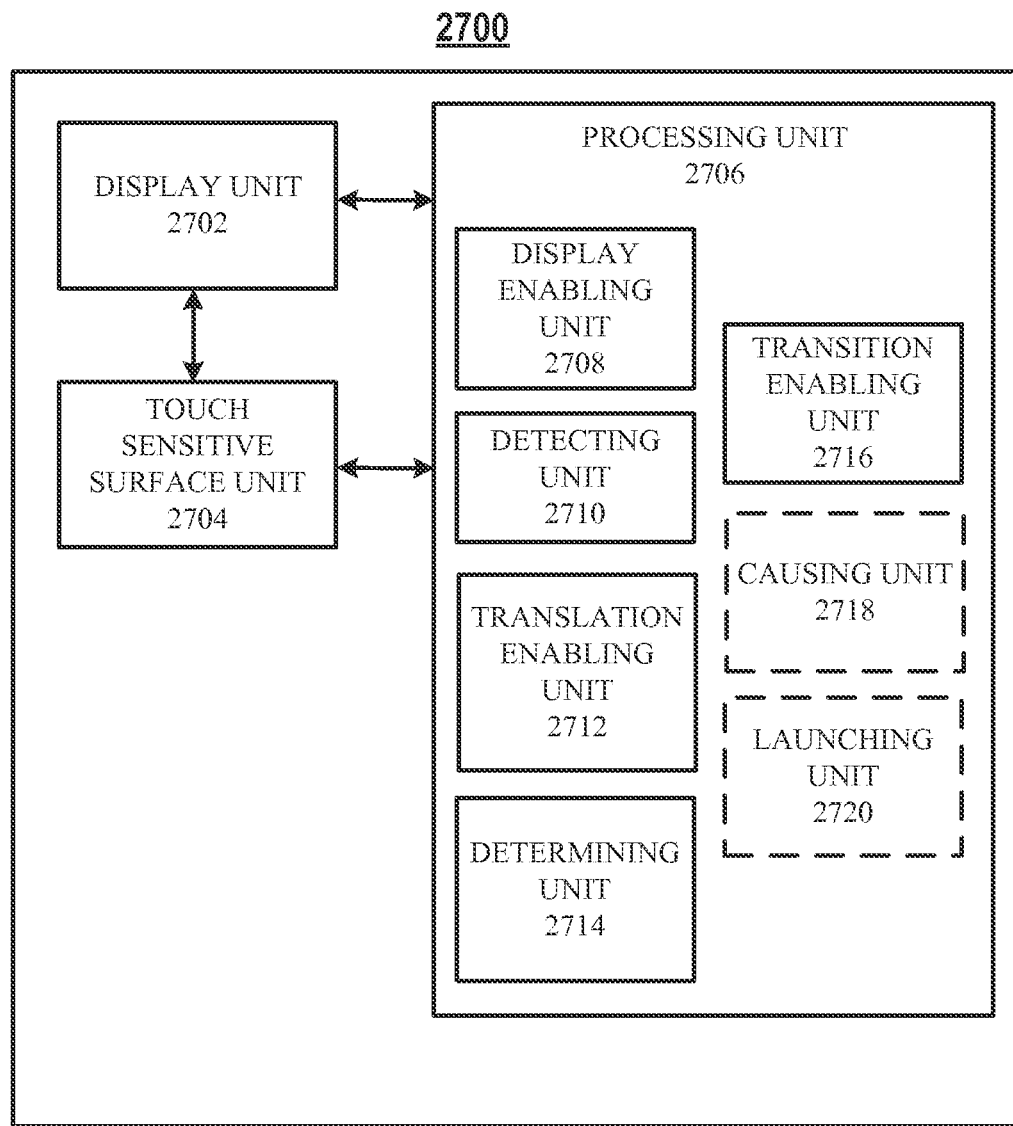
FIG. 27 is a functional block diagram of an electronic device in accordance with some embodiments.

In accordance with some embodiments, FIG. 27 shows a functional block diagram of an electronic device 2700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 27 are, optionally, combined or separated into sub-blocks to implement the principles of the various described embodiments. Therefore, the description herein optionally supports any possible combination or separation or further definition of the functional blocks described herein.

As shown in FIG. 27, an electronic device 2700 includes a display unit 2702 configured to display a graphic user interface, a touch sensitive surface unit 2704 configured to receive contacts, and a processing unit 2706 coupled to the display unit 2702 and the touch-sensitive surface unit 2704. In some embodiments, the processing unit includes a display enabling unit 2708, a detecting unit 2710, a translation enabling unit 2712, a determining unit 2714, a transition enabling unit 2716, and optionally, a causing unit 2718, and a launching unit 2720.

The processing unit 2706 is configured to enable display (e.g., with the display enabling unit 2708) of, on the display unit 2702, a plurality of application icons in a user interface reconfiguration mode for reconfiguring the application icons on the display unit 2702, the application icons arranged in a first configuration, where the application icons occupy respective locations on a hexagonal grid in relation to an origin, and where the application icons have corresponding ranks based on their respective locations in relation to the origin. The processing unit 2706 is further configured to detect (e.g., with the detecting unit 2710) a user contact on the touch-sensitive surface unit 2704 at a first position corresponding to a first application icon at a first location on the hexagonal grid; while continuing to detect the user contact, detect (e.g., with the detecting unit 2710) movement of the user contact from the first position to a second position without a break in contact of the user contact on the touch-sensitive surface unit 2704, the second position corresponding to a second application icon at a second location on the hexagonal grid; in response to detecting movement of the user contact from the first position to the second position: enable translation (e.g., with the translation enabling unit 2712) of the display of the first application icon from the first location to the second position, determine (e.g., with the determining unit 2714) a second configuration of the application icons based on the first location and the second location, and enable transition (e.g., with the transition enabling unit 2716) of the display of the application icons from the first configuration to the second configuration, where, in the second configuration, no application icon except the first application icon is displaced by more than one location relative to the first configuration, and enabling transition of the display of the application icons from the first configuration to the second configuration comprises moving the display of the second application icon to a third location adjacent to the second location and moving a display of a third application icon to the first location from a fourth location adjacent to the first location.

In some embodiments, the rank corresponding to an application icon is the minimum number of discrete steps along locations on the hexagonal grid that can be taken to move from the origin to the location of the application icon.

In some embodiments, application icons having a rank in the first configuration lower than the rank of the first location and lower than the rank of the second location are displayed in the same location in the second configuration as in the first configuration.

In some embodiments, the second location has a higher rank than the first location, and the third location has a lower rank than the second location.

In some embodiments, the fourth location has a higher rank than the first location.

In some embodiments, the fourth location has a rank equal to the rank of the first location.

In some embodiments, the second location has a rank equal to the rank of the first location, and the third location has a rank equal to the rank of the second location.

In some embodiments, the fourth location has a rank equal to the rank of the first location.

In some embodiments, the second location has a rank less than the rank of the first location.

In some embodiments, the third location has a rank greater than the rank of the second location, and the fourth location has a rank equal to the rank of the first location.

In some embodiments, the third location has a rank equal to the rank of the second location, and the fourth location has a rank less than the rank of the first location.

In some embodiments, the third location and the fourth location are the same.

In some embodiments, the third location and the fourth location are different.

In some embodiments, the second configuration does not include an unoccupied location that is adjacent to six application icons.

In some embodiments, the second configuration does not include an application icon that is adjacent to less than two other application icons.

In some embodiments, if the first location is not the origin, the application icon positioned at the origin in the first configuration is positioned at the origin in the second configuration.

In some embodiments, in the first configuration and the second configuration, there is no application icon that is adjacent only to application icons of equal or higher rank.

In some embodiments, the processing unit 2706 is further configured to detect (e.g., with the detecting unit 2710) a first input on the touch-sensitive surface unit 2704, and in response to detecting the first input, cause (e.g., with the causing unit 2718) the processing unit 2706 to operate in the user interface reconfiguration mode.

In some embodiments, the first input is a first contact detected at a position corresponding to one of the plurality of application icons.

In some embodiments, the processing unit 2706 is further configured to determine (e.g., with the determining unit 2714) whether the duration of the first contact exceeds a predetermined threshold, where the processing unit 2706 is caused to operate in the user interface reconfiguration mode in response to detecting the first input and in accordance with a determination that the duration of the first contact exceeds the predetermined threshold.

In some embodiments, the processing unit 2706 is further configured 2706 to, in response to detecting the first input and in accordance with a determination that the duration of the first contact does not exceed the predetermined threshold, launch (e.g., with the launching unit 2720) the application program corresponding to the application icon at the position of the contact.

In some embodiments, the first input is the user contact.

In some embodiments, the touch-sensitive surface unit 2704 comprises one or more sensors to detect the intensity of contacts with the touch-sensitive surface unit 2704, and the processing unit 2706 is further configured to detect (e.g. with the detecting unit 2710) a first touch on the touch-sensitive surface unit 2704, determine (e.g., with the determining unit 2714) whether the touch has a characteristic intensity above a threshold intensity, and in accordance with a determination that the characteristic intensity is above the threshold intensity, cause (e.g., with the causing 2718) the processing unit 2706 to operate in the user interface reconfiguration mode.

The operations described above with reference to FIG. 19 are, optionally, implemented by components depicted in FIGS. 1A-1B or FIG. 27. For example, displaying operation 1902, detecting operations 1904 and 1906, and translating operation 1908 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 28:
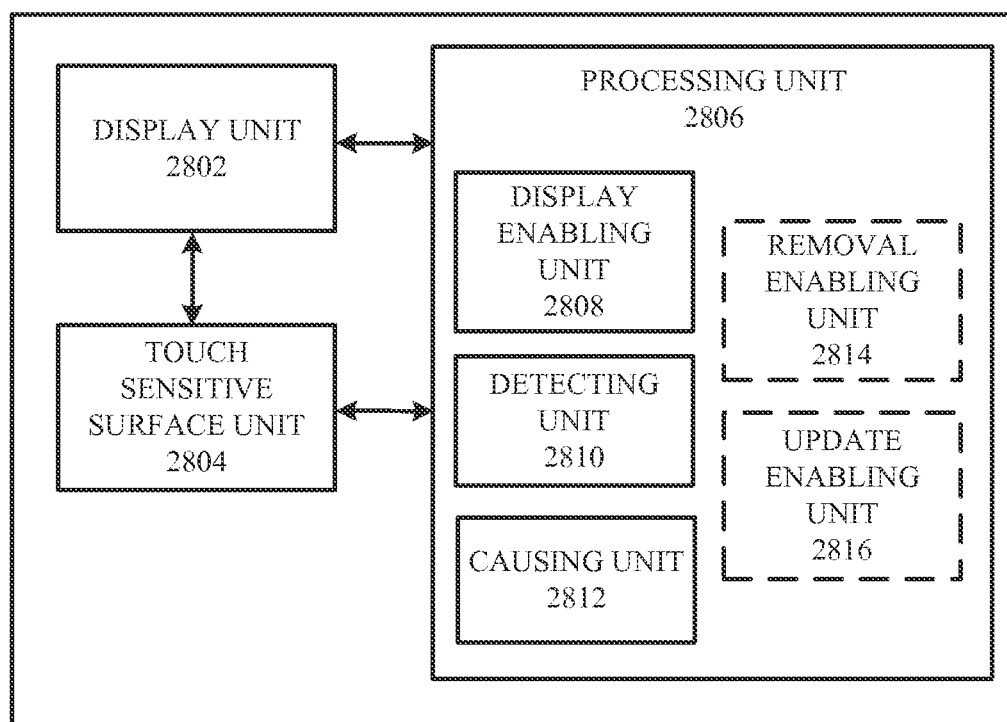
FIG. 28 is a functional block diagram of an electronic device in accordance with some embodiments.

In accordance with some embodiments, FIG. 28 shows a functional block diagram of an electronic device 2800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 28 are, optionally, combined or separated into sub-blocks to implement the principles of the various described embodiments. Therefore, the description herein optionally supports any possible combination or separation or further definition of the functional blocks described herein.

As shown in FIG. 28, an electronic device 2800 includes a display unit 2802 configured to display a graphic user interface, a touch sensitive surface unit 2804 configured to receive contacts, and a processing unit 2806 coupled to the display unit 2802 and the touch-sensitive surface unit 2804. In some embodiments, the processing unit includes a display enabling unit 2808, a detecting unit 2810, a causing unit 2812, and optionally, a removal enabling unit 2814 and an update enabling unit 2816.

The processing unit 2806 is configured to enable display (e.g., with the display enabling unit 2808) of one or more application icons in a hexagonal arrangement, detect (e.g., with the detecting unit 2810) a first input on the touch-sensitive surface unit 2804, and in response to the first input, cause (e.g., with the causing unit 2812) the processing unit 2806 to operate in a user interface reconfiguration mode for reconfiguring the application icons on the display unit 2802 and cause (e.g., with the causing unit 2812) the display of the first application icon to fluctuate in size.

In some embodiments, the fluctuation includes an oscillation about an average size.

In some embodiments, the display of the first application icon fluctuates between a first size and a second size.

In some embodiments, the center of the first application icon remains fixed on the display unit 2802 during the fluctuation.

In some embodiments, the displayed size of the first application icon continues to fluctuate while the processing unit 2806 remains in the user interface reconfiguration mode.

In some embodiments, the fluctuation in size is animated to simulate that the first application icon is pulsing.

In some embodiments, when the processing unit 2806 is operating in the user interface reconfiguration mode, the first application icon includes a deletion region indicating that the application icon is deletable.

In some embodiments, the processing unit 2806 is further configured to detect (e.g., with the detecting unit 2810), while the processing unit 2806 is in the a user interface reconfiguration mode, a second input corresponding to a selection of the deletion region, and in response to detecting the second input, enable removal (e.g., with the removal enabling unit 2814) of the display of the first application icon.

In some embodiments, the processing unit 2806 is further configured to detect (e.g., with the detecting unit 2810), while the processing unit 2806 is in the a user interface reconfiguration mode, a second input corresponding to a selection of the deletion region and, in response to detecting the second input, enable display (e.g., with the display enabling unit 2808) of a deletion confirmation affordance.

In some embodiments, the processing unit 2806 is further configured to detect (e.g., with the detecting unit 2810) a third input corresponding to a selection of the deletion confirmation affordance, and in response to detecting the third input, enable removal (e.g., with the removal enabling unit 2814) of the display of the first application icon.

In some embodiments, the processing unit 2806 is further configured to detect (e.g., with the detecting unit 2810), while the processing unit is in the user interface reconfiguration mode, a fourth input, and in response to detecting the fourth input, cause (e.g., with the causing unit 2812) the processing unit 2806 to exit the user interface reconfiguration mode.

In some embodiments, the processing unit 2806 is further configured to detect (e.g., with the detecting unit 2810), while the processing unit 2806 is in the a user interface reconfiguration mode, a user contact on the touch-sensitive surface unit 2804 at a first position corresponding to a first application icon; while continuing to detect the user contact, detect (e.g., with the detecting unit 2810) movement of the user contact from the first position to a second position without a break in contact of the user contact on the touch-sensitive surface unit 2804; and in response to detecting the movement of the user contact, enable display (e.g., with the display enabling unit 2808) of an enlarged view of a portion of the displayed screen, wherein the portion includes an area surrounding the second position.

In some embodiments, the processing unit 2806 is further configured to enable updating (e.g., with the update enabling unit 2816) of the display of the enlarged view as the user contact is moved along the touch-sensitive surface unit 2804.

In some embodiments, the enlarged view includes a circular display of the portion of the displayed screen.

In some embodiments, the enlarged view is displayed above the second position on the touch-sensitive surface unit 2804.

The operations described above with reference to FIG. 20 are, optionally, implemented by components depicted in FIGS. 1A-1B or FIG. 28. For example, displaying operation 2002, detecting operation 2004, and causing operation 2006 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 29:
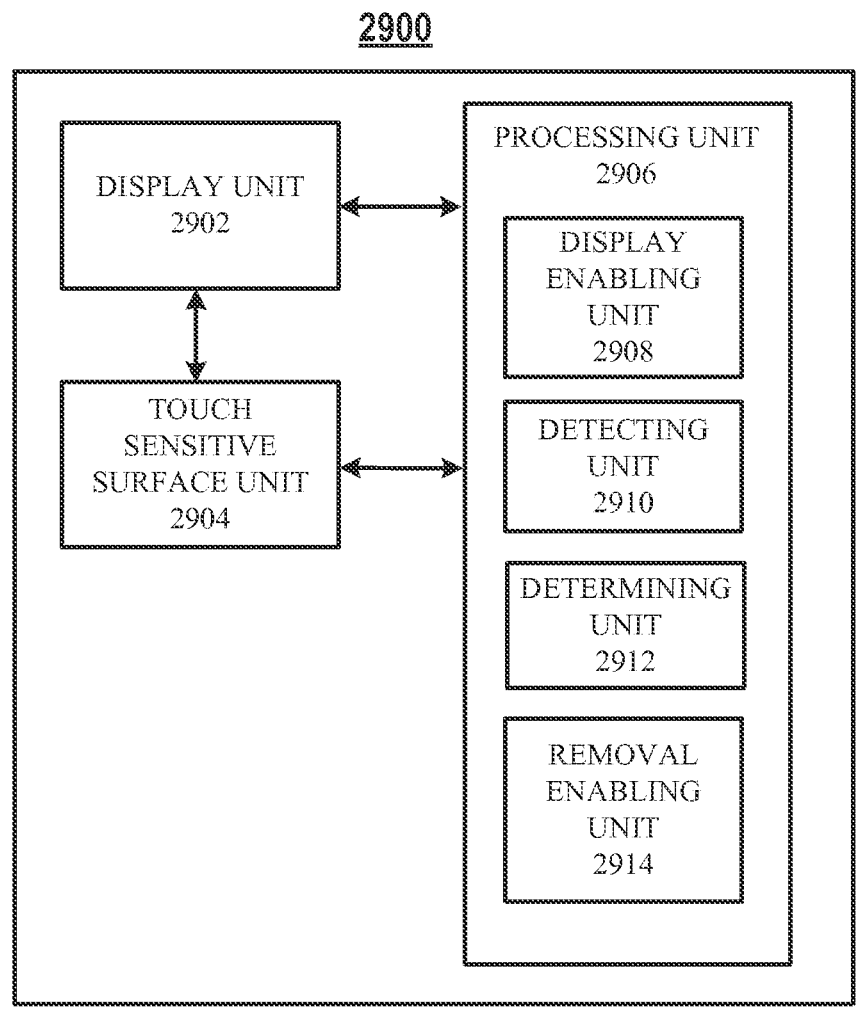
FIG. 29 is a functional block diagram of an electronic device in accordance with some embodiments.

In accordance with some embodiments, FIG. 29 shows a functional block diagram of an electronic device 2900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 29 are, optionally, combined or separated into sub-blocks to implement the principles of the various described embodiments. Therefore, the description herein optionally supports any possible combination or separation or further definition of the functional blocks described herein.

As shown in FIG. 29, an electronic device 2900 includes a display unit 2902 configured to display a graphic user interface, a touch sensitive surface unit 2904 configured to receive contacts, and a processing unit 2906 coupled to the display unit 2902 and the touch-sensitive surface unit 2904. In some embodiments, the processing unit includes a display enabling unit 2908, a detecting unit 2910, a determining unit 2912, and a removal enabling unit 2914.

The processing unit 2906 is configured to enable display (e.g., with the display enabling unit 2908) of one or more application icons in a hexagonal arrangement, detect (e.g., with the detecting unit 2910), on the touch-sensitive surface unit 2904, a touch corresponding to a selection of a first application icon corresponding to a respective application; determine (e.g., with the determining unit 2912) whether the touch has a characteristic intensity above a threshold intensity; and in accordance with a determination that the characteristic intensity is above the threshold intensity, enable removal (e.g., with the removal enabling unit 2914) of the display of the selected icon.

The operations described above with reference to FIG. 21 are, optionally, implemented by components depicted in FIGS. 1A-1B or FIG. 29. For example, displaying operation 2102, detecting operation 2104, determining operation 2106, and removing operation 2108 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 30:
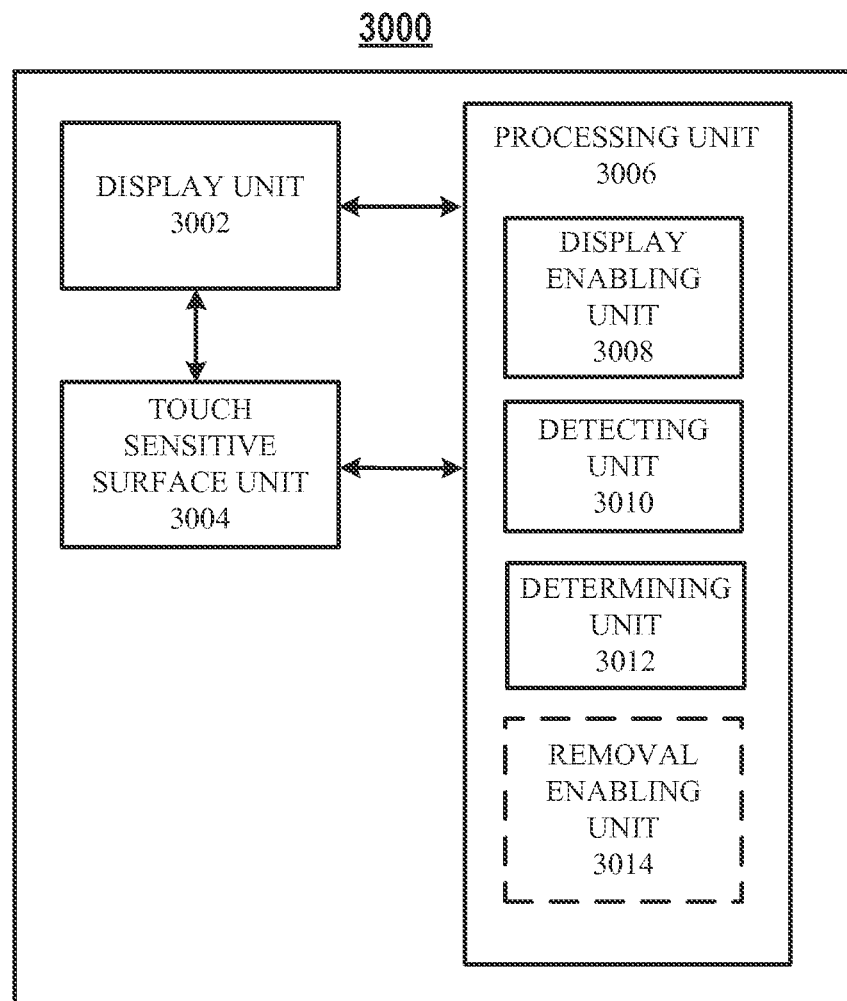
FIG. 30 is a functional block diagram of an electronic device in accordance with some embodiments.

In accordance with some embodiments, FIG. 30 shows a functional block diagram of an electronic device 3000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 30 are, optionally, combined or separated into sub-blocks to implement the principles of the various described embodiments. Therefore, the description herein optionally supports any possible combination or separation or further definition of the functional blocks described herein.

As shown in FIG. 30, an electronic device 3000 includes a display unit 3002 configured to display a graphic user interface, a touch sensitive surface unit 3004 configured to receive contacts, and a processing unit 3006 coupled to the display unit 3002 and the touch-sensitive surface unit 3004. In some embodiments, the processing unit includes a display enabling unit 3008, a detecting unit 3010, a determining unit 3012, and a removal enabling unit 3014.

The processing unit 3006 is configured to enable display (e.g., with the display enabling unit 3008) of one or more application icons in a hexagonal arrangement; detect (e.g., with the detecting unit 3010), on the touch-sensitive surface unit 3004, a first touch; determine (e.g., with the determining unit 3012) whether the touch has a characteristic intensity above a threshold intensity; and in accordance with a determination that the characteristic intensity is above the threshold intensity, enable display (e.g., with the display enabling unit 3008) of a deletion confirmation affordance.

In some embodiments, the deletion confirmation affordance corresponds with a first application icon, and the processing unit 3006 is further configured to detect (e.g., with the detecting unit 3010) a second touch corresponding to a selection of the deletion confirmation affordance; and in response to detecting the second touch, enable removal (e.g., with the removal enabling unit 3014) of the display of the first application icon.

In some embodiments, the electronic device is a wearable electronic device.

The operations described above with reference to FIG. 22 are, optionally, implemented by components depicted in FIGS. 1A-1B or FIG. 30. For example, displaying operations 2202 and 2206, detecting operation 2204, and determining operation 2206 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the appended claims.

What is claimed is:

1. An electronic device, comprising:
    a display device;
    one or more processors; and
    memory storing one or more programs configured to be executed by the one or more processors, the one or more programs including instructions for:
    displaying, via the display device, a plurality of application icons for launching application programs, the plurality of application icons arranged in a first configuration, wherein the plurality of application icons occupy respective locations on a hexagonal grid in relation to an origin;
    detecting an input that corresponds to a request to remove a first application icon from the hexagonal grid;
    in response to the input:
        removing the display of the first application icon;
        determining a second configuration of the plurality of application icons without the first application icon; and
        transitioning the display of the plurality of application icons from the first configuration to the second configuration, wherein:

in accordance with a determination that the first application icon is at a first location, moving a second application icon radially inward in a first direction while maintaining a location of a third application icon; and in accordance with a determination that the first application icon is at a second location, moving the third application icon radially inward in a second direction different from the first direction while maintaining a location of the second application.

2. The electronic device of claim 1,
wherein removing the display of the first application icon results in an unoccupied location on the hexagonal grid at the first location; and
wherein transitioning the display of the plurality of application icons includes moving a display of the second application icon from a third location to the unoccupied location, wherein the third location is diagonally adjacent to the first location with respect to the display.

3. The electronic device of claim 1, wherein the input includes a contact detected at a position corresponding to one of the plurality of application icons.

4. The electronic device of claim 3, wherein the instructions further include:
determining whether a duration of the contact exceeds a predetermined threshold;
wherein the electronic device is caused to operate in a user interface reconfiguration mode in response to detecting the input and in accordance with a determination that the duration of the contact exceeds the predetermined threshold.

5. The electronic device of claim 4, wherein the instructions further include:
in response to detecting the input and in accordance with a determination that the duration of the contact does not exceed the predetermined threshold:
launching the application program corresponding to the application icon at the position of the contact.

6. The electronic device of claim 1, wherein the first location is adjacent to the origin, and wherein the second location is adjacent to the origin.

7. The electronic device of claim 6, wherein transitioning the display of the plurality of application icons from the first configuration to the second configuration includes:
in accordance with a determination that the first application icon is at a fourth location, moving a fourth application icon radially inward in a third direction while maintaining the location of the second application icon and maintaining the location of the third application icon, wherein the third direction is different from the first direction and the second direction, and wherein the fourth location is adjacent to the origin.

8. The electronic device of claim 1, wherein the first direction is opposite the second direction.

9. A method, comprising:
at an electronic device with a display device:
displaying, via the display device, a plurality of application icons for launching application programs, the plurality of application icons arranged in a first configuration, wherein the plurality of application icons occupy respective locations on a hexagonal grid in relation to an origin;
detecting an input that corresponds to a request to remove a first application icon from the hexagonal grid;

in response to the input:
removing the display of the first application icon;
determining a second configuration of the plurality of application icons without the first application icon; and
transitioning the display of the plurality of application icons from the first configuration to the second configuration, wherein:
in accordance with a determination that the first application icon is at a first location, moving a second application icon radially inward in a first direction while maintaining a location of a third application icon; and
in accordance with a determination that the first application icon is at a second location, moving the third application icon radially inward in a second direction different from the first direction while maintaining a location of the second application.

10. The method of claim 9,
wherein removing the display of the first application icon results in an unoccupied location on the hexagonal grid at the first location; and
wherein transitioning the display of the plurality of application icons includes moving a display of the second application icon from a third location to the unoccupied location, wherein the third location is diagonally adjacent to the first location with respect to the display.

11. The method of claim 9, wherein the input includes a contact detected at a position corresponding to one of the plurality of application icons.

12. The method of claim 11, further comprising:
determining whether a duration of the contact exceeds a predetermined threshold;
wherein the electronic device is caused to operate in a user interface reconfiguration mode in response to detecting the input and in accordance with a determination that the duration of the contact exceeds the predetermined threshold.

13. The method of claim 12, further comprising:
in response to detecting the input and in accordance with a determination that the duration of the contact does not exceed the predetermined threshold:
launching the application program corresponding to the application icon at the position of the contact.

14. The method of claim 9, wherein the first location is adjacent to the origin, and wherein the second location is adjacent to the origin.

15. The method of claim 14, wherein transitioning the display of the plurality of application icons from the first configuration to the second configuration includes:
in accordance with a determination that the first application icon is at a fourth location, moving a fourth application icon radially inward in a third direction while maintaining the location of the second application icon and maintaining the location of the third application icon, wherein the third direction is different from the first direction and the second direction, and wherein the fourth location is adjacent to the origin.

16. The method of claim 9, wherein the first direction is opposite the second direction.

17. A non-transitory computer-readable storage medium storing one or more programs configured to be executed by one or more processors of an electronic device with a display device, the one or more programs including instructions for:
displaying, via the display device, a plurality of application icons for launching application programs, the plurality of application icons arranged in a first configuration, wherein the plurality of application icons occupy respective locations on a hexagonal grid in relation to an origin;

detecting an input that corresponds to a request to remove a first application icon from the hexagonal grid;

in response to the input:
removing the display of the first application icon;
determining a second configuration of the plurality of application icons without the first application icon; and
transitioning the display of the plurality of application icons from the first configuration to the second configuration, wherein:
in accordance with a determination that the first application icon is at a first location, moving a second application icon radially inward in a first direction while maintaining a location of a third application icon; and
in accordance with a determination that the first application icon is at a second location, moving the third application icon radially inward in a second direction different from the first direction while maintaining a location of the second application.

18. The non-transitory computer-readable storage medium of claim 17,
wherein removing the display of the first application icon results in an unoccupied location on the hexagonal grid at the first location; and
wherein transitioning the display of the plurality of application icons includes moving a display of the second application icon from a third location to the unoccupied location, wherein the third location is diagonally adjacent to the first location with respect to the display.

19. The non-transitory computer-readable storage medium of claim 17, wherein the input includes a contact detected at a position corresponding to one of the plurality of application icons.

20. The non-transitory computer-readable storage medium of claim 19, wherein the instructions further include:
determining whether a duration of the contact exceeds a predetermined threshold;
wherein the electronic device is caused to operate in a user interface reconfiguration mode in response to detecting the input and in accordance with a determination that the duration of the contact exceeds the predetermined threshold.

21. The non-transitory computer-readable storage medium of claim 20, wherein the instructions further include:
in response to detecting the input and in accordance with a determination that the duration of the contact does not exceed the predetermined threshold:
launching the application program corresponding to the application icon at the position of the contact.

22. The non-transitory computer-readable storage medium of claim 17, wherein the first location is adjacent to the origin, and wherein the second location is adjacent to the origin.

23. The non-transitory computer-readable storage medium of claim 22, wherein transitioning the display of the plurality of application icons from the first configuration to the second configuration includes:
in accordance with a determination that the first application icon is at a fourth location, moving a fourth application icon radially inward in a third direction while maintaining the location of the second application icon and maintaining the location of the third application icon, wherein the third direction is different from the first direction and the second direction, and wherein the fourth location is adjacent to the origin.

24. The non-transitory computer-readable storage medium of claim 17, wherein the first direction is opposite the second direction.

* * * * *